US011150950B2

(12) United States Patent
Kumar et al.

(10) Patent No.: US 11,150,950 B2
(45) Date of Patent: Oct. 19, 2021

(54) METHODS AND APPARATUS TO MANAGE WORKLOAD DOMAINS IN VIRTUAL SERVER RACKS

(71) Applicant: VMWARE, INC., Palo Alto, CA (US)

(72) Inventors: Prafull Kumar, Palo Alto, CA (US); Jason Anthony Lochhead, Farmers Branch, TX (US); Konstantin Ivanov Spirov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 645 days.

(21) Appl. No.: 15/585,172

(22) Filed: May 3, 2017

(65) Prior Publication Data

US 2018/0157532 A1 Jun. 7, 2018

(30) Foreign Application Priority Data

Dec. 1, 2016 (IN) ............................ 201641041151

(51) Int. Cl.
*G06F 9/50* (2006.01)
*G06F 9/48* (2006.01)
(Continued)

(52) U.S. Cl.
CPC .......... *G06F 9/5027* (2013.01); *G06F 9/4881* (2013.01); *G05B 2219/14128* (2013.01); (Continued)

(58) Field of Classification Search
None
See application file for complete search history.

(56) References Cited

U.S. PATENT DOCUMENTS 9,953,351 B1 * 4/2018 Sivasubramanian ........................ H04L 12/1453
2013/0086268 A1 * 4/2013 Sloma ........................ G06F 9/50 709/226
(Continued)

OTHER PUBLICATIONS

Lee et al., Topology-Aware Resource Allocation for Data-Intensive Workloads. Jan. 2011, ACM SIGCOMM Computer Communication Review, V. 41, N.1., pp. 120-124 (Year: 2011).*

*Primary Examiner* — Lewis A Bullock, Jr.
*Assistant Examiner* — Melissa A Headly
(74) *Attorney, Agent, or Firm* — Hanley, Flight & Zimmerman, LLC

(57) ABSTRACT

Methods and apparatus to manage workload domains in virtual server racks are disclosed. An example apparatus includes a policy enforcer to evaluate whether capacities of the plurality of workload domains comply with policy capacity levels of respective user-defined policies for the plurality of workload domains, and a resource manager to, when a first workload domain has a first quantify of resources that exceeds a first policy capacity level of a first user-defined policy, identify a second workload domain requesting a second quantity of resources, when the second quantity of resources is equal to the first quantity of resources, allocate the first quantity of resources from the first workload domain to the second workload domain to satisfy the first policy capacity level, when the second quantity of resources is less than the first quantity of resources, allocate the second quantity of resources from the first workload domain to the second workload domain, and de-allocate remaining resources from the first workload domain to a shared resource pool to satisfy the first policy capacity level.

35 Claims, 26 Drawing Sheets

(51) Int. Cl.
*H04Q 1/02* (2006.01)
*H04L 29/08* (2006.01)
*H04Q 1/04* (2006.01)
*H04Q 1/08* (2006.01)

(52) U.S. Cl.
CPC ............ *H04L 29/0845* (2013.01); *H04Q 1/04* (2013.01); *H04Q 1/08* (2013.01); *H04Q 1/09* (2013.01)

(56) References Cited

U.S. PATENT DOCUMENTS

| | | | | |
|---|---|---|---|---|
| 2013/0227558 | A1* | 8/2013 | Du | G06F 9/45558<br>718/1 |
| 2017/0019345 | A1* | 1/2017 | Yamasaki | H04L 67/16 |
| 2017/0149931 | A1* | 5/2017 | Lochhead | H04L 67/327 |

* cited by examiner

VIRTUAL SERVER RACK
AGGREGATE CAPACITY ACROSS PHYSICAL RACKS
LINKED INTO A SINGLE VIRTUAL RACK

1400

| OPTION | RACK SPANNING? | VSANFTT | VSAN FD | vSPHERE HA | PLACEMENT ALGORITHM | MAX SIZE | EXPANSION INCREMENT |
|---|---|---|---|---|---|---|---|
| LOW REDUNDANCY | YES, FOR RACK COUNT > 1 | FTT = 0, THREE HOST MINIMUM | NO | NO | SELECTIVE FILL RACKS | CLUSTER MAXIMUM | SINGLE HOST |
| NORMAL REDUNDANCY | YES FOR RACK COUNT > 1 | FTT = 1, THREE HOST MINIMUM | NO | ENABLED, % BASED ADMISSION CONTROL | SELECTIVE FILL RACKS | CLUSTER MAXIMUM | SINGLE HOST |
| 1402 HIGH REDUNDANCY – OPTION 1 | NO, INTRA-RACK ONLY, RACK COUNT < 5 | FTT = 2, FIVE HOST MINIMUM | NO | ENABLED, % BASED ADMISSION CONTROL | VERTICAL | MAX HOSTS AVAILABLE IN ONE RACK | SINGLE HOST |
| 1404 HIGH REDUNDANCY – OPTION 2 | YES, FOR RACK COUNT ≥ 5 | FTT = 2, FIVE FAULT DOMAIN MINIMUM | YES, STRICT | ENABLED, % BASED ADMISSION CONTROL | MINIMUM RACK COUNT | CLUSTER MAXIMUM | MULTI-HOST DRIVEN BY VSAN FD |

WORKLOAD DOMAINS – AVAILABILITY POLICY OPTIONS

FIG. 14

| CAPABILITY OR SETTING | EVO SDDC SETTING |
|---|---|
| DRS | ENABLED - AUTOMATIC |
| NETWORK IO CONTROL | ENABLED – DEFAULT CONFIGURATION |
| LACP | ENABLED – VDS AND PHYSICAL SWITCH |
| SYSLOG | ENABLED CONFIGURE FOR LOG INSIGHT |
| NTP | ENABLED – CONFIGURED DURING INITIAL STARTUP |
| DNS | ENABLED – CONFIGURED DURING INITIAL STARTUP |

1500

ADDITIONAL POLICY SETTINGS

FIG. 15

WORKLOAD DOMAIN – PERFORMANCE AND AVAILABILITY SELECTION USER INTERFACE SCREEN

WORKLOAD DOMAIN – NETWORK CONFIGURATION USER INTERFACE SCREEN

WORKLOAD DOMAIN – RESOURCES SELECTION USER INTERFACE SCREEN

METHODS AND APPARATUS TO MANAGE WORKLOAD DOMAINS IN VIRTUAL SERVER RACKS

RELATED APPLICATIONS

Benefit is claimed under 35 U.S.C. 119(a)-(d) to Foreign Application Serial No. 201641041151 filed in India entitled "METHODS AND APPARATUS TO MANAGE WORKLOAD DOMAINS IN VIRTUAL SERVER RACKS", on Dec. 1, 2016, by VMware, Inc., which is herein incorporated in its entirety by reference for all purposes.

FIELD OF THE DISCLOSURE

The present disclosure relates generally to cloud computing and, more particularly, to methods and apparatus to manage workload domains in virtual server racks.

BACKGROUND

The virtualization of computer systems provides numerous benefits such as the execution of multiple computer systems on a single hardware computer, the replication of computer systems, the extension of computer systems across multiple hardware computers, etc. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing, ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 14 depicts example availability options for configuring workload domains.

FIG. 15 depicts additional example policy settings for configuring workload domains.

DETAILED DESCRIPTION

Figure 1:
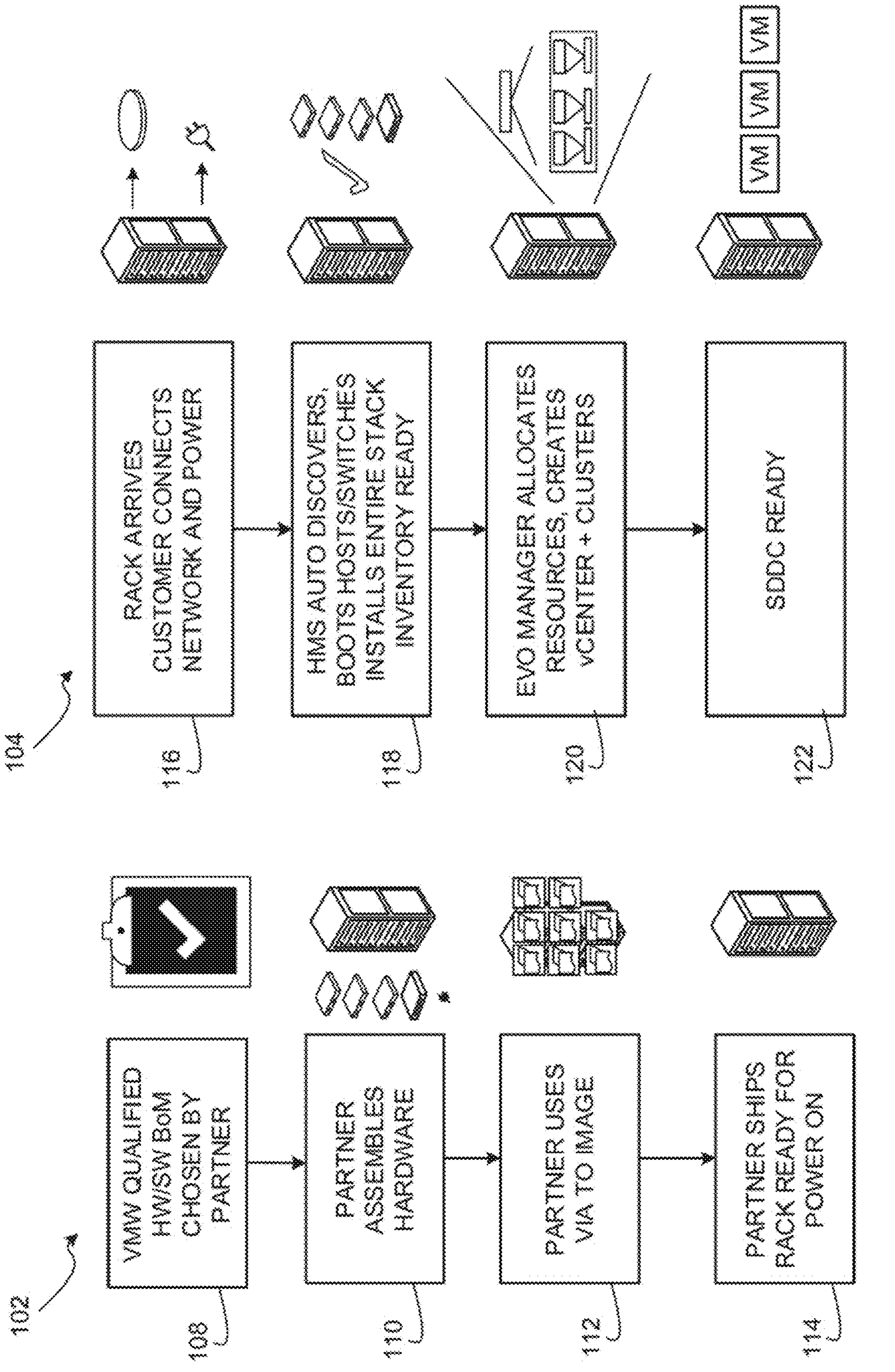
FIG. 1 depicts example processes that may be used to deploy virtual rack servers for use in examples disclosed herein to deploy and manage workload domains in such virtual server racks.

Cloud computing is based on the deployment of many physical resources across a network, virtualizing the physical resources into virtual resources, and provisioning the virtual resources for use across cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING" filed Dec. 12, 2012, all three of which are hereby incorporated herein by reference in their entirety.

When starting up a cloud computing environment or adding resources to an already established cloud computing environment, data center operators struggle to offer cost-effective services while making resources of the infrastructure (e.g., storage hardware, computing hardware, and networking hardware) work together to achieve pain free installation/operation and optimizing the resources for improved performance. Prior techniques for establishing and maintaining data centers to provide cloud computing services often require customers to understand details and configurations of hardware resources to establish workload domains in which to execute customer services. In examples disclosed herein, workload domains are mapped to a management cluster deployment (e.g., a vSphere cluster of VMware, Inc.) in a single rack deployment in a manner that is relatively easier to understand and operate by users than prior techniques. In this manner, as additional racks are added to a system, cross-rack clusters become an option. This enables creating more complex configurations for workload domains as there are more options for deployment as well as additional management cluster capabilities that can be leveraged. Examples disclosed herein facilitate making workload domain configuration and management easier than prior techniques.

A management cluster is a group of physical machines and virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

As used herein, availability refers to the level of redundancy for fault tolerance that is required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy for fault tolerance, the CPU operating speed, the memory, the storage, the security, and/or the power requirements selected by a user. For example, more resources are required for a workload domain as the user-selected requirements increase (e.g., higher redundancy. CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

Examples disclosed herein support numerous options and configuration capabilities for deploying workload domains. For example, numerous options for domain type, security, availability, performance, and capacity are supported for configuring workload domains. In addition, examples disclosed herein are able to support any of a number of user-requested capacities for workload domains. That is, examples disclosed herein may be implemented to inform a user of user-selectable capacities that may be used for configuring workload domains in particular rack deployments. In this manner, users' selections of capacities are based on capacities useable for configuring workload domains in particular nick deployments. That is, users are better informed of capacity capabilities of rack deployments to avoid confusion and incorrect parameters during workload domain configuration and management. Examples disclosed herein also enable deploying workload domains using optimal configurations that meet user-requested domain type, security, capacity, availability, and performance configurations. In addition, examples disclosed herein enable generating expandable workload domains that do maintain initial user-requested domain type, security, capacity, availability, and performance requirements until users request modifications to such initial user-requested capabilities.

FIG. 1 depicts example processes 102 and 104 that may be used to deploy virtual rack servers for use in examples disclosed herein to deploy and manage workload domains in such virtual server racks. For example, the processes 102, 104 of FIG. 1 may be used to prepare example physical racks 202, 204 of FIG. 2 to deploy example virtual server rack 206 of FIG. 2. In the illustrated example, the process 102 is a partner process that is implemented by a system integrator to prepare the physical racks 202, 204 for distribution to a customer. For example, a system integrator receives and fulfills customer orders for computing hardware. The system integrator obtains computer hardware and/or software from other suppliers (e.g., hardware supplier(s)), and assembles individual hardware components and/or software into functional computing units to fulfill customer orders. Alternatively, a system integrator may design and/or build some or all of the hardware components and/or software to be used in assembling computing units. According to the illustrated example, the system integrator prepares computing units for other entities (e.g., businesses and/or persons that do not own/employ and are not owned/employed by the system integrator). Alternatively, a system integrator may assemble computing units for use by the same entity as the system integrator (e.g., the system integrator may be a department of a company, wherein the company orders and/or utilizes the assembled computing units). In some examples, a system integrator is an entity independent of equipment manufacturers such as white-label equipment manufacturers that provide hardware without branding. In other examples, a system integrator is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

The example process 104 is to be performed by a customer to startup the physical racks 202, 204 (FIG. 2) prepared by the system integrator to deploy the virtual server rack 206 (FIG. 2) at the customer's site. As used herein, the term customer refers to any person and/or entity that receives and/or operates the computing units supplied by a system integrator.

Figure 2:
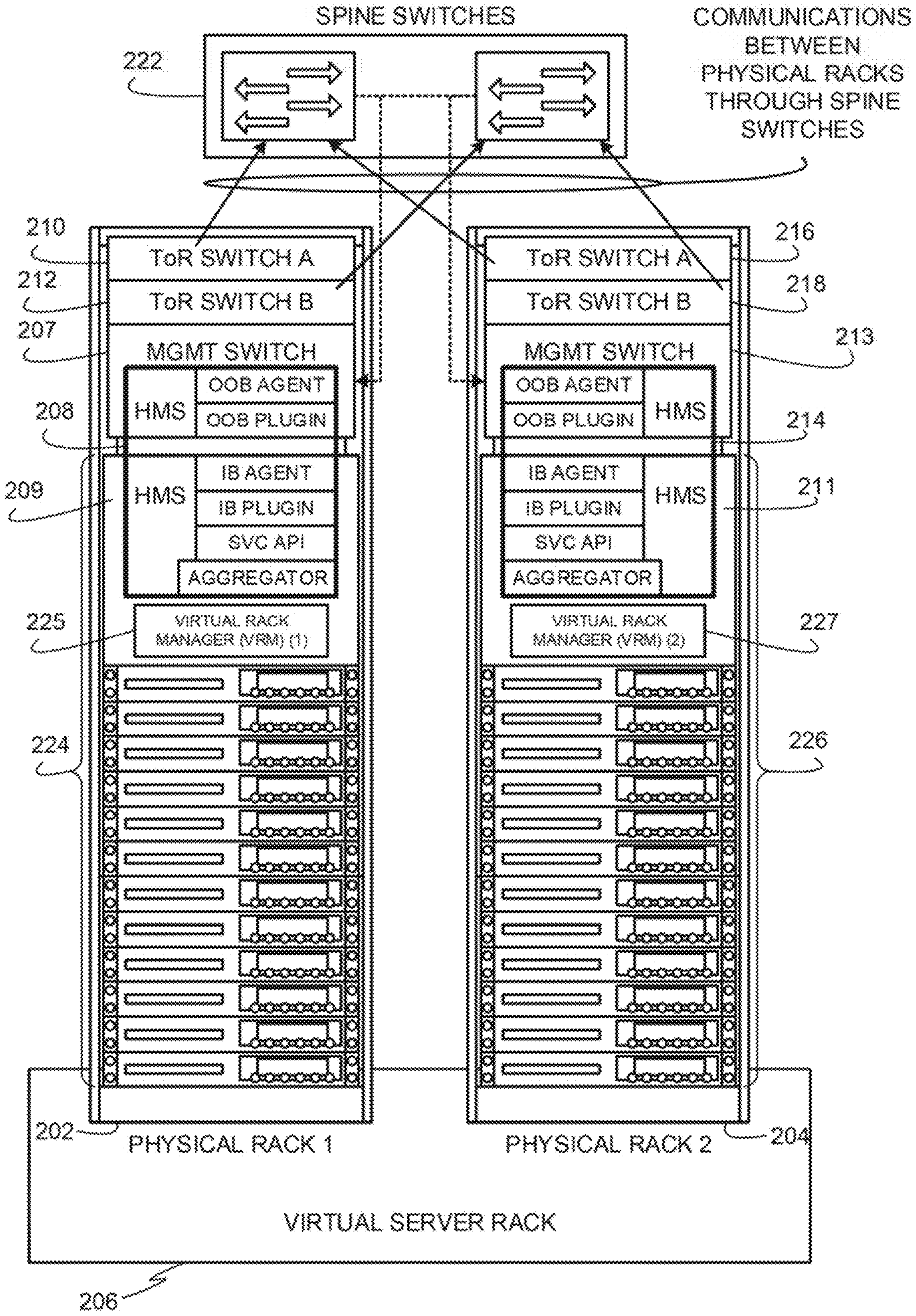
FIG. 2 depicts example physical racks in an example virtual server rack deployment.

The example process 102 is implemented by a system integrator to assemble and configure the physical racks 202, 204 ordered by a customer. For example, the physical racks 202, 204 are a combination of computing hardware and installed software that may be utilized by a customer to create and/or add to a virtual computing environment. For example, the physical racks 202, 204 may include processing units (e.g., multiple blade servers), network switches to interconnect the processing units and to connect the physical racks 202, 204 with other computing units (e.g., other physical racks in a network environment such as a cloud computing environment), and/or data storage units (e.g., network attached storage, storage area network hardware, etc.). The example physical racks 202, 204 of FIG. 2 are prepared by the system integrator in a partially configured state to enable the computing devices to be rapidly deployed at a customer location (e.g., in less than 2 hours). For example, the system integrator may install operating systems, drivers, operations software, management software, etc. The installed components may be configured with some system details (e.g., system details to facilitate intercommunication between the components of the physical racks 202, 204) and/or may be prepared with software to collect further information from the customer when the virtual server rack is installed and first powered on by the customer.

Initially in the illustrated example of FIG. 1, a system integrator partner selects a qualified hardware/software bill of materials (BoM) (block 108) for use in building the physical racks 202, 204. The system integrator partner then assembles the hardware for the physical racks 202, 204 (block 110). The system integrator partner uses a virtual imaging appliance (VIA) to image the physical racks 202, 204 (block 112).

For example, to facilitate preparation of the physical rack 102 for distribution to a customer, the example system integrator uses the VIA to prepare and configure the operating systems, system configurations, software, etc. on the physical racks 202, 204 prior to shipping the example physical racks 202, 205 to the customer. The VIA of the illustrated example is a virtual computing appliance provided to the system integrator by an example virtual system solutions provider via a network. The VIA is executed by the system integrator in a virtual computing environment of the system integrator. For example, the VIA may be a virtual computing image, a virtual application, a container virtual machine image, a software application installed in an operating system of a computing unit of the system integrator, etc. The VIA may alternatively be provided by any other entity and/or may be a physical computing device, may be multiple physical computing devices, and/or may be any combination of virtual and physical computing components.

The VIA used in the illustrated example retrieves software images and configuration data from the virtual systems solutions provider via the network for installation on the physical racks 202, 204 during preparation of the physical racks 202, 204. The VIA used in the illustrated example pushes (e.g., transmits, sends, etc.) the software images and configuration data to the components of the physical racks 202, 204. For example, the VIA used in the illustrated example includes multiple network connections (e.g., virtual network connections, physical network connects, and/or any combination of virtual and network connections). For example, the VIA connects to a management interface of a network switches) installed in the physical racks 202, 204, installs network configuration information on the network switch(es), and reboots the switch(es) to load the installed configuration to communicatively couple the VIA with the computing unit(s) communicatively coupled via the network switch(es). The VIA also connects to a management network interface (e.g., an out of band (OOB) interface) of a server(s) installed in the example physical racks 202, 204 to cause an operating system(s) to be installed (e.g., utilizing a preboot execution environment (PXE) boot of an operating system installer). The VIA is also used to install virtual environment management components (described in further detail in conjunction with FIGS. 3-6 and in the following pages) and causes the virtual environment management components to boot so that they can take over the deployment of the example server racks 202, 204.

A virtual system solutions provider that provides the VIA to the system integrator partner is a business, such as VMware, Inc., that distributes (e.g., sells) the VIA. The virtual system solutions provider also provides a repository of images and/or other types of software (e.g., virtual machine images, drivers, operating systems, etc.) that may be retrieved by the VIA and installed on the physical racks 202, 204. The virtual system solutions provider may alternatively be implemented by multiple entities (e.g., from a manufacturers) of the software) and/or any other type of entity. Additional details of example VIAs are disclosed in U.S. patent application Ser. No. 14/752,699, filed on Jun. 26, 2015, and titled "Methods and Apparatus for Rack Deployments for Virtual Computing Environments," which is hereby incorporated by reference herein in its entirety.

After imaging the physical racks 202, 204 at block 112, the system integrator ships and/or otherwise delivers the physical racks 202, 204 to the customer (block 1114). Thus, the physical racks 202, 204 have been pre-configured to allow the customer to power on the example physical racks 202, 204 and quickly prepare the physical racks 202, 204 for installation in a new and/or existing computing system (e.g., a cloud computing system).

Turning now to the example process 104, the physical racks 202, 204 initially arrive at the customer site from the system integrator anti the customer connects the physical racks 202, 204 to a network and powers the physical racks 202, 204 (block 116). For example, upon initially powering on the example physical racks 202, 204, the components of the example physical racks 202, 204 are already configured to communicate with each other and execute operating systems and software, which allows the example physical racks 202, 204 to provide an interface (e.g., a webpage interface) that, when accessed by the customer or an installer, gathers additional information for completing the configuration of the physical racks 202, 204. For example, the interface may gather and/or configure user credentials, network information, information about networked components (e.g., an address for a storage device such as a storage area network (SAN), an address for a management system (e.g., a VMware vCenter server(s)), etc.). The gathered information can be utilized by the components of the example physical racks 202, 204 to setup the physical racks 202, 204 as part of a new computing cluster and/or add the example physical racks 202, 204 to an existing computing cluster (e.g., a cloud computing system). For example, the customer may specify different domain types, security, capacity, availability, and performance requirements for establishing workload domains in the virtual server rack 206 (FIG. 2) without requiring the customer to have in-depth knowledge of the hardware and configurations of the physical racks 202, 204.

After the customer powers on the physical racks 202, 204 at block 116, hardware management systems (HMSs) 208, 214 (FIG. 2) of the physical racks 202, 204 auto discover hardware resources in the physical racks 202, 204, boot hosts and switches in the physical racks 202, 204, install stacks in the physical racks 202, 204, and make the physical racks 202, 204 inventory ready (block 118). For example, the physical racks 202, 204 are inventory ready for virtual rack managers (VRMs) 225, 227 of FIG. 2 to collect and manage hardware resource inventories of the physical racks 202, 204. The HMSs 208, 214 are described below in connection with FIGS. 2-6. Additional details of the HMSs 208, 214 are also disclosed in U.S. patent application Ser. No. 14/788,004, filed on Jun. 30, 2015, and titled "Methods and Apparatus to Configure Hardware Management Systems for use in Virtual Server Rack Deployments for Virtual Computing Environments," which is hereby incorporated by reference herein in its entirety.

The VRMs 225, 227 (e.g., an EVO manager) are initialized and allocate resources, starts a cloud infrastructure service (e.g., a VMware vCenter server), and creates management clusters (block 120). The VRMs 225, 227 are described below in connection with FIGS. 2-6. Additional details of the VRMs 225, 227 are also disclosed in U.S. patent application Ser. No. 14/796,803, filed on Jul. 10, 2015, and titled "Methods and Apparatus to Configure Virtual Resource Managers for use in Virtual Server Rack Deployments for Virtual Computing Environments," which is hereby incorporated by reference herein in its entirety.

A software defined data center (SDDC) is then ready to run in the virtual server rack 206 on the physical racks 202, 204 (block 122).

FIG. 2 depicts the example physical racks 202, 204 in an example deployment of the virtual server rack 206. In the illustrated example, the first physical rack 202 has an example top-of-rack (ToR) switch A 210, an example ToR switch B 212, an example management switch 207, and an example server host node (0) 209. In the illustrated example, the management switch 207 and the server host node (0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents (e.g., an example OOB agent 612 described below in connection with FIG. 6) and OOB plugins (e.g., an example OOB plugin 621 described below in connection with FIG. 6) of the corresponding HMSs 208, 214. Also in the illustrated example, the server host nodes(0) 209, 211 of the corresponding physical racks 202, 204 run corresponding IB agents (e.g., an example IB agent 613 described below in connection with FIG. 6), IB plugins (e.g., an example IB plugin 623 described below in connection with FIG. 6), HMS service APIs (e.g., an example generic HMS service API 610 described below in connection with FIG. 6), and aggregators (e.g., an example HMS aggregator 611 described below in connection with FIG. 6).

In the illustrated example, the HMS 208, 214 connects to server management ports of the server host node (0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non routable private Internet protocol (IP) management network for OOB management. The HMS 208, 214 of the illustrated example uses this OOB management interface to the server management ports of the server host node (0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on a cluster of three server host nodes of the first physical rack 202, one of which is the server host node (0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on a cluster of three server host nodes of the second physical rack 204, one of which is the server host node (0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

The VRM 225 runs on a cluster of three server host nodes of the first physical rack 202 using a high availability (HA) mode configuration. In addition, the VRM 227 runs on a cluster of three server host nodes of the second physical rack 204 using the HA mode configuration. Using the HA mode in this manner, enables fault tolerant operation of the VRM 225, 227 in the event that one of the three server host nodes in the cluster for the VRM 225, 227 fails. In some examples, a minimum of three hosts or fault domains (FD) are used for failure-to-tolerance (FTT), FTT=1. In some examples, a minimum of five hosts or FDs are used for FTT=2. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the TOR switches 210, 212, 216, 218 (e.g., Link states, Packet Stats, Availability, etc.). There is also a configuration buffer as part of the switch object which stores the configuration information to be applied on the switch.

Figure 3:
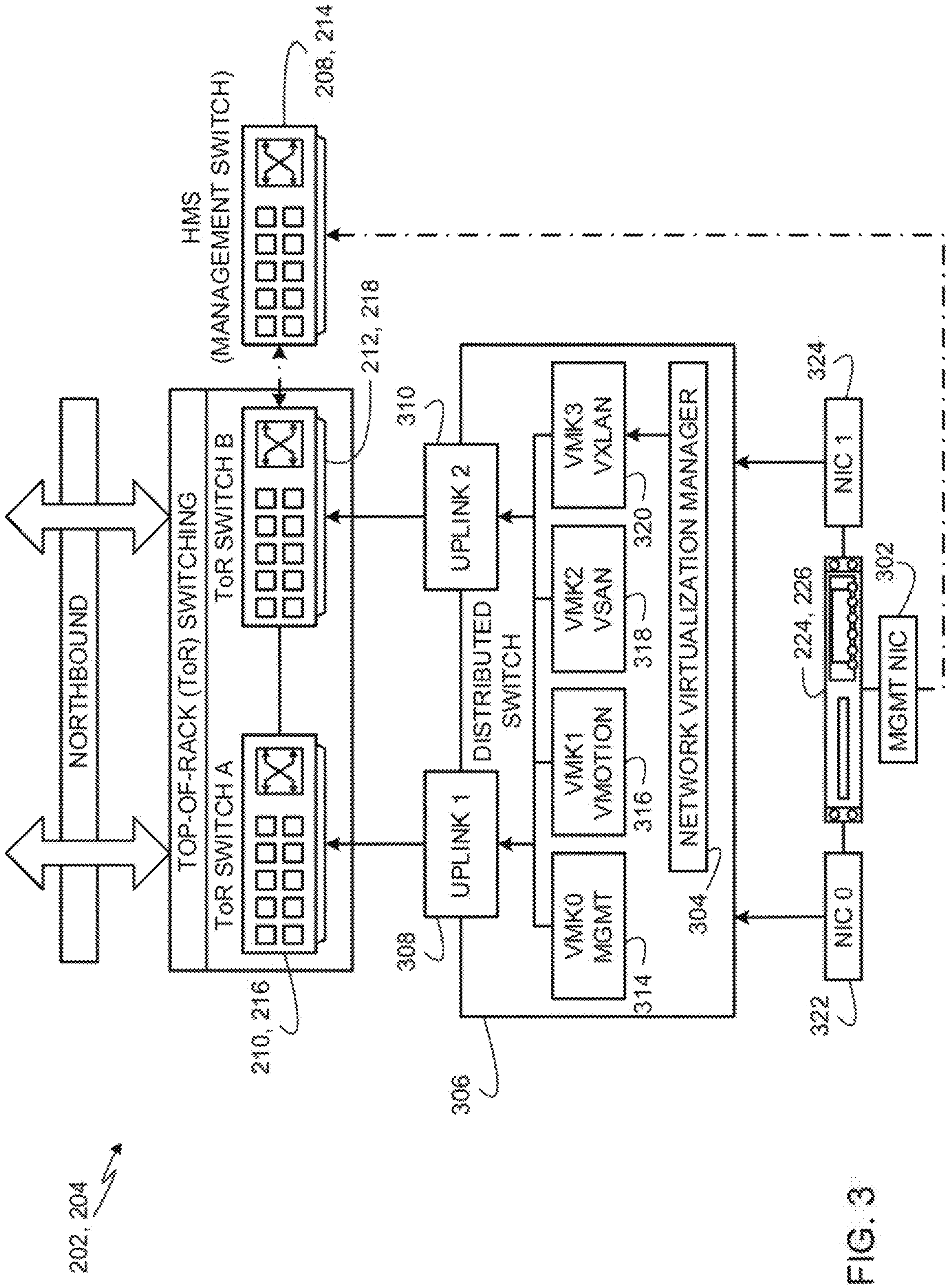
FIG. 3 depicts an example configuration of one of the example physical racks of FIG. 2.

FIG. 3 depicts an example configuration of one of the example physical racks 202, 204 of FIG. 2. In the illustrated example of FIG. 3, the HMS 208, 214 is in communication with a physical hardware resource 224, 226 through a management network interface card (NIC) 302. The example HMS 208, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate network interface cards (NICs).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to manage use of ones of or portions of the physical hardware resources 224, 226 allocated for use by the distributed switch 306. In examples disclosed herein, the VRM1 225 of FIG. 2 uses the VMK0 management kernel 314 to communicate with the VRM2 227 through the spine switches 222 of FIG. 2. The VMK1 vMotion 316 virtual adapter is software executed by the distributed switch 306 to facilitate live migration of virtual machines between physical hardware resources 224, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned front the distributed switch 306 during virtual machine provisioning operations. The example VMK3 VXLAN 320 is virtual adapter software executed by the distributed switch to establish and/or support one or more virtual networks provisioned in the distributed switch 306. In the illustrated example, the VMK3 VXLAN 320 is in communication with an example network virtualization manager 304. The network virtualization manager 304 of the illustrated example manages virtualized network resources such as physical hardware switches to provide software-based virtual networks. The example network virtualization manager 304 may be implemented using, for example, the VMware NSX® network virtualization manager 416 of FIG. 4. In the illustrated example of FIG. 3, the distributed switch 306 is shown interfacing with one or more of the physical hardware resources 224, 226 through multiple NICs 322, 324. In this manner, the VM kernels 314, 316, 318, 320 can instantiate virtual resources based on one or more, or portions of, the physical hardware resources 224, 226.

The HMS 208, 214 of the illustrated examples of FIGS. 2 and 3, is a stateless software agent responsible for managing individual hardware elements in a physical rack 202, 204. Examples of hardware elements that the HMS 208, 214 manages are servers and network switches in the physical nick 202, 204. In the illustrated example, the HMS 208, 214 is implemented using Java on Linux so that an OOB portion (e.g., the OOB agent 612 of FIG. 6) of the HMS 208, 214 run as a Java application on a white box management switch (e.g., the management switch 207, 213) in the physical rack 202, 204. However, any other programming language and any other operating system may be used to implement the HMS 208, 214. The physical hardware resources 224, 226 that the HMS 208, 214 manages include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 208, 214 may also be used to manage non-white label equipment such as original equipment manufacturer (OEM) equipment. Such OEM equipment includes OEM Servers such as Hewlett-Packard® (HP) servers and Lenovo® servers, and OEM Swatches such as Arista switches, and/or any other OEM server, switches, or equipment.

Figure 4:
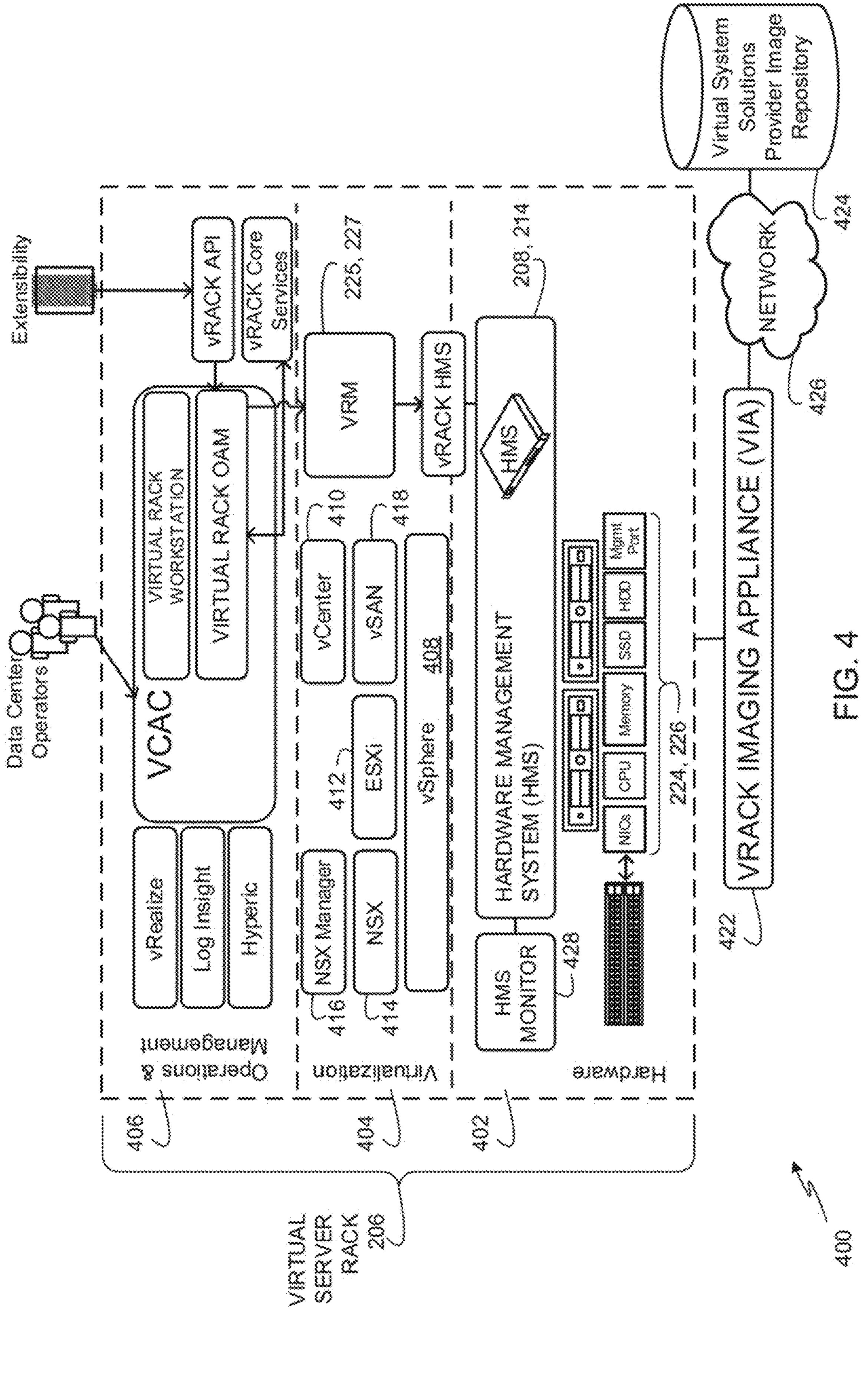
FIG. 4 depicts an example architecture to configure and deploy the example virtual server rack of FIG. 2.

FIG. 4 depicts an example architecture 400 in which an example virtual imaging appliance 422 (e.g., the example VIA described in connection with FIG. 1) is utilized to configure and deploy the virtual server rack 206 (e.g., one or more of the example physical racks 202, 204 of FIG. 2).

The example architecture 400 of FIG. 4 includes a hardware layer 402, a virtualization layer 404, and an operations and management component 406. In the illustrated example, the hardware layer 402, the virtualization layer 404, and the operations and management component 406 are part of the example virtual server rack 206 of FIG. 2. The virtual server rack 206 of the illustrated example is based on the physical racks 202, 204 of FIG. 2. Alternatively, either one of the physical racks 202, 204 may be operated in a stand-alone manner to instantiate and run the virtual server rack 206. The example virtual server rack 206 is configured to configure the physical hardware resources 224, 226, to virtualize the physical hardware resources 224, 226 into virtual resources, to provision virtual resources for use in providing cloud-based services, and to maintain the physical hardware resources 224, 226 and the virtual resources. The example architecture 400 includes a virtual imaging appliance (VIA) 422 that communicates with the hardware layer 402 to store operating system (OS) and software images in memory of the hardware layer 402 for use in initializing physical resources needed to configure the virtual server rack 206. In the illustrated example, the VIA 422 retrieves the OS and software images from a virtual system solutions provider image repository 424 via an example network 426 (e.g., the Internet). For example, the VIA 422 may be the VIA provided to a system integrator as described in connection with FIG. 1 by a virtual system solutions provider to configure new physical racks (e.g., the physical racks 202, 204 of FIGS. 2 and 3) for use as virtual server racks (e.g., the virtual server rack 206). That is, whenever the system integrator wishes to configure new hardware (e.g., a new physical tack) for use as a virtual server rack, the system integrator connects the VIA 422 to the new hardware, and the VIA 422 communicates with the virtual system provider image repository 424 to retrieve OS and/or software images needed to configure the new hardware for use as a virtual server rack. In the illustrated example, the OS and/or software images located in the virtual system provider image repository 424 are configured to provide the system integrator with flexibility in selecting to obtain hardware from any of a number of hardware manufacturers. As such, end users can source hardware from multiple hardware manufacturers without needing to develop custom software solutions for each hardware manufacturer. Further details of the example VIA 422 are disclosed in U.S. patent application Ser. No. 14/752,699, filed on Jun. 26, 2015, and titled "Methods and Apparatus for Rack Deployments for Virtual Computing Environments," which is hereby incorporated herein by reference in its entirety.

The example hardware layer 402 of FIG. 4 includes the HMS 208, 214 of FIGS. 2 and 3 that interfaces with the physical hardware resources 224, 226 (e.g., processors, network interface cards, servers, switches, storage devices, peripherals, power supplies, etc.). The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 202, 204 including the dual-redundant management switches 207, 213 and dedicated management ports attached to the server host nodes (0) 209, 211 and the ToR switches 210, 212, 216, 218 (FIGS. 2 and 3). In the illustrated example, one instance of the HMS 208, 214 runs per physical rack 202, 204. For example, the HMS 208, 214 may run on the management switch 207, 213 and the server host node (0) 209, 211 installed in the example physical racks 202, 204 of FIG. 2. In the illustrated example of FIG. 2 both of the HMSs 208, 214 are provided in corresponding management switches 207, 213 and the corresponding server host nodes (0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes (0) 209, 211 on which the other HMS 208, 214 executes. In some examples, to achieve seamless failover, two instances of an HMS 208, 214 run in a single physical rack 202, 204. In such examples, the physical rack 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes (0), and the physical rack 204 of FIG. 2 runs two instances of the HMS 214 on two separate physical hardware management switches and two separate server host nodes (0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes (0) in the physical rack 202 (or the two instances of the HMS 214 on two separate management switches and two separate server host nodes (0) in the physical rack 204) are connected over a point-to-point, dedicated Ethernet link that carries heartbeats and memory state synchronization between the primary and secondary HMS instances.

There are numerous categories of failures that the HMS 208, 214 can encounter. Some example failure categories are shown below in Table 1.

TABLE 1

HMS Failure Categories

| Failure Type | Examples | Impact | Remediation |
|---|---|---|---|
| 1. HMS Agent Software Failures | Unable to allocate new resources<br>Memory corruption<br>Software Crash<br>CPU hogging<br>Memory leaks | Short term loss of HMS function [Minutes] | Restart from Monitor |
| 2. HMS Agent Unrecoverable Software Failure | Unable to start demon<br>Unable to resolve Failure Type1<br>Consistent software crash | Longer term loss of HMS function [Hours] | Maintenance mode thin HMS Agent till issue resolved |
| 3. Management Switch Operating System Software | Processes Failures<br>Kernel Failures<br>Unable to boot | Short to Long Term Loss of Mgmt Switch and HMS function | Process restart for user processes. Reboots for Kernel |

TABLE 1-continued

HMS Failure Categories

| Failure Type | Examples | Impact | Remediation |
|---|---|---|---|
| Failures | switch OS<br>ONIE/bootloader issues | | failures<br>Manual intervention for failed boots |
| 4. Management Switch Hardware Failures | Link down on management ports to Server<br>Link Down on management ports to ToR nodes<br>Link down from VRM Host to HMS on Mgmt Switch<br>Critical Hardware alarms | Portions of rack unavailable<br>VRM-HMS communication loss | Reset Links from PRM<br>Notify VRM for manual intervention |
| 5. Management Switch Un-Recoverable Hardware Failure | Management switch fails to boot<br>Erratic Resets of hardware while running | Long term loss of HMS/Mgmt Switch | Manual intervention or standby switch |

In the illustrated example of FIG. 4, the hardware layer 402 includes an example HMS monitor 428 to monitor the operational status and health of the HMS 208, 214. The example HMS monitor 428 is an external entity outside of the context of the HMS 208, 214 that detects and remediates failures in the HMS 208, 214. That is, the HMS monitor 428 is a process that nuts outside the HMS daemon to monitor the daemon. For example, the HMS monitor 428 can run alongside the HMS 208, 214 in the same management switch 207, 213 as the HMS 208, 214. The example HMS monitor 428 is configured to monitor for Type 1 failures of Table 1 above and restart the HMS daemon when required to remediate such failures. The example HMS monitor 428 is also configured to invoke a HMS maintenance mode daemon to monitor for Type 2 failures of Table 1 above. In examples disclosed herein, an HMS maintenance mode daemon is a minimal HMS agent that functions as a basic backup of the HMS 208, 214 until the Type 2 failure of the HMS 208, 214 is resolved.

The example virtualization layer 404 includes the virtual rack manager (VRM) 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with components of the virtual system solutions provider described in connection with FIG. 1 such as an example VMware vSphere® virtualization infrastructure components suite 408, an example VMware vCenter® virtual infrastructure server 410, an example ESXi™ hypervisor component 412, an example VMware NSX® network virtualization platform 414 (e.g., a network virtualization component or a network virtualizer), an example VMware NSX® network virtualization manager 410, and an example VMware vSAN™ network data storage virtualization component 418 (e.g., a network data storage virtualizer). In the illustrated example, the VRM 225, 227 communicates with these components to manage and present the logical view of underlying resources such as hosts and clusters. The example VRM 225, 227 also uses the logical view for orchestration and provisioning of workloads. Additional details of the VRM 225, 227 are disclosed below in connection with FIG. 5.

The VMware vSphere® virtualization infrastructure components suite 408 of the illustrated example is a collection of components to setup and manage a virtual infrastructure of servers, networks, and other resources. Example components of the VMware vSphere® virtualization infrastructure components suite 408 include the example VMware vCenter® virtual infrastructure server 410 and the example ESXi™ hypervisor component 412.

The example VMware vCenter® virtual infrastructure server 410 provides centralized management of a virtualization infrastructure (e.g., a VMware vSphere® virtualization infrastructure). For example, the VMware vCenter® virtual infrastructure server 410 provides centralized management of virtualized hosts and virtual machines from a single console to provide IT administrators with access to inspect and manage configurations of components of the virtual infrastructure.

The example ESXi™ hypervisor component 412 is a hypervisor that is installed and runs on servers (e.g., the example physical servers 616 of FIG. 6) in the example physical resources 224, 226 to enable the servers to be partitioned info multiple logical servers to create virtual machines.

The example VMware NSX® network virtualization platform 414 (e.g., a network virtualization component or a network virtualizer) virtualizes network resources such as physical hardware switches (e.g., the physical switches 618 of FIG. 6) to provide software-based virtual networks. The example VMware NSX® network virtualization platform 414 enables treating physical network resources (e.g., switches) as a pool of transport capacity. In some examples, the VMware NSX® network virtualization platform 414 also provides network and security services to virtual machines with a policy driven approach.

The example VMware NSX® network virtualization manager 416 manages virtualized network resources such as physical hardware switches (e.g., the physical switches 618 of FIG. 6) to provide software-based virtual networks. In the illustrated example, the VMware NSX® network virtualization manager 416 is a centralized management component of the VMware NSX® network virtualization platform 414 and runs as a virtual appliance on an ESXi host (e.g., one of the physical servers 616 of FIG. 6 running an ESXi™ hypervisor 412). In the illustrated example, a VMware NSX® network virtualization manager 416 manages a single vCenter server environment implemented using the VMware vCenter® virtual infrastructure server 410. In the illustrated example, the VMware NSX® network virtualization manager 416 is in communication with the VMware vCenter® virtual infrastructure server 410, the ESXi™ hypervisor component 412, and the VMware NSX® network virtualization platform 414.

The example VMware vSAN™ network data storage virtualization component 418 is software-defined storage for use in connection with virtualized environments implemented using the VMware vSphere® virtualization infrastructure components suite 408. The example VMware vSAN™ network data storage virtualization component clusters server-attached hard disk drives (HDDs) and solid state drives (SSDs) to create a shared datastore for use as virtual storage resources in virtual environments.

Although the example VMware vSphere® virtualization infrastructure components suite 408, the example VMware vCenter® virtual infrastructure server 410, the example ESXi™ hypervisor component 412, the example VMware NSX® network virtualization platform 414, the example VMware NSX® network virtualization manager 416, and the example VMware vSAN™ network data storage virtualization component 418 are shown in the illustrated example as implemented using products developed and sold by VMware, Inc., some or all of such components may alternatively be supplied by components with the same or similar features developed and sold by other virtualization component developers.

The virtualization layer 404 of the illustrated example, and its associated components are configured to run virtual machines. However, in other examples, the virtualization layer 404 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 206 of the illustrated example enables abstracting the physical hardware resources 224, 226. In some examples, the virtual server rack 206 includes a set of physical units (e.g., one or more racks) with each unit including hardware 224, 226 such as server nodes (e.g., compute+storage+network links), network switches, and, optionally, separate storage units. From a user perspective, the example virtual server rack 206 is an aggregated pool of logic resources exposed as one or more vCenter ESXi™ clusters along with a logical storage pool and network connectivity. In examples disclosed herein, a cluster is a server group in a virtual environment. For example, a vCenter ESXi™ cluster is a group of physical servers (e.g., example physical servers 616 of FIG. 6) in the physical hardware resources 224, 226 that run ESXi™ hypervisors (developed and sold by VMware, Inc.) to virtualize processor, memory, storage, and networking resources into logical resources to run multiple virtual machines that run operating systems and applications as if those operating systems and applications were running on physical hardware without an intermediate virtualization layer.

In the illustrated example, the example OAM component 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM component 406 is configured to provide different services such as heat-map service, capacity planner service, maintenance planner service, events and operational view service, and virtual rack application workloads manager service.

In the illustrated example, a heat map service of the CAM component 406 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM component 406 checks against available resources and looks for potential bottlenecks before deployment of an application workload. Example capacity planner service also integrates additional rack units in the collection/stack when capacity is expanded.

In the illustrated example, the maintenance planner service of the OAM component 406 dynamically triggers a set of logical operations to relocate virtual machines (VMs) before starting maintenance on a hardware component to increase the likelihood of substantially little or no downtime. The example maintenance planner service of the OAM component 406 creates a snapshot of the existing state before starting maintenance on an application. The example maintenance planner service of the OAM component 406 automates software upgrade/maintenance by creating a clone of the machines and proceeds to upgrade software on clones, pause running machines, and attaching clones to a network. The example maintenance planner service of the OAM component 406 also performs rollbacks if upgrades are not successful.

In the illustrated example, an events and operational views service of the OAM component 406 provides a single dashboard for logs by feeding to Log Insight. The example events and operational views service of the OAM component 406 also correlates events from the heat map service against logs (e.g., a server starts to overheat, connections start to drop, lots of HTTP/503 from App servers). The example events and operational views service of the OAM component 406 also creates a business operations view (e.g., a top down view from Application Workloads⇒Logical Resource View⇒Physical Resource View). The example events and operational views service of the OAM component 406 also provides a logical operations view (e.g., a bottom up view from Physical resource view⇒vCenter ESXi Cluster View⇒VM's view).

In the illustrated example, the virtual rack application workloads manager service of the OAM component 406 uses vCAC and vCAC enterprise services to deploy applications to vSphere hosts. The example virtual rack application workloads manager service of the OAM component 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM component 406 optimizes applications and virtual storage area network (vSAN) arrays to have high data resiliency and best possible performance at same time.

Figure 5:
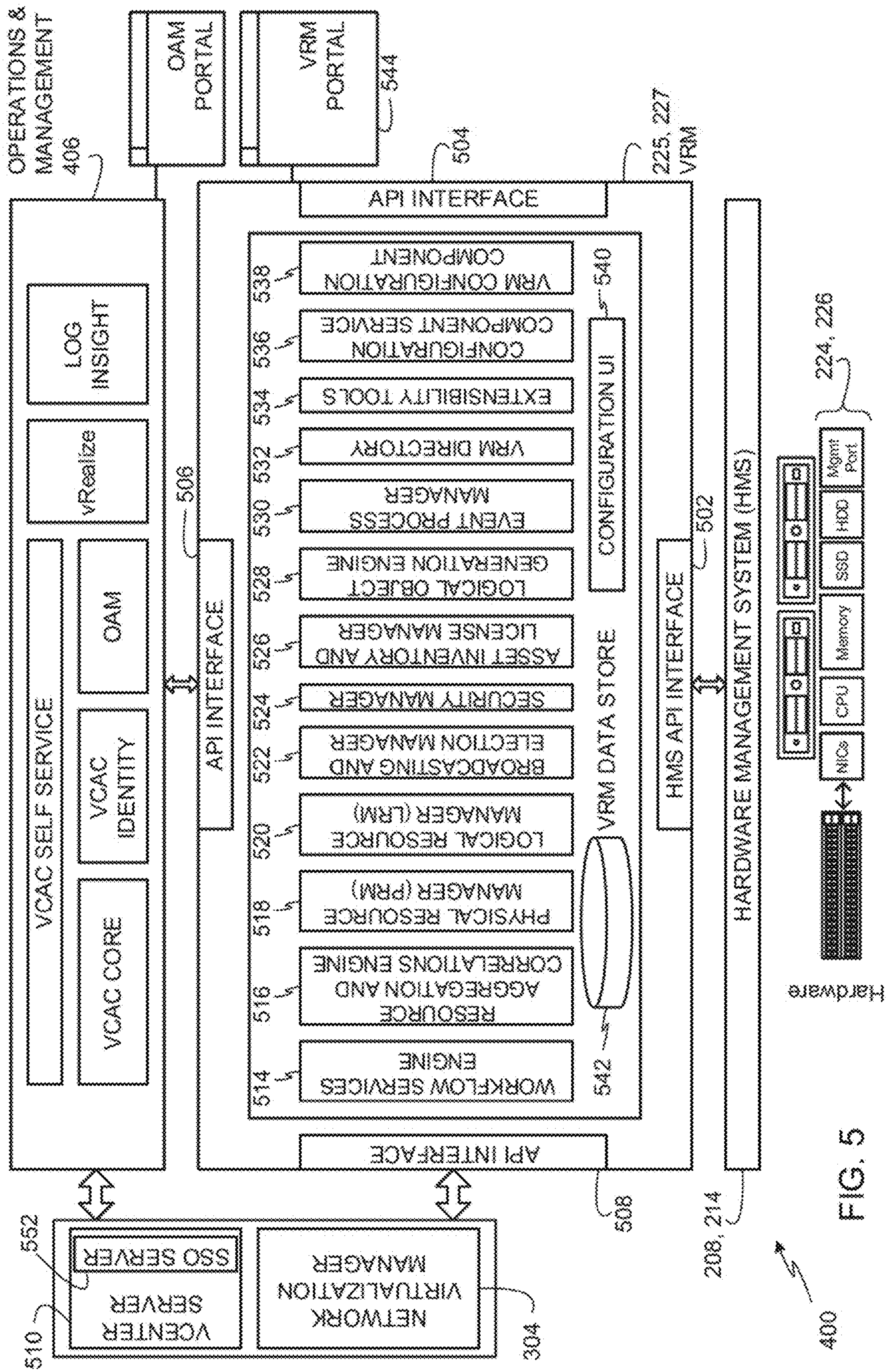
FIG. 5 depicts the example hardware management system (HMS) of FIGS. 2-4 interfacing between the example hardware and an example virtual resource manager (VRM) of FIGS. 2 and 4.

FIG. 5 depicts another view of the example architecture 400 of FIG. 4 showing the example HMS 208, 214 of FIGS. 2-4 interfacing between the example physical hardware resources 224, 226 of FIGS. 2-4 and the example VRM 225, 227 of the example architecture 400 of FIG. 4. In the illustrated example, the VRM 225, 227 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the VRM 225, 227. Such communications may include sending information to the VRM 225, 227, requesting information from the VRM 225, 227, requesting the VRM 225, 227 to perform operations, configuring the VRM 225, 227, etc. For example, an HMS API interface 502 of the VRM 225, 227 is to facilitate communications between the HMS 208, 214 and the VRM 225, 227, another API interface 506 of the VRM 225, 227 is to facilitate communications between the operations and management component 406 and the VRM 225, 227, and another API interface 508 of the VRM 225, 227 is to facilitate communications between the VRM 225, 227 and the network virtualization manager 304 and a vCenter server 510. Another API interface 504 of the VRM 225, 227 may be used to facilitate communications between the VRM 225, 227 and user interfaces for use by administrators to manage the VRM 225, 227.

The example VRM 225, 227 communicates with the HMS 208, 214 via the HMS API interface 502 to manage the physical hardware resources 224, 226. For example, the VRM 225, 227 obtains and maintains inventory of the physical hardware resources 224, 226 through communications with the HMS 208, 214. The example VRM 225, 227 also uses the HMS 208, 214 to discover new hardware (e.g., the physical hardware resources 224, 226) and adds newly discovered hardware to inventory. The example VRM 225, 227 is also configured to manage the physical hardware resources 224, 226 within the virtual server rack 206 by using the per-rack HMS 208, 214. The example VRM 225, 227 maintains the notion of fault domains and uses those domains in its mapping of logical resources (e.g., virtual resources) to the physical hardware resources 224, 226. In response to notification of hardware events from the HMS 208, 214, the example VRM 225, 227 handles addition/removal of physical hardware resources 224, 226 (e.g., servers or switches at a physical rack level), addition of new rack units, maintenance, and hard shutdowns/resets. The example VRM 225, 227 also translates physical sensor data and alarms to logical events.

In the illustrated example of FIG. 5, a software stack of the VRM 225, 227 includes an example work flow services engine 514, an example resource aggregation and correlations engine 516, an example physical resource manager (PRM) 518, an example logical resource manager (LRM) 520, an example broadcasting and election manager 522, an example security manager 524, an example asset inventory and license manager 526, an example logical object generation engine 528, an example event process manager 530, an example VRM directory 532, example extensibility toots 534, an example configuration component service 536, an example VRM configuration component 538, and an example configuration user interface (UI) 540. The example VRM 225, 227 also includes an example VRM data store 542. The example work flow services engine 514 is provided to manage the workflows of services provisioned to be performed by resources of the virtual server rack 206. The example resource aggregation and correlations engine 516 is provided to aggregate logical and physical resources and to coordinate operations between the logical and physical resources for allocating to services to be performed by the virtual server rack 206. The example PRM 518 is provided to provision, maintain, allocate, and manage the physical hardware resources 224, 226 for use by the virtual server rack 206 for provisioning and allocating logical resources. The example LRM 520 is provided to provision, maintain, allocate, and manage logical resources.

The example broadcasting and election manager 522 is provided to broadcast or advertise capabilities of the virtual server rack 206. For example, services seeking resources of virtual server racks may obtain capabilities (e.g., logical resources) that are available from the virtual server rack 206 by receiving broadcasts or advertisements of such capabilities from the broadcasting and election manager 522. The broadcasting and election manager 522 is also configured to identify resources of the virtual server rack 206 that have been requested for allocation. The example security manager 524 is provided to implement security processes to protect from misuse of resources of the virtual server rack 206 and/or to protect from unauthorized accesses to the virtual server rack 206.

In the illustrated example, the broadcasting and election manager 522 is also provided to manage an example primary VRM selection process. In examples disclosed herein, a primary VRM selection process is performed by the VRM 225, 227 to determine a VRM that is to operate as the primary VRM for a virtual server rack. For example, as shown in FIG. 2, the example virtual server rack 206 includes the first VRM 225 that runs in the first physical rack 202, and the second VRM 227 that runs in the second physical rack 204. In the illustrated example of FIG. 2, the first VRM 225 and the second VRM 227 communicate with each other to perform the primary VRM selection process. For example, the VRM 225 may perform a process to obtain information from the second VRM 227 and execute an algorithm to decide whether it (the first VRM 225) or the second VRM 227 are to be the primary VRM to manage virtual resources of all the physical racks 202, 204 of the virtual server rack 206. In some examples, the broadcasting and election manager 522 instantiates a zookeeper of the corresponding VRM 225, 227. In some examples, the broadcasting and election manager 522 performs the primary VRM selection process as part of the zookeeper.

The example asset inventory and license manager 526 is provided to manage inventory of components of the virtual server rack 206 and to ensure that the different components of the virtual server rack 206 are used in compliance with licensing requirements. In the illustrated example, the example asset inventory and license manager 526 also communicates with licensing servers to ensure that the virtual server rack 206 has up-to-date licenses in place for components of the virtual server rack 206. The example logical object generation engine 528 is provided to generate logical objects for different portions of the physical hardware resources 224, 226 so that the logical objects can be used to provision logical resources based on the physical hardware resources 224, 226. The example event process manager 530 is provided to manage instances of different processes running in the virtual server rack 206. The example VRM directory 532 is provided to track identities and availabilities of logical and physical resources in the virtual server rack 206. The example extensibility tools 534 are provided to facilitate extending capabilities of the virtual server rack 206 by adding additional components such as additional physical racks to form the virtual server rack 206.

The example configuration component service 536 finds configuration components for virtualizing the physical rack 202, 204 and obtains configuration parameters that such configuration components need for the virtualization process. The example configuration component service 536 calls the configuration components with their corresponding configuration parameters and events. The example configuration component service 536 maps the configuration parameters to user interface properties of the example configuration UI 540 for use by administrators to manage the VRM 225, 227 through an example VRM portal 544. The example VRM portal 544 is a web-based interface that provides access to one or more of the components of the VRM 225, 227 to enable an administrator to configure the VRM 225, 227.

The example VRM configuration component 538 implements configurator components that include configuration logic for configuring virtualization components of the example virtualization layer 404 of FIG. 4.

The example VRM data store 542 is provided to store configuration information, provisioning information, resource allocation information, and/or any other information used by the VRM 225, 227 to manage hardware configurations, logical configurations, workflows, services, etc. of the virtual server rack 206.

Upon startup of the VRM 225, 227 of the illustrated example, the VRM 225, 227 is reconfigured with new network settings. To reconfigure the new network settings across backend components (e.g., the VMware vCenter® virtual infrastructure server 410, the ESXi™ hypervisor component 412, the VMware NSX® network virtualization platform 414, the VMware NSX® network virtualization manager 416, and the VMware vSAN™ network data storage virtualization component 418 of FIG. 4), the VRM 225, 227 serves the example configuration UI 540 to make configuration parameters accessible by an administrator. The VRM 225, 227 of the illustrated example allows a component to be plugged in and participate in IP address allocation/reallocation. For example, an IP reallocation service may be accessible via the configuration UI 540 so that a user can call the IP reallocation service upon plugging in a component. The example VRM 225, 227 logs status messages into the VRM data store 542, provides status updates to the configuration UI 540, and provides failure messages to the configuration UI 540. The example VRM 225, 227 allows components (e.g., the example VMware vCenter® virtual infrastructure server 410 of FIG. 4, the example ESXi™ hypervisor component 412 of FIG. 4, the example VMware NSX® network virtualization platform 414 of FIG. 4, the example VMware NSX® network virtualization manager 416 of FIG. 4, the example VMware vSAN™ network data storage virtualization component 418 of FIG. 4, and/or any other physical and/or virtual components) to specify the number of IP addresses required, including zero if none are required. In addition, the example VRM 225, 227 allows components to specify their sequence number which can be used by the VRM 225, 227 during an IP reallocation process to call the components to allocate IP addresses. The example VRM 225, 227 also enables configuration sharing through common objects so that components can obtain new and old IP Addresses of other components. The example VRM 225, 227 stores IP addresses of the components in the VRM data store 542.

In the illustrated example, the operations and management component 406 is in communication with the VRM 225, 227 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the VRM 225, 227 to instantiate, manage, and communicate with virtual networks and virtual infrastructures. For example, the network virtualization manager 304 of the illustrated example may be implemented using the VMware NSX® network virtualization manager 416 of FIG. 4 to virtualize network resources such as physical hardware switches to provide software-based virtual networks. The example vCenter server 510 provides a centralized and extensible platform for managing virtual infrastructures. For example, the vCenter server 510 may be implemented using the VMware vCenter® virtual infrastructure server 410 of FIG. 4 to provide centralized management of virtual hosts and virtual machines from a single console. The vCenter server 510 of the illustrated example communicates with the VRM 225, 227 via the API interface 508 to provide administrators with views of and access to configurations of the virtual server rack 206.

The vCenter server 510 of the illustrated example includes an example Single Sign On (SSO) server 552 to enable administrators to access and/or configure the VRM 225, 227. The example SSO server 552 may be implemented using a web browser SSO profile of Security Assertion Markup Language 2.0 (SAML 2.0). In the illustrated example, a SSO user interface of the SSO server 552 is accessible through the example VRM portal 544. In this manner, the VRM 225, 227 is made accessible yet protected using a SSO profile.

Figure 6:
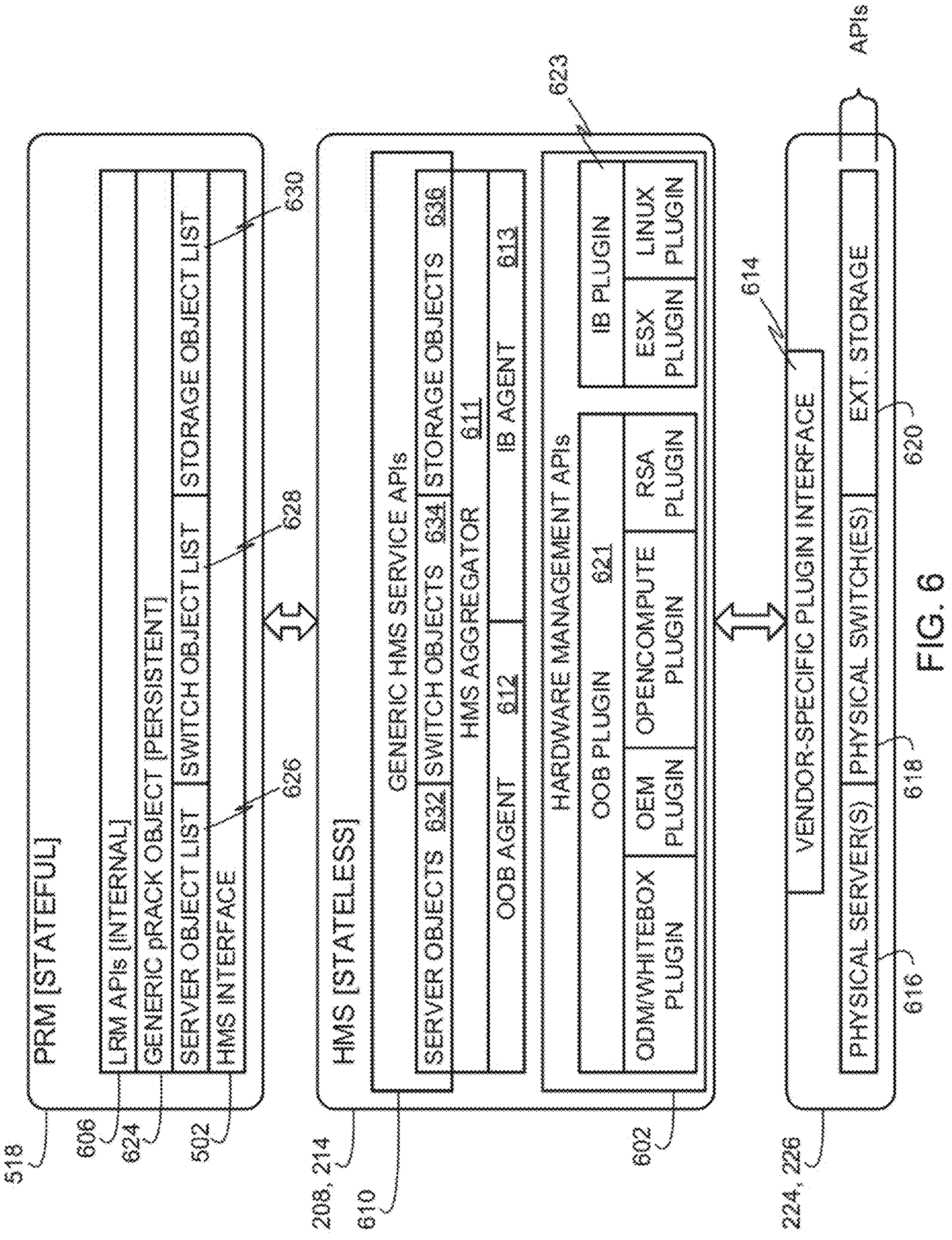
FIG. 6 depicts an example hardware management application program interface (API) of the HMS of FIGS. 2-5 that is between example hardware resources and an example physical rack resource manager (PRM).

FIG. 6 depicts example hardware management application program interfaces (APIs) 602 of the HMS 208, 214 of FIGS. 2-5 that are between the example physical hardware resources 224, 226 of FIGS. 2-5 and the example PRM 518. The example PRM 518 is a component of the VRM 225, 227 (FIGS. 4 and 5) in the software stack of the virtual server rack 206 (FIG. 2). An example PRM 518 is provided in each physical rack 202, 204 and is configured to manage corresponding physical hardware resources 224, 226 of the corresponding physical rack 202, 204 (FIG. 2) and to maintain a software physical rack object for the corresponding physical rack 202, 204. The example PRM 518 interfaces with the corresponding HMS 208, 214 of the same physical rack 202, 204 to manage individual physical hardware resources 224, 226. In some examples, the PRM 518 runs an HMS monitor thread (e.g., similar or part of the HMS monitor 428 of FIG. 4) to monitor a management switch 207, 213 that runs the HMS 208, 214 for Type 4 and Type 5 failures shown in Table 1 above, in some examples, the HMS monitor thread in the PRM 518 also monitors for some Type 3 failures shown in Table 1 above when an OS of the management switch 207, 213 needs external intervention.

In the illustrated example, the PRM 518 provides a set of LRM API's 606 for use of the physical rack object (e.g., the generic pRACK object 624 of FIG. 6) by the example LRM 520 (FIG. 5). The example LRM 520 interacts with individual PRM 518 instances to employ physical resources based on physical resource requirements of the LRM 520. In some examples, the PRM 518 runs as part of an LRM application on a given server node in a virtual server rack 206. In the illustrated example, the LRM 520 is implemented using Java on Linux. However, any other programming language and any other operating system may be used. The PRM 518 of the illustrated example runs in an x86-based Linux Virtual Machine environment as part of the VRM 225, 227 on a designated server node in the physical rack 202, 204.

In the illustrated example of FIG. 6, the HMS 208, 214 publishes a set of generic HMS service APIs 610 for use by original equipment manufacturers (OEMs) to integrate hardware or software with the software stack of the virtual server rack 206. In the illustrated example, the integration point for OEM components is the hardware management APIs 602. In the illustrated example, vendor-specific plugin interfaces 614 may be developed for use by the hardware management API 602 to facilitate communications with physical hardware resources 224, 226 of particular vendors having vendor-specific interfaces. In the illustrated example, such vendor-specific plugin interfaces 614 interface to corresponding physical hardware resources 224, 226 using interface protocols supported by the underlying hardware components (e.g., an IPMI API, a representational state transfer (REST) API, an extensible markup language (XML) API, a hypertext transfer protocol (HTTP) API, a customer information model (CIM) API, etc.). In the illustrated example, the physical hardware resources 224, 226 are shown as one or more physical server(s) 616, one or more physical switch(es) 618, and external storage 620. The physical switches 618 of the illustrated example include the management switch 207, 213 and the ToR switches 210, 212, 216, 218 of FIG. 2.

In the illustrated example, the HMS 208, 214 provides the set of example generic HMS service APIs 610 for use by the PRM 518 to access use of virtual resources based on the physical hardware resources 224, 226. In the illustrated example, the generic HMS service APIs 610 are not specific to any particular vendor and/or hardware and are implemented using a REST/JSON (JavaScript object notation) API protocol. However, any other API protocol may be used. The example generic HMS service APIs 610 act on the underlying physical hardware resources 224, 226, which are encapsulated in a set of software objects such as server objects 632, switch objects 634, and storage objects 636. In the illustrated example, the HMS 208, 214 maintains the server objects 632, the switch objects 634, and the storage objects 636, and their associated properties. In the illustrated example, the HMS 208, 214 runs the generic HMS service APIs 610 on the example server host node (0) 209, 211 (FIG. 2) to interface with the example PRM 518 and to an example HMS aggregator 611. The example HMS aggregator 611 runs on the example server host node (0) 209, 211 to aggregate data from an example OOB agent 612 and an example IB agent 613 to expose such data to the PRM 518 and, thus, the VRM 225, 227 (FIGS. 2, 4, and 5). In addition, the HMS aggregator 611 obtains data from the PRM 518 and parses the data out to corresponding ones of the OOB agent 612 for communicating to the physical hardware resources 224, 226, and to the IB agent 613 for communicating to software components. In the illustrated example, the OOB agent 612 runs on the management switch 207, 213, and the IB agent 613 runs on the server host node (0) 209, 211. The example OOB agent 612 interfaces with the physical resources 224, 226 and interfaces with the HMS aggregator 611. The example IB agent 613 interfaces with operating systems and interfaces with the HMS aggregator 611. That is, in the illustrated example, the OOB agent 612 is configured to communicate with vendor hardware via vendor-specific interfaces. The example IB agent 613 is configured to communicate with OS-specific plugins and does not communicate directly with hardware. Instead, the IB agent 613 communicates with operating systems to obtain information from hardware when such information cannot be obtained by the OOB agent 612. For example, the OOB agent 612 may not be able to obtain all types of hardware information (e.g., hard disk drive or solid state drive firmware version). In such examples, the IB agent 613 can request such hardware information from operating systems.

In examples disclosed herein, server and switch plugin APIs are to be implemented by vendor-supplied plugins for vendor-specific hardware. For example, such server and switch plugin APIs are implemented using OOB interfaces according to an HMS specification. For vendor-specific plugin interfaces 614 that do not support OOB communication based on the vendor-supplied plugin, the HMS 208, 214 implements an IB plugin 623 to communicate with the vendor's hardware via an operating system plugin using IB communications. For example, the IB plugin 623 in the HMS 208, 214 interfaces to the operating system running on the server node (e.g., the server node implemented by the vendor's hardware) using an OS-provided mechanism such as OS APIs (e.g., vSphere APIs), OS command line interfaces (CLI) (e.g., ESX CLI), and/or Distributed Management Task Force (DMTF) Common Information Model (CIM) providers.

The example HMS 208, 214 internally maintains the hardware management API 602 to service API requests received at the generic HMS service APIs 610. The hardware management API 602 of the illustrated example is vendor-specific and is implemented as a vendor-specific plugin to the HMS 208, 214. The hardware management API 602 includes example OOB plugins 621 to interface with vendor-specific plugin interfaces 614 to communicate with the actual physical hardware resources 224, 226. For example, the OOB plugin 621 interlaces with the example OOB agent 612 to exchange data between the generic HMS service APIs 610 and the vendor-specific plugin interface 614. Example vendor-specific interfaces 614 may be proprietary to corresponding OEM vendors for hardware management. Regardless of whether the vendor-specific interfaces 614 are proprietary, or part of an industry standard or open interface, the published hardware management API 602 is configured to work seamlessly between the PRM 518 and the physical hardware resources 224, 226 to manage the physical hardware resources 224, 226. To communicate with the physical hardware resources 224, 226 via operating systems, the hardware management API 602 is provided with an example IB plugin 623. That is, in the illustrated example, the IB plugin 623 operates as an OS plugin for the IB agent 613 to communicate with operating systems.

In the illustrated examples, the HMS 208, 214 uses the example OOB agent 612 and the example OOB plugin 621 for OOB management of the physical hardware resources 224, 226, and uses the example IB agent 613 and the example IB plugin 623 for IB management of the physical hardware resources 224, 226. In examples disclosed herein, OOB components such as the OOB agent 612 and the OOB plugin 621 run in the management switch 207, 213, and IB components such as the IB agent 613, the IB plugin 623, the generic HMS service APIs 610, and the HMS aggregator run 611 in the server host node (0) 209, 211. Such separation of IB management and OOB management components of the HMS 208, 214 facilitates increased resiliency of HMS 208, 214 in case of failure of either of the IB management channel or the OOB management channel. Such IB and OOB management separation also simplifies the network configuration of the ToR switches 210, 212, 216, 218 (FIGS. 2 and 3) and keeps the management network isolated for security purposes. In examples disclosed herein, a single generic API interface (e.g., a REST API, a JSON API, etc.) implementing the example generic HMS service APIs 610 is provided between the PRM 518 and the HMS 208, 214 to facilitate hiding all hardware and vendor specificities of hardware management in the HMS 208, 214 and isolating the complexity of such hardware and vendor specificities from upper layer processes in the PRM 518 and/or a LRM 520.

In examples disclosed herein, the HMS 208, 214 uses an IPMI/DCMI (Data Center Manageability Interface) for OOB management. Example OOB operations performed by the HMS 208, 214 include discovery of new hardware, bootstrapping, remote power control, authentication, hard resetting of non-responsive hosts, monitoring catastrophic hardware failures, and firmware upgrades. In examples disclosed herein, an Integrated BMC (baseboard management controller) Embedded local area network (LAN) channel is used for OOB management of server hosts 616. In examples disclosed herein, one dedicated interface is enabled for OOB management traffic. In such examples, the interface is enabled for dynamic host configuration protocol (DHCP) and connected to a management switch (e.g., the management switch 207, 213 running the HMS 208, 214). In examples disclosed herein, an administrative user is created to operate the dedicated interface for OOB management traffic. An example HMS OOB thread uses IPMI commands to discover and manage server nodes 616 over the dedicated interface for OOB management traffic. Example IPMI features that may be used over the Integrated BMC Embedded LAN for OOB management traffic include the following properties and sensors.

Properties
Device ID
Cold Reset
Get Self Test Results
Set/Get ACPI Power State
Set/Get User Name
Set/Get User Access
Set/Get User Password
Get Chassis Status
Chassis Control Power Down/Up/Power Cycle/Hard Reset
Chassis Identity
Set/Get System Boot Options
Get System Restart Cause
Set/Get LAN configuration
DHCP Host Name
Authentication Type Support
Authentication Type Enable
Primary RMCP Port Number
Default Gateway
Sensors
Power Unit Status
BMC Firmware Health
HDD status
Processor Status
Processor DIMM
Processor Temperature The example HMS 208, 214 uses IB management to periodically monitor status and health of the physical resources 224, 226 and to keep server objects 632 and switch objects 634 up to date. In examples disclosed herein, the HMS 208, 214 uses Distributed Management Task Force (DMTF) Common Information Model (CIM) providers in a VMware ESXi™ hypervisor and CIM client for IB management. The CIM is the software framework used for managing hardware devices and services defined by the DMTF and supported in the VMware ESXi™ hypervisor. CIM providers are classes that receive and fulfill client requests dispatched to them by a CIM object manager (CIMOM). For example, when an application requests dynamic data from the CIMOM, it uses the CIM provider interfaces to pass the request to the CIM provider. Example IB operations performed by the HMS 208, 214 include controlling power state, accessing temperature sensors, controlling BIOS (Basic Input/Output System) inventory of hardware (e.g., CPUs, memory, disks, etc.), event monitoring, and logging events. In examples disclosed herein, the main components that the HMS 208, 214 monitors using IB management are I/O devices (e.g., Network Interface Cards, PCI-e interfaces, and Disk Drives). In examples disclosed herein, the HMS 208, 214 uses CIM providers to monitor such I/O devices. Example CIM providers may be developed as VMware ESXi™ hypervisor userworlds to interface with drivers corresponding to I/O devices being monitored to gather data pertaining to those I/O devices. In some examples, the CIM providers are C++ classes, which define sets of objects and corresponding properties for use by the HMS 208, 214 to fetch data from the underlying physical resources 224, 226 (e.g., hardware I/O devices).

The PRM 518 of the illustrated example exposes a physical rack object and its associated sub-objects in a generic vendor neutral manner to the example LRM 520. Example sub-objects of the physical rack object include an example server object list 626 (e.g., a list of servers), an example switch object list 628 (e.g., a list of switches), and a storage object list 630 (e.g., a list of external storage). The example PRM 518 communicates with the example HMS 208, 214 using the example generic HMS service APIs 610 to manage physical resources (e.g., hardware) in the physical rack 202, 204, and to obtain information and inventory of physical resources available in the physical rack 202, 204. In the illustrated example, the HMS 208, 214 executes instructions from the PRM 518 that are specific to underlying physical resources based on the hardware management APIs 602 of those physical resources. That is, after the HMS 208, 214 receives an instruction via a generic HMS service APIs 610 from the PRM 518 that corresponds to an action on a particular physical resource in the physical rack 202, 204, the HMS 208, 214 uses the example hardware management APIs 602 to issue a corresponding instruction to the particular physical resource using a hardware management API of that particular physical resource. In this manner, the PRM 518 need not be configured to communicate with numerous different APIs of different physical resources in the physical rack 202, 204. Instead, the PRM 518 is configured to communicate with the HMS 208, 214 via the generic HMS service APIs 610, and the HMS 208, 214 handles communicating with numerous different, specific APIs of different physical resources through the example hardware management API 602. By using the generic HMS service APIs 610 for the PRM 518 to interface with and manage physical resources through the HMS 208, 214, the physical racks 202, 204 may be configured or populated with hardware from numerous different manufacturers without needing to significantly reconfigure the PRM 518. That is, even if such manufacturers require use of different APIs specific to their equipment, the HMS 208, 214 is configured to handle communications using such different APIs without changing how the PRM 518 uses the generic HMS service APIs 610 to communicate with the physical resources via the HMS 208, 214. Thus, the separation of the example generic HMS service APIs 610 from the example hardware management API 602 allows the HMS 208, 214 to integrate seamlessly with hardware from ODMs, OEMs, and other vendors independently of the generic HMS service APIs 610 provided by the HMS 208, 214 for use by the PRM 518 to manage such hardware.

The generic HMS service APIs 610 of the illustrated example supports numerous Get/Set events so that the HMS 208, 214 can support requests from the PRM 518. Such Get/Set events will work on software server and swatch object properties. Example Get/Set events of the generic HMS service APIs 610 include:

PRM_HMS_ACK_HANDSHAKE ( )

PRM_HMS_GET_RACK_INVENTORY (Server Obj[ ], Switch Obj[ ], . . . )

PRM_HMS_GET_SERVER_OBJECT_PROP (Key, Value)

PRM_HMS_SET_SERVER_OBJECT_PROP (Key, Value)

PRM_HMS_GET_SWITCH_OBJECT_PROP (Key, Value)

PRM_HMS_SET_SWITCH_OBJECT_PROP (Key, Value)

In the above example Get/Set events of the generic HMS service APIs 610, the 'Key' is the property ID listed as part of the server/switch object properties. The example PRM_HMS_ACK_HANDSHAKE ( ) event API enables the PRM 518 to perform an acknowledgment-based handshake with the HMS 208, 214 to establish a connection between the PRM 518 and the HMS 208, 214. The example PRM_HMS_GET_RACK_INVENTORY (Server Obj[ ], Switch Obj[ ], . . . ) API enables the PRM 518 to request the HMS 208, 214 to provide the hardware inventory of the physical rack 202, 204. The example PRM_HMS_GET_SERVER_OBJECT_PROP (Key, Value) API enables the PRM 518 to request a server object property from the HMS 208, 214. For example, the PRM 518 provides the 'Key' identifying the requested server object property ID, and the HMS 208, 214 returns the 'Value' of the requested server object property. The example PRM_HMS_SET_SERVER_OBJECT_PROP (Key, Value) API enables the PRM 518 to set a server object property via the HMS 208, 214. For example, the PRM 518 provides the 'Key' identifying the target server object property ID, and provides the 'Value' to set for the target server object property. The example PRM_HMS_GET_SWITCH_OBJECT_PROP (Key, Value) API enables the PRM 518 to request a switch object property from the HMS 208, 214. For example, the PRM 518 provides the 'Key' identifying the requested switch object property ID, and the HMS 208, 214 returns the 'Value' of the requested switch object property. The example PRM_HMS_SET_SWITCH_OBJECT_PROP (Key, Value) API enables the PRM 518 to set a switch object property via the HMS 208, 214. For example, the PRM 518 provides the 'Key' identifying the target switch object property ID, and provides the 'Value' to set for the target switch object property.

The PRM 518 of the illustrated example registers a set of callbacks with the HMS 208, 214 that the PRM 518 is configured to use to receive communications from the HMS 208, 214. When the PRM callbacks are registered, the HMS 208, 214 invokes the callbacks when events corresponding to those callbacks occur. Example PRM callback APIs that may be registered by the PRM 518 as part of the generic HMS service APIs 610 include:

PRM Callback APIs

HMS_PRM_HOST_FAILURE (Server Obj[ ], REASON CODE)

HMS_PRM_SWITCH_FAILURE (Swatch Obj[ ], REASON CODE)

HMS_PRM_MONITOR_SERVER_OBJECT (Key, Value, Update Frequency)

HMS_PRM_MONITOR_SWITCH_OBJECT (Key, Value, Update Frequency)

The example HMS_PRM_HOST_FAILURE (Server Obj[ ], REASON CODE) callback enables the HMS 208, 214 to notify the PRM 518 of a failure of a host (e.g., a physical server) in the physical rack 202, 204. The example HMS_PRM_SWITCH_FAILURE (Switch Obj[ ], REASON CODE) callback enables the HMS 208, 214 to notify the PRM 518 of a failure of a switch of the physical rack 202, 204. The example HMS_PRM_MONITOR_SERVER_OBJECT (Key, Value, Update Frequency) callback enables the HMS 208, 214 to send monitor updates to the PRM 518 about a server object. In the illustrated example, 'Key' identifies the server object to which the update corresponds, 'Value' includes the updated information monitored by the HMS 208, 214 for the server object, and 'Update Frequency' indicates the frequency with which the server object monitor update callbacks are provided by the HMS 208, 214 to the PRM 518. The example HMS_PRM_MONITOR_SWITCH_OBJECT (Key, Value, Update Frequency) callback enables the HMS 208, 214 to send monitor updates to the PRM 518 about a switch object. In the illustrated example, 'Key' identifies the switch object to which the update corresponds, 'Value' includes the updated information monitored by the HMS 208, 214 for the switch object, and 'Update Frequency' indicates the frequency with which the switch object monitor update callbacks are provided by the HMS 208, 214 to the PRM 518.

The example generic HMS service APIs 610 provide non-maskable event types for use by the HMS 208, 214 to notify the PRM 518 of failure scenarios in which the HMS 208, 214 cannot continue to function.

Non-Maskable Event HMS APIs

HMS_SOFTWARE_FAILURE (REASON CODE)

HMS_OUT_OF_RESOURCES (REASON CODE)

The example HMS_SOFTWARE_FAILURE (REASON CODE) non-maskable event API enables the HMS 208, 214 to notify the PRM 518 of a software failure in the HMS 208, 214. The example HMS_OUT_OF_RESOURCES (REASON CODE) non-maskable event API enables the HMS 208, 214 to notify the PRM 518 when the HMS 208, 214 is out of physical resources.

The HMS 208, 214 provides the example hardware management APIs 602 for use by the example generic HMS service APIs 610 so that the HMS 208, 214 can communicate with the physical resources 224, 226 based on instructions received from the PRM 518 via the generic HMS service APIs 610. The hardware management APIs 602 of the illustrated example interface with physical resource objects using their corresponding management interfaces, some of which may be vendor-specific interfaces. For example, the HMS 208, 214 uses the hardware management APIs 602 to maintain managed server, switch, and storage software object properties. Example hardware management APIs 602 for accessing server objects are shown below in Table 2.

TABLE 2

| Server Hardware Management APIs | | |
|---|---|---|
| API | Return Value | Description |
| DISCOVER_SERVER_INVENTORY ( ) A Node Object identifies a server hardware node (Node ID, MAC Address, Management IP Address) | Node object list | Used to discover all servers in a rack. Homogeneous hardware assumption Board information required for hardware identification to attach to the right plugin. |
| GET_CHASSIS_SERIAL_NUMBER(NODE_OBJECT) | Chassis serial number | Used to get chassis identifier |
| GET_BOARD_SERIAL_NUMBER (NODE_OBJECT) | Board serial number | Used to get board identifier |
| GET_MANAGEMENT_MAC_ADDR (NODE_OBJECT) | MAC address | Used to get MAC address of management port |
| SET_MANAGEMENT_IP_ADDR(NODE_OBJECT, IPADDR) | RC (Success/ Error Code) | Used to set management IP address |
| GET_CPU_POWER_STATE(NODE_OBJECT) | CPU powerstate | Used to get current power state [S0-S5] of CPU |
| SET_CPU_POWER_STATE(NODE_OBJECT, POWERSTATE) | RC | Used to set CPU power state |
| SET_SERVER_POWER_STATE(ON/OFF/CYCLE/ RESET) | RC | Used to power on, power off, power cycle, reset a server Cold reset - BMC reset, run Self Test Warm Reset - No Self Test |
| GET_SERVER_CPU_PROPERTIES(NODE_OBJECT, CPU_OBJECT) | RC | Used to get CPU specific information |
| SET_SERVER_CPU_PROPERTIES(NODE_OBJECT, CPU_OBJECT) | RC | Used to set CPU properties |
| GET_SERVER_MEMORY_PROPERTIES(NODE_OBJECT, MEM_OBJECT) | RC | Used to get memory properties |
| GET_SERVER_NETWORKCONTROLLER_PROPERTIES (NODE_OBJECT, NETWORKCONTROLLER_OBJECT [ ]) | RC | Used to get Network controller properties including LOM, NICS |
| SET_SERVER_NETWORKCONTROLLER_PROPERTIES (NODE_OBJECT, NETWORKCONTROLLER_OBJECT[ ]) | RC | Used to set NIC properties |
| GET_SERVER_DISK_PROPERTIES(NODE_OBJECT, DISK_OBJECT[ ]) | RC | Used to get Disk properties |
| SET_SERVER_DISK_PROPERTIES(NODE_OBJECT, DISK_OBJECT[ ]) | RC | Used to set Disk properties |
| GET_SERVER_DISK_SMART_DATA(NODE_OBJECT, SMART_OBJECT) | RC | Used to get SMART data for disk |
| SET_SERVER_SENSOR (NODE_OBJECT, SENSOR, VALUE, THRESHOLD) | RC | Used to set sensors for CPU/Memory/Power/ HDD |
| GET_SENSOR_STATUS (NODE_OBJECT, SENSOR, VALUE, UNITS, THRESHOLD) | RC | Used to get sensor data |
| GET_SYSTEM_EVENT_LOG_DATA( . . . ) | Used to get System event log data | |
| UPDATE_CPU_FIRMWARE(FILE . . . ) | Update CPU firmware | |
| UPDATE_DISK_FIRMWARE(FILE . . . ) | Update Disk Firmware | |
| UPDATE_NIC_FIRMWARE(FILE . . . ) | Update NIC firmware | |
| SET_CHASSIS_IDENTIFICATION (NODE_OBJECT, ON/OFF, NUMSECS) | LED/LCD/BEEP | |
| SET_BOOTOPTION(NODE_OBJECT, TYPE) | RC | Used to set bootoption SSD/PXE |
| GET_BOOTOPTION(NODE_OBJECT) | BOOT TYPE | Used to get bootoption |
| SET_CREATE_USER (NODE_OBJECT, USEROBJECT) | RC | Used to create a management user |

Example hardware management APIs 602 for accessing switch objects are shown below in Table 3.

TABLE 3

Switch Hardware Management APIs

| API | Return Value | Description |
|---|---|---|
| GET_CHASSIS_SERIAL_ID(NODE_OBJECT) | CHASSIS_IDENTIFIER | Used to identify a ToR Switch chassis |
| GET_MANAGEMENT_MAC(NODE_OBJECT) | MAC_ADDRESS | API to get Management port MAC address |
| SET_MANAGEMENT_IP(NODE_OBJECT, IP ADDR) | RC | API to set management IP address |
| GET_SWITCH_INVENTORY(NODE_OBJECT) | SWITCH_INVENTORY | Used to get switch hardware inventory (HW, Power supply, Fans, Transceiver etc.) |
| SWITCH_REBOOT(NODE_OBJECT) | RC | Used to reboot the switch |
| CREATE_SWITCH_USER(NODE_OBJECT, USER_OBJECT) | RC | Used to create a management user |
| GET_SWITCH_VERSION(NODE_OBJECT) | VERSION_OBJECT | Used to get Hardware and software version details |
| GET_SWITCH_HW_PLATFORM (NODE_OBJECT) | HARDWARE_CHIPSET_OBJECT | Used to get the switching ASIC information |
| APPLY_SWITCH_CONFIGURATION (NODE_OBJECT, CONFIG_FILE) | CONFIG_STATUS_OBJECT | Used to apply running configuration on a switch |
| DELETE_SWITCH_CONFIGURATION (NODE_OBJECT) | RC | Used to delete startup switch configuration |
| SET_LOG_LEVELS (NODE_OBJECT, LOG_LEVEL) | RC | Used to set log levels for alert, events and debug from the switch |
| GET_SWITCH_ENVIRONMENT(NODE_OBJECT, POWER_OBJ, COOLING_OBJ, TEMPERATURE_OBJ) | RC | Used to get environmental information from the switch for power, fans and temperature. |
| SET_LOCATOR_LED(NODE_OBJECT) | RC | Used to set locator LED of switch |
| GET_INTERFACE_COUNTERS(NODE_OBJECT, INT_OBJECT) | RC | Used to collect interface statistics |
| GET_INTERFACE_ERRORS(NODE_OBJECT, INT_OBJECT) | RC | Used to collect errors on switch interfaces |
| GET_INTERFACE_STATUS(NODE_OBJECT, INT_OBJECT) | RC | Used to get interface status |
| SET_INTERFACE_STAUS(NODE_OBJECT, INT_OBJECT) | RC | Used to set interface status |
| GET_INTERFACE_PHY_STATUS(NODE_OBJECT, INT_OBJECT) | RC | Used to get physical status of interface |
| GET_INTERFACE_SPEED(NODE_OBJECT, INT_OBJECT") | RC | Used to get the speed/auto negotiation mode |
| GET_VLAN_SUMMARY(NODE_OBJECT, VLAN_OBJECT) | RC | Get VLAN information Number of VLAN in use and ports connected to. |
| GET_VLAN_COUNTERS(NODE_OBJECT, VLAN_OBJECT) | RC | Get VLAN specific counters |
| GET_VXLAN_TABLE(NODE_OBJECT, VXLAN_TABLE) | RC | VXLAN address table |
| GET_VXLAN_COUNTERS(NODE_OBJECT, | RC | VXLAN specific |

TABLE 3-continued

| Switch Hardware Management APIs | | |
|---|---|---|
| API | Return Value | Description |
| VXLAN_OBJECT) | | counters |
| CLEAR_VLAN_COUNTERS | RC | Clear VLAN counters |
| CLEAR_VXLAN_COUNTERS | RC | Clear VXLAN counters |
| MONITOR_LINK_FLAPS(NODE_OBJECT, INT_OBJECT) | RC | Monitor link flaps |
| L3/MLAG/LAG STATUS | | |
| SET_PORT_MTU(NODE_OBJECT, MTU) | RC | Set Port MTU |
| SWITCH_OS_UPGRADE(FILE *) | RC | Ability to upgrade the OS on the switch |

In the illustrated example of FIG. 6, the PRM 518 maintains an example generic pRack object 624. The example generic pRack object 624 persists a list of the physical resources 224, 226 returned by the HMS 208, 214 and classified according to object types. The example generic pRack object 624 includes the following pRack object definition.

pRACK Object
Rack ID (Logical Provided by VRM 225, 227)
Manufacturer ID ( )
Number Server Objects
Server Object List 626
Switch Object List 628
HMS heartbeat timestamp In the pRack object definition above, the Rack ID is the logical identifier of the virtual server rack 206 (FIG. 2). The Manufacturer ID ( ) returns the identifier of the system integrator described in connection with FIG. 1 that configured the virtual server rack 206. The 'Number Server Objects' element stores the number of server objects configured for the virtual server rack 206. The 'Server Object List' 626 element stores a listing of server objects configured for the virtual server rack 206. The 'Switch Object List' 628 element stores a listing of switch objects configured for the virtual server rack 206. The 'HMS heartbeat timestamp' element stores timestamps of when the operational status (e.g., heartbeat) of the virtual server rack 206 is checked during periodic monitoring of the virtual server rack 206.

The example PRM 518 provides the LRM APIs 606 for use by the LRM 520 (FIG. 5) to access the elements above of the pRack object 624. In examples disclosed herein, the PRM 518 and the LRM 520 run in the same application. As such, the PRM 518 and the LRM 520 communicate with each other using local inter-process communication (IPC). Examples of Get/Set event APIs of the LRM APIs 606 include:

Get/Set Event LRM APIs
LRM_PRM_RECIEVE_HANDSHAKE_ACK ( )
LRM_PRM_GET_RACK_OBJECT (PRM_RACK_OBJECT [ ])
LRM_PRM_SET_SERVER_OBJECT_PROP (Key, Value)
LRM_PRM_GET_SERVER_STATS (Available, InUse, Faults)
LRM_PRM__SET_SERVER_CONFIG (SERVER_CONFIG_BUFFER)
LRM_PRM_SET_SWITCH_ADV_CONFIG (SWITCH_CONFIG_BUFFER)

In the Get/Set Event LRM APIs, the example LRM_PRM_RECIEVE_HANDSHAKE_ACK ( ) API may be used by the LRM 520 to establish a connection between the LRM 520 and the PRM 518. The example LRM_PRM_GET_RACK_OBJECT (PRM_RACK_OBJECT [ ]) API may be used by the LRM 520 to obtain an identifier of the rack object corresponding to the virtual server rack 206. The example LRM_PRM_SET_SERVER_OBJECT_PROP (Key, Value) API may be used by the LRM 520 to set a server object property via the PRM 518. For example, the LRM 520 provides the 'Key' identifying the target server object property ID, and provides the 'Value' to set for the target server object property. The example LRM_PRM_GET_SERVER_STATS (Available, InUse, Faults) API may be used by the LRM 520 to request via the PRM 518 operational status of servers of the physical resources 224, 226. For example, the PRM 518 may return an 'Available' value indicative of how many servers in the physical resources 224, 226 are available, may return an 'InUse' value indicative of how many servers in the physical resources 224, 226 are in use, and may return a 'Faults' value indicative of how many servers in the physical resources 224, 226 are in a fault condition. The example LRM_PRM_SET_SERVER_CONFIG (SERVER_CONFIG_BUFFER) API may be used by the LRM 520 to set configuration information in servers of the physical resources 224, 226. For example, the LRM 520 can pass a memory buffer region by reference in the 'SERVER_CONFIG_BUFFER' parameter to indicate a portion of memory that stores configuration information for a server. The example LRM_PRM_SET_SWITCH_ADV_CONFIG (SWITCH_CONFIG_BUFFER) may be used by the LRM 520 to set configuration information in switches of the physical resources 224, 226. For example, the LRM 520 can pass a memory buffer region by reference in the 'SWITCH_CONFIG_BUFFER' parameter to indicate a portion of memory that stores configuration information for a switch.

The LRM 520 of the illustrated example registers a set of callbacks with the PRM 518 that the LRM 520 is configured to use to receive communications from the PRM 518. When the LRM callbacks are registered, the PRM 518 invokes the callbacks when events corresponding to those callbacks occur. Example callbacks that may be registered by the LRM 520 include.

LRM Callback APIs
PRM_LRM_SERVER_DOWN (SERVER_ID, REASON_CODE)
PRM_LRM_SWITCH_PORT_DOWN (SERVER_ID, REASON_CODE)
PRM_LRM_SERVER_HARDWARE_FAULT (SERVER_ID, REASON_CODE)

The example PRM_LRM_SERVER_DOWN (SERVER_ID, REASON_CODE) callback API enables the PRM 518 to notify the LRM 520 when a server is down. The example PRM_LRM_SWITCH_PORT_DOWN (SERVER_ID, REASON_CODE) callback API enables the PRM 518 to notify the LRM 520 when a switch port is down. The example PRM_LRM_SERVER_HARDWARE_FAULT (SERVER_ID, REASON_CODE) callback API enables the PRM 518 to notify the PRM 518 to notify the LRM 520 when a server hardware fault has occurred.

The example generic HMS service APIs 610 provide non-maskable event types for use by the HMS 208, 214 to notify the PRM 518 of failure scenarios in which the HMS 208, 214 cannot continue to function.

Non-Maskable Event LRM APIs
PRM_SOFTWARE_FAILURE (REASON_CODE)
PRM_OUT_OF_RESOURCES (REASON_CODE)

The example PRM_SOFTWARE_FAILURE (REASON_CODE) non-maskable event API enables the PRM 518 to notify the LRM 520 when a software failure has occurred. The example PRM_OUT_OF_RESOURCES (REASON_CODE) non-maskable event API enables the PRM 518 to notify the LRM 520 when the PRM 518 is out of resources.

An example boot process of the virtual server rack 206 (FIGS. 2 and 4) includes an HMS bootup sequence, a PRM bootup sequence, and an HMS-PRM initial handshake. In an example HMS bootup sequence, when the management switch 207, 213 on which the HMS 208, 214 runs is powered-on and the OS of the management switch 207, 213 is up and running, a bootstrap script to initialize the HMS 208, 214 is executed to fetch and install an HMS agent software installer on the management switch 207, 213 to instantiate the HMS 208, 214. The HMS agent software installer completes install and initialization of the HMS agent software bundle and starts the HMS agent daemon to instantiate the HMS 208, 214. When the HMS agent daemon is started, the HMS 208, 214 determines the inventory of the physical resources 224, 226 of the physical rack 202, 204. It does this by using an IPMI discover API which sends broadcast remote management control protocol (RMCP) pings to discover IPMI-capable nodes (e.g., nodes of the physical resources 224, 226) on a known internal subnet. In such examples, management IP addresses for server nodes (e.g., server nodes of the physical resources 224, 226) and ToR switches (e.g., ToR switches 210, 212, 216, 218) will be known apriori and published for the HMS 208, 214 to discover as internal DHCP address ranges. For example, the server hosts and the ToR switches 210, 212, 216, 218 may be assigned IP addresses using a DHCP server running on the same management switch 207, 213 that runs the HMS 208, 214.

In an example PRM bootup sequence, the PRM 518 boots up as part of the VRM 225, 227. The example VRM 225, 227 initiates the PRM 518 process. During bootup, the example PRM 518 creates an empty physical rack object and waits for the HMS 208, 214 to initiate an HMS-PRM initial handshake. When the HMS-PRM initial handshake is successful, the example PRM 518 queries the HMS 208, 214 for the physical inventory (e.g., the inventory of the physical resources 224, 226) in the physical rack 202, 204. The PRM 518 then populates the physical rack object based on the physical inventory response from the HMS 208, 214. After the HMS-PRM initial handshake with the HMS 208, 214 and after the physical rack object initialization is complete, the example PRM 518 sends a message to the LRM 520 to indicate that the PRM 518 is ready for accepting requests. However, if initialization does not succeed after a certain time period, the example PRM 518 notifies the LRM 520 that the pRack initialization has failed.

In examples disclosed herein, the HMS 208, 214 initiates the HMS-PRM initial handshake during the PRM bootup sequence to establish a connection with the PRM 518. In examples disclosed herein, when the VM hosting the VRM 225, 227 is up and running the VM creates a virtual NIC for the internal network of the virtual server rack 206 and assigns an IP address to that virtual NIC of the internal network. The ToR switch 210, 212, 216, 218 discovers how to reach and communicate with internal network of the VRM 225, 227 when the VM hosting the VRM 225, 227 powers on. In examples disclosed herein, a management port of the management switch 207, 213 is connected to the ToR switches 210, 212, 216, 218. The management port is used to manage the ToR switches 210, 212, 216, 218. In addition, the management switch 207, 213 is connected to the ToR switches 210, 212, 216, 218 over data ports and communicate using an internal VLAN network. The example VRM 225, 227 and the HMS 208, 214 can then communicate based on a predefined IP address/port number combination. For example, the HMS 208, 214 initiates the HMS-PRM initial handshake by sending a message to the predefined IP address/port number combination of the PRM 518, and the PRM 518 responds with an acknowledge (ACK) to the message from the HMS 208, 214 to complete the HMS-PRM initial handshake.

After the HMS bootup sequence, the HMS 208, 214 performs an initial discovery process in which the HMS 208, 214 identifies servers, switches, and/or any other hardware in the physical resources 224, 226 in the physical rack 202, 204. The HMS 208, 214 also identifies hardware configurations and topology of the physical resources in the physical rack 202, 204. To discover servers in the physical resources 224, 226, the example HMS 208, 214 uses IPMI-over-LAN, which uses the RMCP/RMCP+ 'Remote Management Control Protocol' defined by DMTF. In examples disclosed herein, RMCP uses port 623 as the primary RMCP port and 664 as a secure auxiliary port, which uses encrypted packets for secure communications. The example HMS 208, 214 uses an RMCP broadcast request on a known subnet to discover IPMI LAN nodes. In addition, the HMS 208, 214 uses the RMCP presence ping message to determine IPMI capable interfaces in the physical rack 202, 204. In this manner, by IPMI LAN nodes and IPMI capable interfaces, the HMS 208, 214 discovers servers present in the physical resources 224, 226.

To discover switches in the physical resources 224, 226, a DHCP server running on the management switch 207, 213 assigns management IP addresses to the ToR switches 210, 212, 216, 218. In this manner, the HMS 208, 214 can detect the presence of the ToR switches 210, 212, 216, 218 in the physical rack 202, 204 based on the management IP addresses assigned by the DHCP server.

To maintain topology information of the management network in the virtual server rack 206, a link layer discovery protocol (LLDP) is enabled on management ports of the discovered server nodes and ToR switches 210, 212, 216, 218. The example management switch 207, 213 monitors the LLDP packet data units (PDUs) received from all of the discovered server nodes and keeps track of topology information. The example HMS 208, 214 uses the topology information to monitor for new servers that are provisioned in the physical resources 224, 226 and for de-provisioning of servers from the physical resources 224, 226. The example HMS 208, 214 also uses the topology information to monitor server hosts of the physical resources 224, 226 for misconfigurations.

The example HMS 208, 214 is capable of power-cycling individual IPMI-capable server hosts in the physical resources 224, 226 of the physical rack 202, 204. For example, the HMS 208, 214 sends SYS POWER OFF and SYS POWER ON messages to the BMCs on boards of target server hosts via LAN controllers of target server hosts. The LAN controllers for the management ports of server hosts are powered on using stand-by power and remain operative when the virtual server rack 206 is powered down. In some examples, the LAN controller is embedded to the system. In other examples, the LAN controller is an add-in PCI card connected to the BMC via a PCI management bus connection.

To hard reset a switch (e.g., the ToR switches 210, 212, 216, 218), the HMS 208, 214 uses IP-based access to power supplies of the physical rack 202, 204. For example, the HMS 208, 214 can hard reset a switch when it is non-responsive such that an in-band power cycle is not possible via the switch's CU.

During a power cycle. OS images that are pre-stored (e.g., pre-flashed) in the servers and switches of the physical resources 224, 226 are bootstrapped by default. As part of the bootstrap procedure, the HMS 208, 214 points the boot loader to the server or switch image located on a memory device (e.g., a Hash memory, a magnetic memory, an optical memory, a Serial Advanced Technology Attachment (SATA) Disk-on-Module (DOM), etc.) and provides the boot loader with any additional parameters pertinent to the bootup of a booting server or switch. For instances in which a network-based boot is required, the HMS 208, 214 is capable of altering boot parameters to use PXE boot for servers and Trivial File Transfer Protocol (TFTP)/Open Network Install Environment (ONIE) for switches.

In examples disclosed herein, after the boot up process the HMS 208, 214 validates that server nodes and the ToR switches 210, 212, 216, 218 have been properly bootstrapped with correct OS images and are ready to be declared functional. The example HMS 208, 214 does this by logging in to the server hosts, validating the OS versions, and analyzing the logs of the server hosts for any failures during bootup. In examples disclosed herein, the HMS 208, 214 also runs basic operability/configuration tests as part of the validation routine. In some examples, the HMS 208, 214 performs a more exhaustive validation to confirm that all loaded drivers are compliant with a hardware compatibility list (HCL) provided by, for example, the virtual system solutions provider (FIG. 1). The example HMS 208, 214 also runs a switch validation routine as part of a switch thread to verify that the boot configurations for the ToR switches 210, 212, 216, 218 are applied. For example, the HMS 208, 214 validates the OS versions in the ToR switches 210, 212, 216, 218 and tests ports by running link tests and ping tests to confirm that all ports are functional. In some examples, the HMS 208, 214 performs more exhaustive tests such as bandwidth availability tests, latency tests, etc.

An example definition of an example server object 632 for use in connection with examples disclosed herein is shown below in Table 4. The example server object 632 defined in Table 4 encapsulates information obtained both statically and dynamically using IB/CIM and OOB/IPMI mechanisms. In examples disclosed herein, the static information is primarily used for resource provisioning, and the dynamic information is used for monitoring status and health of hardware using upper layers in the VRM 225, 227. In some examples, the PRM 518 does not store events or alarms. In such examples, the PRM 518 relays information pertinent to events or alarms to the VRM 225, 227 and/or a Log Insight module (e.g., a module that provides real-time log management for virtual environments).

TABLE 4

| Example Definition of Server Object |
|---|
| IPMI Device ID |
| MAC address of Management Port |
| IP Address |
| vRACK Server ID (P0, H0) [Physical Rack 0, Host 0] |
| Hardware Model |
| Power State |
| On/Off |
| CPU |
| Vendor |
| Frequency |
| Cores |
| HT |
| Errors |
| Memory |
| Size |
| Type |
| Vendor |
| ECC |
| Cache size |
| Status |
| Errors |
| Disk[x] |
| Vendor |
| Type |
| Capacity |
| Driver |
| Status |
| Errors |
| NIC[x] |
| Type 1G/10G/40G |
| NumPorts |
| Vendor |
| Driver |
| Linkstate |
| ToR Port (P0, S0, X0)(Port number connected on the ToR switch) |
| Status |
| Errors |
| Sensors |
| Temperature |
| Power |
| Provisioned |
| Yes/No |
| Boot State |
| Yes/No |
| OS Version |
| Firmware Version |
| BIOS Version |
| License |
| HCL compliant |
| Timestamps[ ] |
| Lastboot |
| Fault Domain Group |

An example definition of an example switch object 634 for use in connection with examples disclosed herein is shown below in Table 5. The example switch object 634 defined in Table 5 encapsulates both static and dynamic information. In examples disclosed herein, the static information is primarily used to make sure that network resources are available for a provisioned server host. Also in examples disclosed herein, the dynamic information is used to monitor health of the provisioned physical network. Also in examples disclosed herein, a configuration information buffer is used for switch-specific configurations.

TABLE 5

| Example Definition of Switch Object |
| --- |
| Chassis ID<br>MAC Address of Management Port<br>Management IP Address<br>vRACK Switch ID (P0, S0) [Physical Rack 0, Switch 0]<br>Hardware Model<br>Power State<br>On/Off<br>Provisioned<br>Yes/No<br>Boot State<br>Yes/No<br>Switch Ports[X]<br>Speed [1G/10G/40G/100G]<br>Link State [Up/Down]<br>Host Port [P0, H0, N1] [Port identifier of the host]<br>Historical Stats[ ]<br>In/Out Packets<br>In/Out Drops<br>OS Version<br>Firmware Version<br>Timestamps<br>Lastboot<br>Fault Domain Group<br>Switch Configuration File Static [Vendor Type]<br>(This is a vendor-specific configuration file. This property points to a text file name having a switch configuration. This is bundled as part of the HMS Application (e.g., used to run the HMS 208, 214). The Static Switch Configuration File lists commands to be applied and also files to be copied (e.g., pointers to configuration-specific files).)<br>Switch Configuration File Dynamic [Vendor Type]<br>(This is a vendor-specific configuration file. This property points to a text file name having a switch configuration. The Dynamic Switch Configuration File is downloaded at runtime from the PRM 518 of the VRM 225, 227.) |

In examples disclosed herein, example server properties managed by the HMS 208, 214 are shown in Table 6 below.

TABLE 6

Server Properties Table

| Property | OOB | IB | Use |
| --- | --- | --- | --- |
| Chassis Serial Number | Y | | Used to identify inventory |
| Board Serial Number | Y | | Same as above - second level check |
| Management Mac | Y | | Chassis identifier on the network |
| Management IP | Y | | Network Connectivity to management port |
| Power State [S0-S5] | Y | | [Low Priority] Only if there is a power surge while provisioning we can set server low power states. |
| Power ON/OFF/Power Cycle/Reset | Y | | Ability to power on and off servers |
| CPU (Cores, Frequency) | Y | | Use as input for workload resource requirements |
| Memory (Size, Speed, Status) | Y | As above | |
| NIC<br>Speed<br>Link Status<br>Firmware Version<br>MAC Address<br>PCI Device ID<br>PCI SBF<br>HW capabilities<br>TSO,<br>LRO, | Partial | Y | As above (OOB can get MAC address) |

TABLE 6-continued

Server Properties Table

| Property | OOB | IB | Use |
| --- | --- | --- | --- |
| VXLAN offloads,<br>CSUM<br>DCB<br>IPV6 CSUM | | | |
| DISK<br>Size<br>Device Availability<br>Status<br>Vendor<br>Model<br>Type<br>DeviceID<br>Driver version<br>Firmware version | Partial | Y | As above (OOB has HDD status sensors described in Sensors) |
| SMART data for Disks (Self-Monitoring, Analysis, and Reporting) Value/Threshold<br>Health Status<br>Media Wearout Indicator<br>Write Error Count<br>Read Error Count<br>Power-on Hours<br>Power Cycle Count<br>Raw Read Error Rate<br>Drive Temperature<br>Driver Rated Max Temperature<br>Initial Bad Block Count<br>SSD specific wearlevelling indicators | N | | Resiliency algorithm input |
| CPU Firmware version | Y | | Check for updated versions |
| CPU Firmware upgrade | Y | | Ability to upgrade CPU firmware |
| BIOS upgrade | Y | | Ability to upgrade BIOS |
| Sensors (CPU/Memory/ Power/HDD)<br>Processor Status (Thermal Trip - Used to identify cause of server reset)<br>CATERR processor<br>DIMM Thermal Trip - Same as above<br>Hang in POST failure - Processor Status in case of unresponsive CPU<br>HDD Status<br>Firmware update status<br>Power Unit Status (Power Down)<br>BMC self test | Y | | HW analytics/OAM |
| POST tests<br>Microcode | Y | | Used for HW validation |

TABLE 6-continued

Server Properties Table

| Property | OOB | IB | Use |
|---|---|---|---|
| update failed<br>Processor init fatal errors<br>DIMM major failures<br>DIMM disabled<br>DIMM SPD failure<br>BIOS corrupted<br>PCIe PERR Parity errors<br>PCIe resource conflict<br>NVRAM corruptions<br>Processor BIST failures<br>BMC controller failed<br>ME failure<br>(Grizzly pass Technical Product Specification Appendix E has all the POST errors) | | | POST errors are logged to SEL |
| System Event Logs [SEL]<br>DIMM Thermal Margin critical threshold<br>Power Supply Status: Failure detected, Predictive failure<br>Processor Thermal Margin critical threshold<br>NIC controller temperature critical threshold<br>SAS module temperature critical threshold | Y | | LogInsight/HW Analytics<br>Log events for critical hardware failures and critical thresholds |
| User Name/Password for BMC access | Y | | Create user credentials for OOB access |
| NIC Firmware update | N | Y | Firmware updates use the NIC drivers |
| SSD firmware update | N | Y | SSD driver dependency |

In examples disclosed herein, example switch properties managed by the HMS 208, 214 are shown in Table 7 below.

TABLE 7

Switch Properties Table

| Property | Use |
|---|---|
| Chassis Serial Number | Identify Inventory |
| Management Port MAC | Network Identity of ToR |
| Management Port IP address | Provide Network Reachability to ToR |
| Port Properties [Num Ports] Admin Status, Link Status, Port Type | Use as input for workload resource requirements |
| Port Statistics | Calculate in-use and free bandwidth and identify choke points using drop counters and buffer statistics |
| OS version | Use for Upgrades |

Further details of the example HMS 208, 214 of FIGS. 2, 3, 4, 5, and/or 6 are disclosed in U.S. patent application Ser. No. 14/788,004, filed on Jun. 30, 2015, and titled "METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS," which is hereby incorporated by herein reference in its entirely. Further details of the example VRMs 225, 227 of FIGS. 2, 4, and/or 5 are also disclosed in U.S. patent application Ser. No. 14/796,803, filed on Jul. 10, 2015, and titled "Methods and Apparatus to Configure Virtual Resource Managers for use in Virtual Server Rack Deployments for Virtual Computing Environments," which is hereby incorporated by reference herein in its entirety. In addition, U.S. patent application Ser. No. 14/788,193, filed on Jun. 30, 2015, and titled "METHODS AND APPARATUS TO RETIRE HOSTS IN VIRTUAL SERVER RACK DEPLOYMENTS FOR VIRTUAL COMPUTING ENVIRONMENTS," and U.S. patent application Ser. No. 14/788,210, filed on Jun. 30, 2015, and titled "METHODS AND APPARATUS TO TRANSFER PHYSICAL HARDWARE RESOURCES BETWEEN VIRTUAL RACK DOMAINS IN A VIRTUALIZED SERVER RACK" are hereby incorporated by reference herein in their entireties.

White an example manner of implementing the example VRM 225, 227 of FIG. 2 is illustrated in FIGS. 2, 4 and 5, one or more of the elements, processes and/or devices illustrated in FIGS. 2, 4 and/or 5 may be combined, divided, re-arranged, omitted, eliminated and/or implemented in any other way. Further, the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532, the example extensibility tools 534, the example configuration component services 536, the VRM configuration component 538, the example configuration UI 540, and/or, more generally, the example VRM 225, 227 of FIGS. 2, 4, and/or 5 may be implemented by hardware, software, firmware and/or any combination of hardware, software and/or firmware. Thus, for example, any of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532, the example extensibility tools 534, the example configuration component services 536, the VRM configuration component 538, the example configuration UI 540, and/or, more generally, the example VRM 225, 227 of FIGS. 2, 4, and/or 5 could be implemented by one or more analog or digital circuits), logic circuits, programmable processors), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example virtual rack manager directory 532, the example extensibility tools 534, the example configuration component services 536, the VRM configuration component 538, the example configuration UI 540, and/or, more generally, the example VRM 225, 227 of FIGS. 2, 4, and/or 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example VRM 225, 227 of FIGS. 2, 4, and/or 5 may include one or more elements, processes and/or devices in addition to, or instead of, those illustrated in FIGS. 4 and/or 5, and/or may include more than one of any or all of the illustrated elements, processes and devices.

Figure 7:
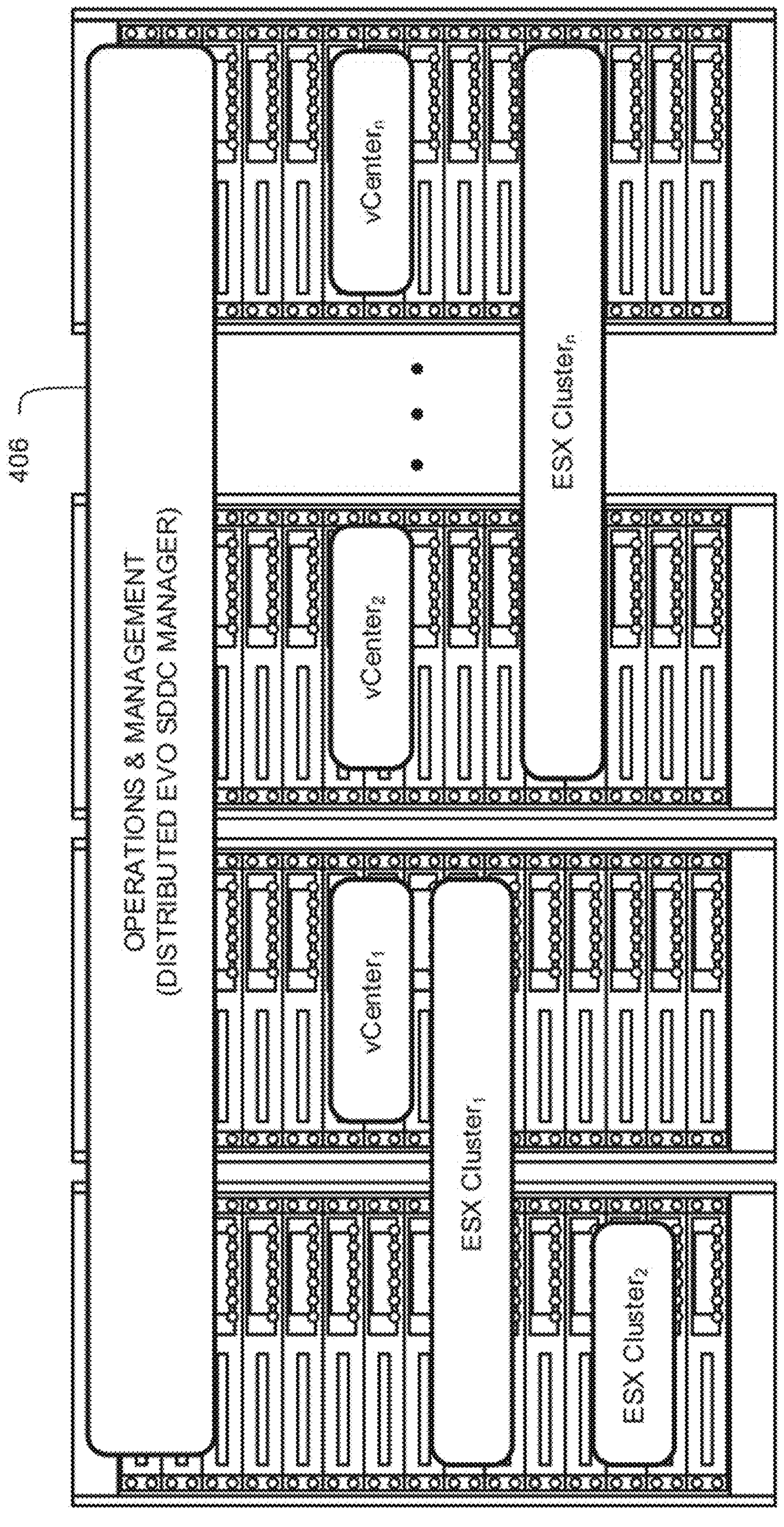
FIG. 7 depicts the example virtual server rack of FIG. 2 with aggregate capacity across physical racks.

FIG. 7 depicts the example virtual server rack 206 of FIG. 2 with aggregate capacity across physical racks. In the illustrated example, the operations and management component 406 operates across the physical racks of the virtual server rack 206 to configure and manage numerous VMware vCenters (e.g., $vCenter_1$, $vCenter_2$, $vCenter_n$) and numerous ESX Clusters (e.g., ESX $Cluster_1$, ESX, $Cluster_2$, ESX $Cluster_n$). In the illustrated example, the VMware vCenters are server managers to configure and manage workload domains in virtual infrastructures. In the illustrated, the ESX Clusters are a collection of ESX server hosts and associated virtual machines with shared resources and a shared management interface. The ESX Clusters are managed by the vCenter server managers. Each workload domain contains one vCenter server and can host one or more ESX Clusters.

The example the operations and management component 406 treats multiple physical racks as a single pool of hardware in the virtual server rack 206. In this manner, the customer does not need to know where servers are physically located. When a new physical rack is added to the virtual server rack 206, the capacity of the newly added physical rack is added to the overall pool of hardware of the virtual server rack 206. Provisioning of that capacity is handled via Workload Domains.

Figure 8:
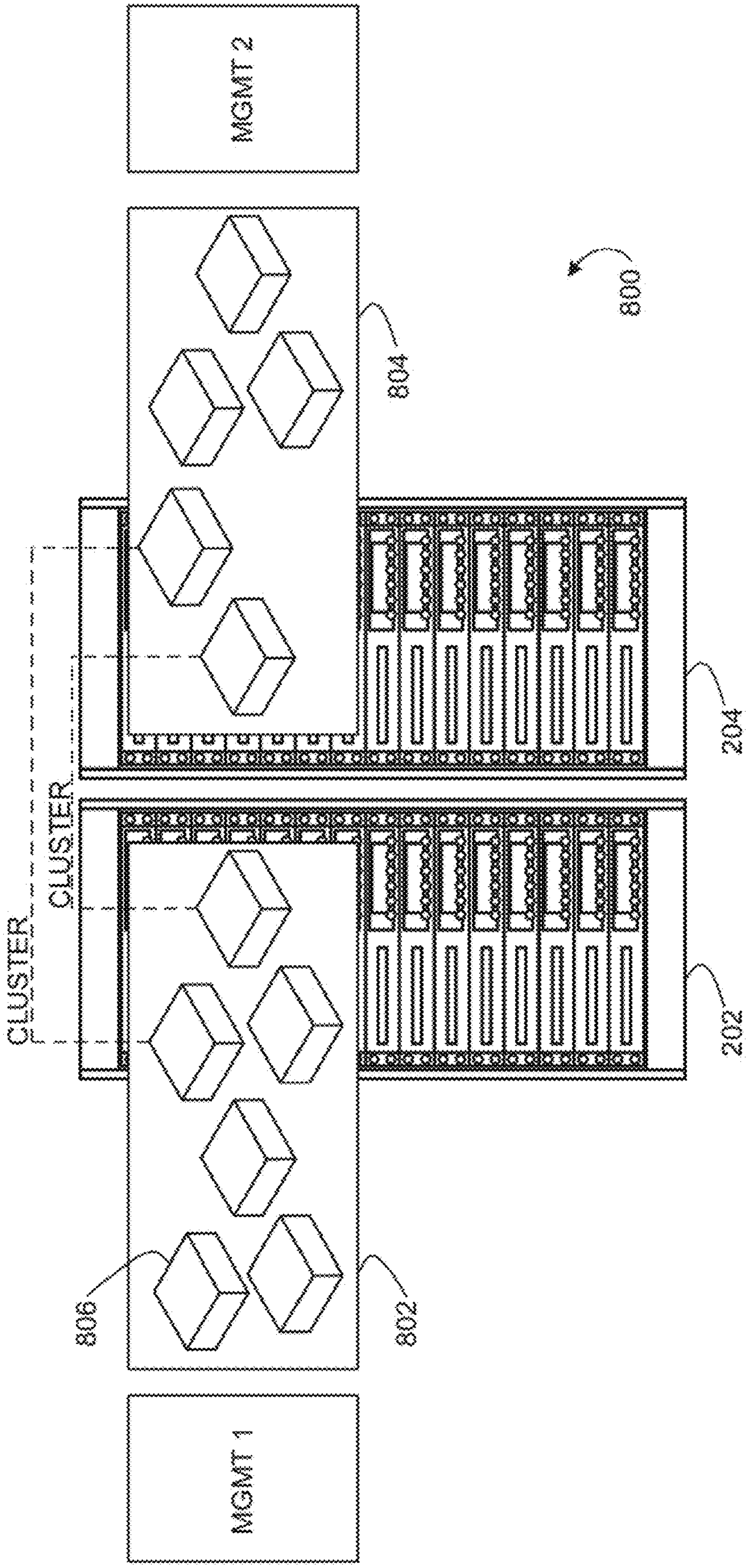
FIG. 8 depicts example management clusters in corresponding ones of the example physical racks of FIG. 2.

FIG. 8 depicts example management clusters MGMT1 802 and MGMT2 804 in corresponding ones of the example physical racks 202, 204 of FIG. 2. In the illustrated example, the management clusters are per-rack, which is facilitated by the physical racks 202, 204 being built substantially similar or identical. One or more workload domains can be run on each management cluster 802, 804. In the illustrated example, management VMs are encapsulated in each corresponding management cluster 802, 804 and isolated from management VMs in other management clusters. The management clusters 802, 804 may include one or more components 806 such as, for example, a VMware NSX® network virtualization platform.

Figure 9:
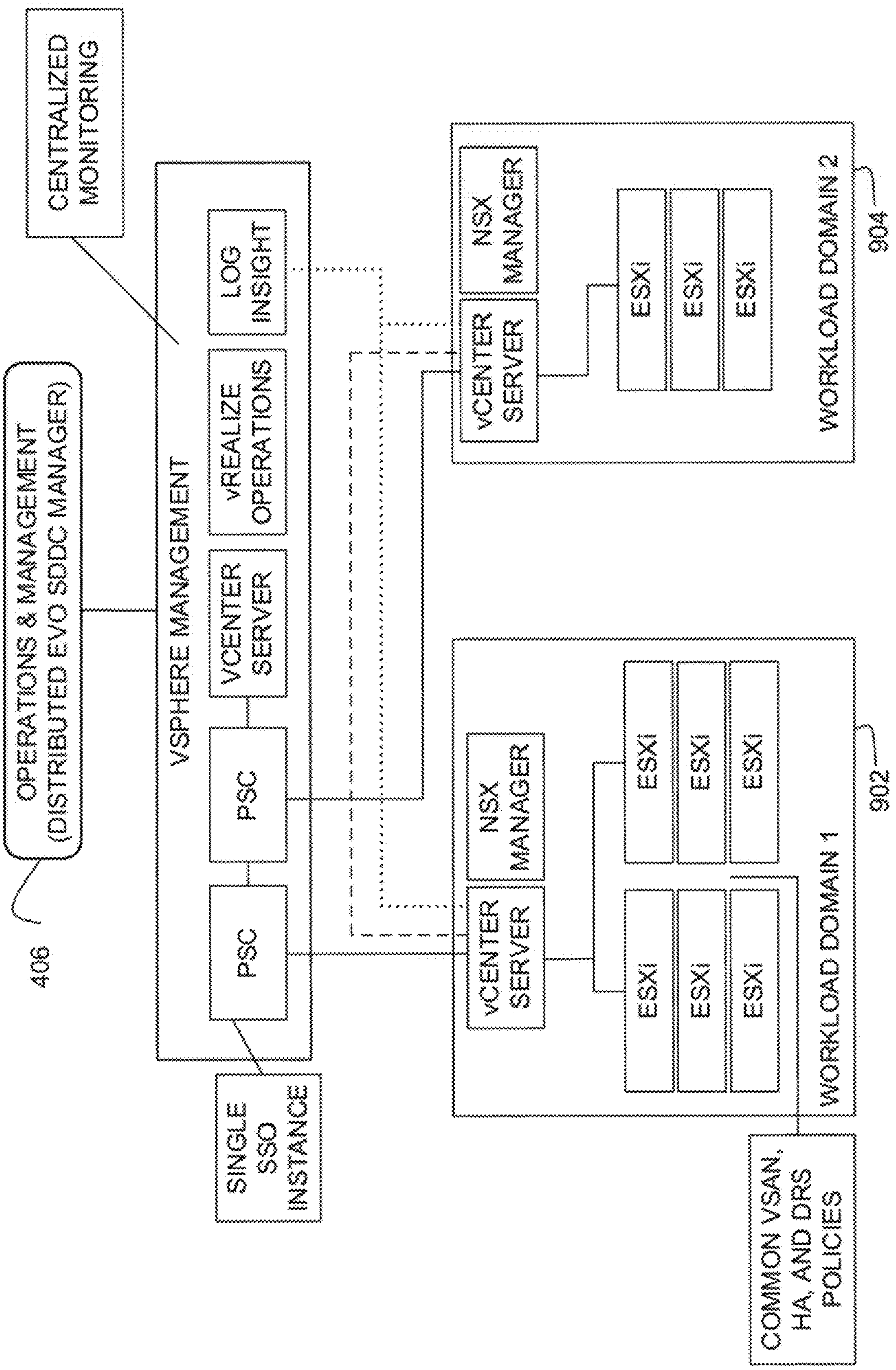
FIG. 9 depicts two example workload domains executing on the virtual server rack of FIGS. 2 and 7.

FIG. 9 depicts two example workload domains 902, 904 executing on the virtual server rack 206 of FIGS. 2 and 7. The example workload domains 902, 904 are used to provision capacity based on user inputs that specify one or more of domain type, security, availability requirements, performance requirements, and capacity requirements. Based on these user inputs, the operations and management component 406 determines whether a deployment is possible. If a deployment is possible, the operations and management component 406 determines an optimal host set that meets the user-specified requirements. The output of the operations and management component 406 is a fully configured system with suitable management components, capacity, and settings that meet the user-specified requirements.

In the illustrated example, the workload domains 902, 904 use a policy-driven approach to capacity deployment. The policy for each workload domain 902, 904 can be specified and changed by a user (e.g., customer). Each of the example workload domains 902, 904 is an atomic unit for deployment, upgrading, and deletion. In the illustrated example, the workload domains 902, 904 are provided with algorithms that determine optimal host placement in the virtual server rack 206 to meet the user provided requirements. The management components for each of the workload domains 902, 904 of the illustrated example will run on one of the management clusters. Each management cluster can run on a single physical rack or across multiple physical nicks as shown in FIG. 7 depending on availability and capacity requirements.

In the illustrated examples disclosed herein, domain types include an infrastructure as a service (IaaS) domain type, a platform as a service (PaaS) domain type, a desktop as a service (DaaS)/virtual desktop infrastructure (VDI) domain type, a development/test domain type, a production domain type, a Cloud Native domain type, an Opens tack domain type, and a Big Data domain type. However, any other domain type may be used. In the illustrated example, security types include firewall settings, security group settings, particular specified IP addresses, and/or other network security features. In the illustrated example, availability requirements refer to durations of continuous operation expected for a workload domain. Example availability requirements also refer to configuring workload domains so that one workload's operability (e.g., malfunction, unexpected adverse behavior, or failure) does not affect the availability of another workload in the same workload domain. In the illustrated example, performance requirements refer to storage configuration (e.g., in terms of megabytes (MB), GB, terabytes (TB), etc.), CPU operating speeds (e.g., in terms of megahertz (MGz), GHz, etc.), and power efficiency settings. Example performance requirements also refer to configuring workload domains so that concurrent workloads in the same workload domain do not interfere with one another. Such non-interference between concurrent workloads may be a default feature or may be user-specified to different levels of non-interference. In the illustrated example, capacity requirements refer to the number of resources required to provide availability, security, and/or performance requirements specified by a user. Allocating capacity into workload domains in accordance with the teachings of this disclosure enables providing workload domains with isolation from other workload domains in terms of security, performance, and availability. That is, security, performance, and availability for one workload domain can be made distinct separate from security, performance, and availability from other workload domains. For example, techniques disclosed herein enable placing a workload domain on a single physical rack separate from other workload domains in other physical racks such that a workload domain can be physically isolated from other workload domains in addition to being logically isolated. Additionally, techniques disclosed herein facilitate placing a workload domain across numerous physical racks so that availability requirements of the workload domain are met even when one physical rack fails (e.g., if one physical rack fails, resources allocated to the workload domain from one or more other physical racks can ensure the availability of the workload domain).

Figure 10:
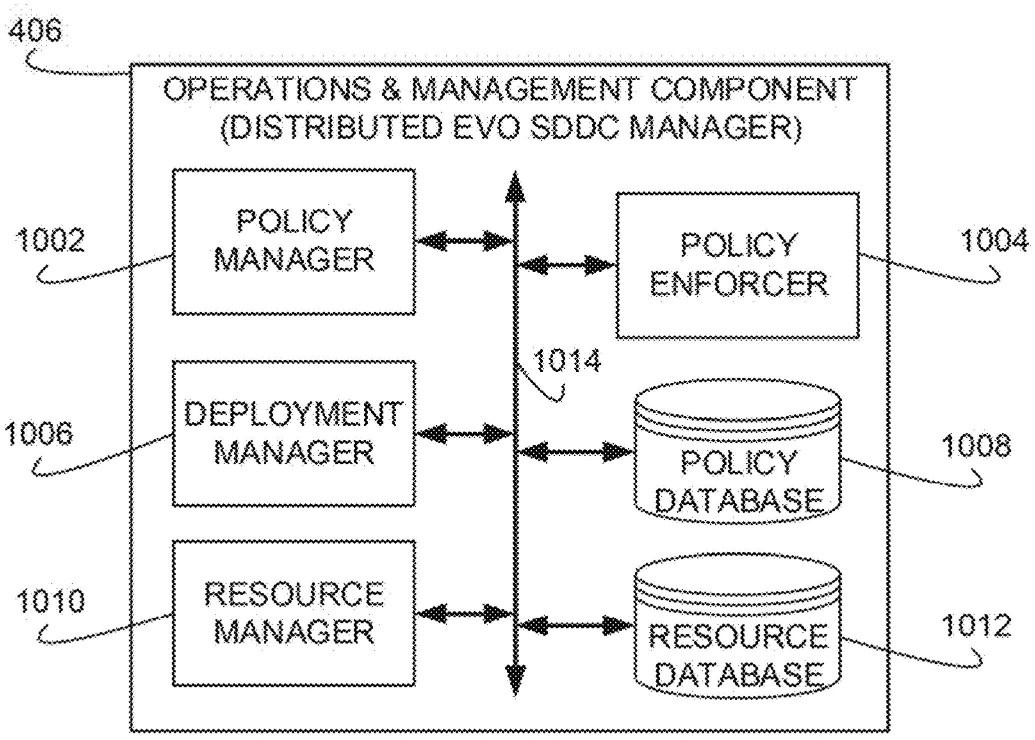
FIG. 10 is a block diagram of the example operations and management component of FIGS. 4, 5, 7, and 9.

An example of the operations and management component 406 of FIGS. 4, 5, 7, and 9 is illustrated in FIG. 10. The example operations and management component 406 includes an example policy manager 1002, an example policy enforcer 1004, an example deployment manager 1006, an example policy database 1008, an example resource manager 1010, and an example resource database 1012. In the illustrated example of FIG. 10, the policy manager 1002, the policy enforcer 1004, the deployment manager 1006, the policy database 1008, the resource manager 1010, and the resource database 1012 are all in communication with one another via a bus 1014. As disclosed herein, the example operations and management component 406 determines placement solutions for workload domains, manages the addition and/or removal of capacity according to policies, and deploys workload domains based on user-selected availability, performance, and capacity options. The example operations and management component 406 operates on a number of user requests concurrently to determine a number of placement solutions concurrently within a finite pool of shared configuration resources. Accordingly, the example operations and management component 406 services then number of user requests in a more timely fashion than achievable without the disclosed techniques. For example, the operations and management component 406 identifies first ones of a plurality of computing resources to form a first placement solution for a first workload domain based on availability, performance, and capacity options selected by a first user, and concurrently identifies second ones of the plurality of computing resources different from the first ones of the plurality of computing resources to form a second placement solution for a second workload domain based on availability, performance, and capacity options selected by a second user.

The example policy manager 1002 determines availability options corresponding to resource allocation techniques, performance options, and/or capacity options for a workload domain. In some examples, the policy manager 1002 creates, update, or deletes one or more policies based on the availability options, performance options, and/or capacity options selected by a user. The example policy manager 1002 may communicate with a user interface to present options to a user and receive selections of such options from the user. In some examples, the policy manager 1002 determines availability options and performance options for a workload domain based on a user-selected workload domain type. As disclosed herein, a user may select domain types such as, for example, an IaaS domain type, a PaaS domain type, a DaaS/VDI domain type, a development/test domain type, a production domain type, a Cloud Native domain type, an Openstack domain type, a Big Data domain type, etc. In some examples, different domain types may be associated with one or more predetermined availability and/or performance options. For example, the policy manager 1002 may access a look-up-table for default availability and/or performance options associated with the domain types described above. The example policy manager 1002 presents one or more availability and/or performance options to a user for selection thereof. In some examples, the policy manager 1002 presents the availability and/or performance options to a user at a low level of detail (e.g., low redundancy for fault tolerance, normal redundancy for fault tolerance, high redundancy 1 for fault tolerance, high redundancy 2 for fault tolerance, low performance, normal performance, high performance, etc.), such that the user need not understand the physical resources required to provide such availability and/or performance. In some examples, the policy manager 1002 presents the availability and/or performance options at a high level of detail (e.g., sliding scales representative of a number of redundant resources, CPU operating speeds, memory, storage, etc.).

Based on the user-selected availability option(s) and/or performance option(s), the example policy manager 1002 determines one or more capacity option(s) capable of providing the user-selected availability option(s) and/or performance option(s). For example, the policy manager 1002 determines the number of resources required provide the user-selected availability option(s) and/or performance option(s). In some examples, the policy manager 1002 determines and presents a number of capacity options to the user (e.g., four host resources could provide the user-selected availability option(s) and/performance option(s), but five resources would be better). In some examples, the policy manager 1002 determines and presents one capacity option to the user. In some examples, the policy manager 1002 determines no capacity options are available to the user based on the selected availability option(s) and/or performance option(s). In such examples, the policy manager 1002 presents to the user that there are no capacity options. In some such examples, the policy manager 1002 provides recommendations to a user for adjusting the availability option(s) and/or performance option(s) to make one or more capacity options available. In some such examples, multiple workload domains share a finite pool of computation resources such that capacity options may become unavailable due to a lack of resources. However, as disclosed herein, resources are allocated to different workload domains and/or de-allocated from workload domains such that capacity options may become available for the user-selected availability option(s) and/or performance option(s) at a later time. In some examples, portions of the shared pool of configurable computing resources are reserved to provide failure tolerance. In some examples, such reserved computing resources may be used when the policy manager 1002 determines that no non-reserved capacity options are available to the user based on the selected availability option(s) and/or performance option(s).

In some examples, a user wishes to create, update, delete, or otherwise modify the one or more policies created by the policy manager 1002 based on the availability, performance, and/or capacity options. For example, a user wants to increase capacity after a workload domain has been deployed. In such examples, the policy manager 1002 defines, updates, deletes, or otherwise modifies the one or more policies based on instructions received from the user (e.g., through the user interface). The policy manager 1002 stores information relating to the one or more polices in association with corresponding workload domains within the policy database 1008.

The example policy enforcer 1004 monitors the capacity of workload domains and compares the capacity of the workload domains to corresponding capacity policies (e.g., stored in the policy database 1008) to determine whether the capacity of the workload domain 902 is in compliance with a policy capacity specified in the user-defined policy for the workload domain 902. For example, if the workload domain 902 is associated with a user-defined policy having a first policy capacity and the workload domain 902 has a capacity different from the first policy capacity, the example policy enforcer 1004 determines that the workload domain 902 is in violation of the user-defined policy. In some examples, the workload domain 902 is in violation for having a capacity that exceeds the policy capacity specified in the user-defined policy (e.g., the policy capacity specified in the user-defined policy was lowered by the user). In some examples, the workload domain 902 is in violation for having a capacity less than the policy capacity specified in the user-defined policy (e.g., the policy capacity specified in the user-defined policy was increased by the user). In some examples, such violations occur due to modifications to user-defined policies after a workload domain has been deployed (e.g., in response to the policy manager 1002 defining, updating, deleting, or otherwise modifying, the user-defined policy). Additionally or alternatively, compliance with a policy capacity may include the capacity of the workload domain 902 satisfying an acceptable capacity range (e.g., within +/−5%). For example, if the policy capacity specified in the user-defined policy is one-hundred and the capacity of the workload domain 902 is ninety-nine, the capacity of the workload domain 902 may still be in compliance even though ninety-nine is less than one-hundred (e.g., 99 is within 5% of 100). Accordingly, non-compliance with a policy capacity may include the capacity of the workload domain 902 not satisfying the acceptable capacity range (e.g., outside of +/−5%).

In some examples, the example policy enforcer 1004 categorizes existing workload domains based on a type of update to user defined policies. For example, the example policy enforcer 1004 may group together workload domains having updates reflecting a request for additional or a request to release excess CPU capacity, storage capacity, memory capacity, etc. In such examples, the example policy enforcer 1004 determines whether there is a second workload domain within a same category as the first workload domain that has excess capacity and/or is requesting additional capacity.

The example deployment manager 1006 determines placement solutions for workload domains within the shared pool (e.g. an inventory) of configurable computing resources. The example deployment manager 1006 determines what resources to allocate for workload domains based on the availability, performance, and capacity options selected by users. In some examples, the deployment manager 1006 determines one or more placement solutions for one or more workload domains (e.g., from one or more users) concurrently, simultaneously, or substantially simultaneously. In such examples, the deployment manager 1006 communicates with the resource manager 1010 to request/receive a most recent list of accessible resources from the shared pool of configurable computing resource prior to determining a placement solution. In some examples, the deployment manager 1006 requests the most recent list of resources to prevent allocating resources that have been allocated to another workload domain (e.g., a first workload domain is to have a first set of resources and a second workload domain is to have a second set of resources different from the first set of resources). Additionally, the deployment manager 1006 may determine placement solutions based on the health of available resources. Various placement solutions may be used including, selecting the least number of resources required to satisfy the capacity policy, selecting one more than the least number of resources required to satisfy the capacity policy, etc. as further described in conjunction with FIG. 13.

Once the deployment manager 1006 has a most recent list of accessible resources, the deployment manager 1006 determines a placement solution for a workload domain using the most recent list of accessible resources teed on the availability, performance, and/or capacity options selected by a user. For example, if a user selects a multi-rack option, the deployment manager 1006 determines a placement solution in a virtual server rack across a plurality of physical racks (e.g., allocate resources across five different racks). In such examples, the deployment manager 1006 may allocate one resource per rack. Alternatively, the deployment manager 1006 may allocate all the resources of a first rack before moving to the next rack. In some examples, if a user selects a single-rack option, the deployment manager 1006 determines a vertical placement solution in a single physical rack (e.g., fill a single rack with one or more placement solutions).

In some examples, the deployment manager 1006 is to when ones of the capacities of the plurality of workload domains are less than the policy capacities of the respective user-defined policies, concurrently determine a plurality of placement solutions for additional capacity for the plurality of workload domains based on a comparative analysts of: (a) the capacities of the plurality of workload domains, (b) updates to the respective user-defined policies, and (c) a resource database shared by the multiple users, the resource manager to allocate resources to the plurality of workload domains based on the plurality of placement solutions.

Examples tor configuring and deploying workload domains, as disclosed herein, are shown in Table 8 below.

TABLE 8

| Workload Domain Options | |
|---|---|
| **Feature** | **Description** |
| WRK01.02 Storage capacity calculation reflects usable storage after Failure-to-Tolerate (FTT) | The number of servers selected to fulfill a requested capacity takes into account VSAN Failures-to-Tolerate.<br>Usable space in Summary page is the amount of usable space after taking FTT in to account.<br>FTT Overhead:<br>1. For FTT = 0 usable space is 100% of host capacity<br>2. For FTT = 1 usable space is 50% of host capacity<br>3. For FTT = 2 usable space is 33% of host capacity<br>Acceptance Criteria:<br>If the selected host capacity is X, user will see the following values on the UI for usable space:<br>FTT = 0 => X/(1 + FTT) = X<br>FTT = 1 => X/(1 + FTT) = X/2<br>FTT = 2 => X/(1 + FTT) = X/3 |
| WRK01.07 Placement Algorithm - Vertical - Single Rack | This algorithm places clusters vertically in racks. It does not allow clusters to span racks.<br>Servers need not be physically sequential as long as they are in the same rack. |

TABLE 8-continued

| Workload Domain Options | |
|---|---|
| Feature | Description |
| | Acceptance Criteria:<br>The following cases are used:<br>Validate that cluster hosts are selected based on first available by rack order.<br>Validate error state when there are insufficient hosts to meet capacity requirements. |
| wrk01.07 Placement Algorithm - Fill Racks - Single Rack | This placement algorithm creates clusters by filling racks vertically first before moving to the next rack.<br>Top to bottom and left to right starting with rack 1.<br>Filling racks optimizes the capacity remaining in other racks capacity for vertical placement.<br>Acceptance Criteria:<br>The following cases are used:<br>Validate that algorithm selects first hosts available in rack1 and fails if enough hosts are not available. |
| WRK01.02 Feedback to user when no placement solution is found | Deploy Workload Domain workflow provides feedback to user if there is no placement solution for the parameters they have requested.<br>Example:<br>"Insufficient Memory Capacity Available, please reduce memory requirements"<br>"Insufficient Storage Available to provide requested Capacity and Availability"<br>Acceptance Criteria:<br>For selective fill rack if the required resources are not available its displayed on the UI with the user friendly message<br>For vertical rack if the required resources are not available its displayed on the UI with the user friendly message |
| WRK01.04.01 Workload Domain Availability option - Low Redundancy | Resources can be allocated in different Racks (Rack Spanning)?; Yes for rack count >1<br>VSAN FTT = 0<br>VSAN Fault Domains = No<br>vSphere HA = No<br>Max Size: Max configured cluster size.<br>Placement: Selective fill racks<br>Success Criteria:<br>VSAN default policy includes the required parameters<br>Cluster feature HA is not enabled. |
| WRK01.04.01 Workload Domain Availability option - High Redundancy Option 1 | Option 1 - Single or multi-rack<br>Rack Spanning: No<br>VSAN Fault Domains: No<br>vSphere HA = % of cluster per HA guidelines (described below in conjunction with FIG. 13)<br>VSAN FTT = 2 (Requires 5 hosts minimum)<br>Max Size: Max hosts available in a single rack (max 22 in current design with no reserve capacity)<br>Placement: Vertical<br>Success Criteria:<br>VSAN default policy includes the required parameters |
| WRK01.03.01 Performance Options - Development Workloads | VSAN Disk Stripes = 1<br>Host Power Management Active Policy = Low<br>Success Criteria:<br>VSAN default policy includes the required parameters |
| WRK01.03.02 Performance Options - Standard Workloads | VSAN Disk Stripes = 1<br>Host Power Management Active Policy = Balanced<br>Success Criteria:<br>VSAN default policy includes the required parameters |
| WRK01.03.03 Performance Options - High Performance Workloads | VSAN Disk Stripes = 4<br>Host Power Management Active Policy = High Performance<br>HA - If Highly Available Option is also selected configure increase HA % (described below in conjunction with Table 10)<br>Success Criteria:<br>VSAN default policy includes the required parameters |
| WRK01 IaaS Workload Domain Rules | An IaaS Workload Domain maps to one or more vCenter Servers and vSphere clusters. It includes Capacity, Availability, and Performance policies applied to those clusters.<br>A vCenter Server may manage only one workload domain, but this may include more than one vSphere Cluster as part of that domain.<br>An IaaS Workload Domain may also include additional management components such as vRA or VIO.<br>Acceptance Criteria:<br>Inventory data validation and flexibility |
| wrk01.07 Placement Algorithm - Selective | This placement algorithm creates clusters by filling racks vertically first before moving to the next rack. |

TABLE 8-continued

| Workload Domain Options | |
|---|---|
| Feature | Description |
| Fill Racks - Multi Rack - Validation | Top to bottom and left to right starting with rack 1.<br>Filling racks optimizes the capacity remaining in other racks capacity for vertical placement.<br>In some examples, this placement algorithm may create clusters by partially filling rack vertically and moving on to the next rack to optimization the placement of the resources.<br>Acceptance Criteria:<br>The following cases are used:<br>If all the hosts are free on 2 rack setup, the first N nodes are selected from Rack 1. If the Rack 1 is full the other hosts are selected from Rack 2.<br>If few hosts are consumed on both Rack 1 and Rack 2, the selection algorithm still chooses the free hosts from Rack 1. If more hosts are required it also chooses the hosts from Rack 2. |
| WRK01.07 Placement Algorithm - Vertical - Multi-Rack - Validation | This algorithm places clusters vertically in racks. It does not allow clusters to span racks.<br>Servers need not be physically sequential as long as they are in the same rack.<br>Acceptance Criteria:<br>The following cases are used:<br>If all the hosts are free on 2 rack setup, the first N nodes are selected from Rack 1 to fulfill the requested capacity. If the Rack 1 is not able to fulfill the requested capacity, the hosts are selected from Rack 2 if available.<br>If few hosts are consumed on both Rack 1 and Rack 2, the selection algorithm still chooses the free hosts from Rack 1 to fulfill the requested capacity. If the Rack 1 is not able to fulfill the requested capacity, the hosts are selected from Rack 2 if available. |
| WRK01.04.01 Workload Domain Availability option - High Redundancy Option 2 | Option 2 multi-rack only, five racks minimum<br>Rack Spanning: Yes<br>VSAN Fault Domains: Yes, strict. Will require customer to add additional hosts in some cases.<br>vSphere HA = % of cluster per HA Guidelines (described below in conjunction with Table 10)<br>Placement: Minimum Rack Count<br>Compute or use table<br>VSAN FTT = 2 (Requires 5 FD minimum)<br>Max Size: Max configured cluster size. |
| WRK01.07 Placement Algorithm - Minimum Rack Count | Minimum Rack Count algorithm allocates resource hosts across the minimum number of racks required to meet VSAN Fault Domain requirements.<br>The number of hosts in a fault domain should be even, meaning that the number of hosts in the cluster must be evenly divisible by the number of racks to span across.<br>The integer result of this is the number of hosts in the Fault Domain.<br>This can be computed during placement or a lookup table can be used. |

The example deployment manager 1006 communicates with the example resource manager 1010 to reserve the resources associated with the placement solution. After the resources are reserved, the example deployment manager 1006 deploys the workload domain with the reserved resources based on the user-selected availability, performance, and/or capacity options.

The example policy database 1008 stores information relating to user-selected options for deploying a workload domain. For example, when a user selects an availability option, a performance option, and/or a capacity option, the policy manager 1002 may store this information in a user-defined policy corresponding to the workload domain. Additionally, the policy manager 1002 updates user-defined policies with the example policy database 1008 based on subsequent user-selections. Such workload domain and user-defined policy pairing may be stored in one or more look-up tables within the example policy database 1008. In some examples, the example policy database 1008 is a tangible computer readable storage device or storage disk such as a memory, a digital versatile disk (DVD), a compact disk (CD), a Blu-ray disk, etc.

The example resource manager 1010 reserves resources from the shared pool of configurable computing resources based on placement solutions determined by the deployment manager 1006. In some examples, the resource manager 1010 allocates resources to and/or de-allocates resources from workload domains. In some examples, the resource manager 1010 allocates and/or de-allocates resources between workload domains. In some such examples, the resource manager 1010 determines whether one or more workload domains can provide resource capacity requested by another workload domain and/or whether one workload domain can provide resource capacity requested by one or more workload domains. The example resource manager 1010 tracks the reservation, allocation, and/or de-allocation of resources by storing information associated with such reservation, allocation, and/or de-allocation of resources in the example resource database 1012. In some examples, the resource manager 1010 communicates with one of the VRMs 225, 227 (FIG. 2), which communicates with the HMS 208, 214 to manage the physical hardware resources 224, 226.

The example resource database 1012 stores information regarding the status of the shared pool of configurable resources such as for example, resources allocated from the shared pool of configurable resources to workload domains and/or resources de-allocated from workload domains to the shared pool of configurable resources. The example deployment manager 1006 reads such status information for a most recent list of available resources prior to determining a placement solution. In some examples, the example resource database 1012 is a tangible computer readable storage device or storage disk such as a memory, a digital versatile disk (DVD), a compact disk (CD), a Blu-ray disk, etc.

While an example manner of implementing the example operations and management component 406 of FIGS. 4, 5, 7 and/or 9 is illustrated in FIG. 10, one or more of the elements, processes and/or devices illustrated in FIG. 10 may be combined, divided, re-arranged, omitted, eliminated and/or implemented in any other way. Further, the example policy manager 1002, the example policy enforcer 1004, the example deployment manager 1006, the example policy database 1008, the example resource manager 1010, the example resource database 1012, and/or, more generally, the example operations and management component 406 of FIGS. 4, 5, 7 and/or 9 may be implemented by hardware, software, firmware and/or any combination of hardware, software and/or firmware. Thus, for example, any of the example policy manager 1002, the example policy enforcer 1004, the example deployment manager 1006, the example policy database 1008, the example resource manager 1010, the example resource database 1012, and/or, more generally, the example operations and management component 406 of FIGS. 4, 5, 7 and/or 9 could be implemented by one or more analog or digital circuit(s), logic circuits, programmable processors), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example policy manager 1002, the example policy enforcer 1001, the example deployment manager 1006, the example policy database 1008, the example resource manager 1010, the example resource database 1012, and/or, more generally, the example operations and management component 406 of FIGS. 4, 5, 7 and/or 9 is/are hereby expressly defined to include a tangible computer readable storage device or storage disk such as a memory, a digital versatile disk (DVD), a compact disk (CD), a Blu-ray disk, etc. storing the software and/or firmware. Further still, the example operations and management component 406 of FIGS. 4, 5, 7 and/or 9 may include one or more elements, processes and/or devices in addition to, or instead of, those illustrated in FIG. 10, and/or may include more than one of any or all of the illustrated elements, processes and devices.

Flowcharts representative of example machine readable instructions that may be executed to deploy the example workload domains 902, 904 of FIG. 9 are shown in FIGS. 11A, 11B, 12A, 12B, and 13. In these examples, the machine readable instructions implement programs for execution by a processor such as the processor 2112 shown in the example processor platform 2100 discussed below in connection with FIG. 21. The programs may be embodied in software stored on a tangible computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example programs are described with reference to the flowcharts illustrated in FIGS. 11A, 11B, 12A, 12B, and 13, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 11A, 11B, 12A, 12B, and 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stoned for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 11A, 11B, 12A, 12B, and 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 11A:
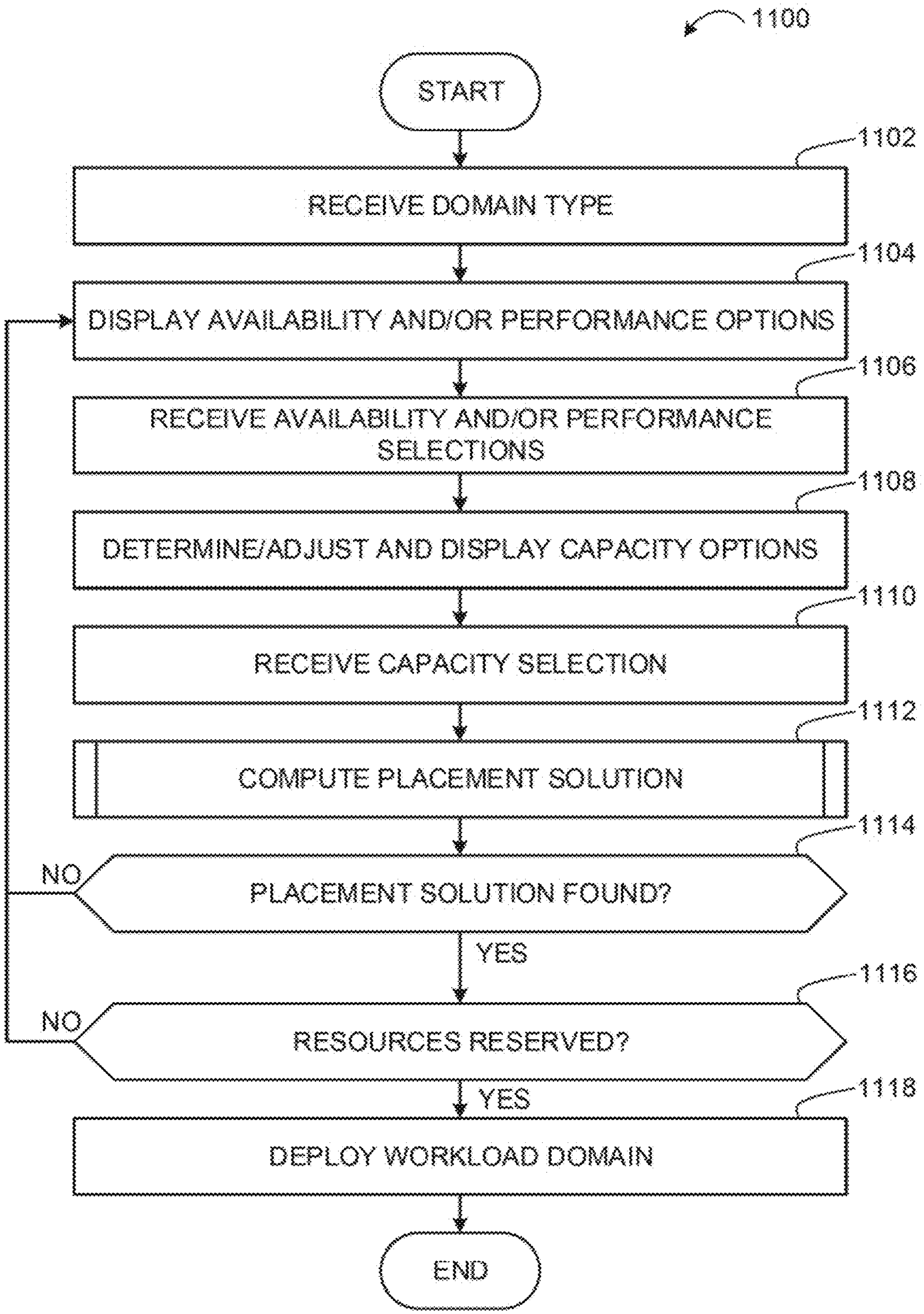
FIGS. 11A and 11B depict flowcharts representative of computer readable instructions that may be executed to implement the example operations and management component of FIG. 10 to deploy workload domains.
Figure 11B:
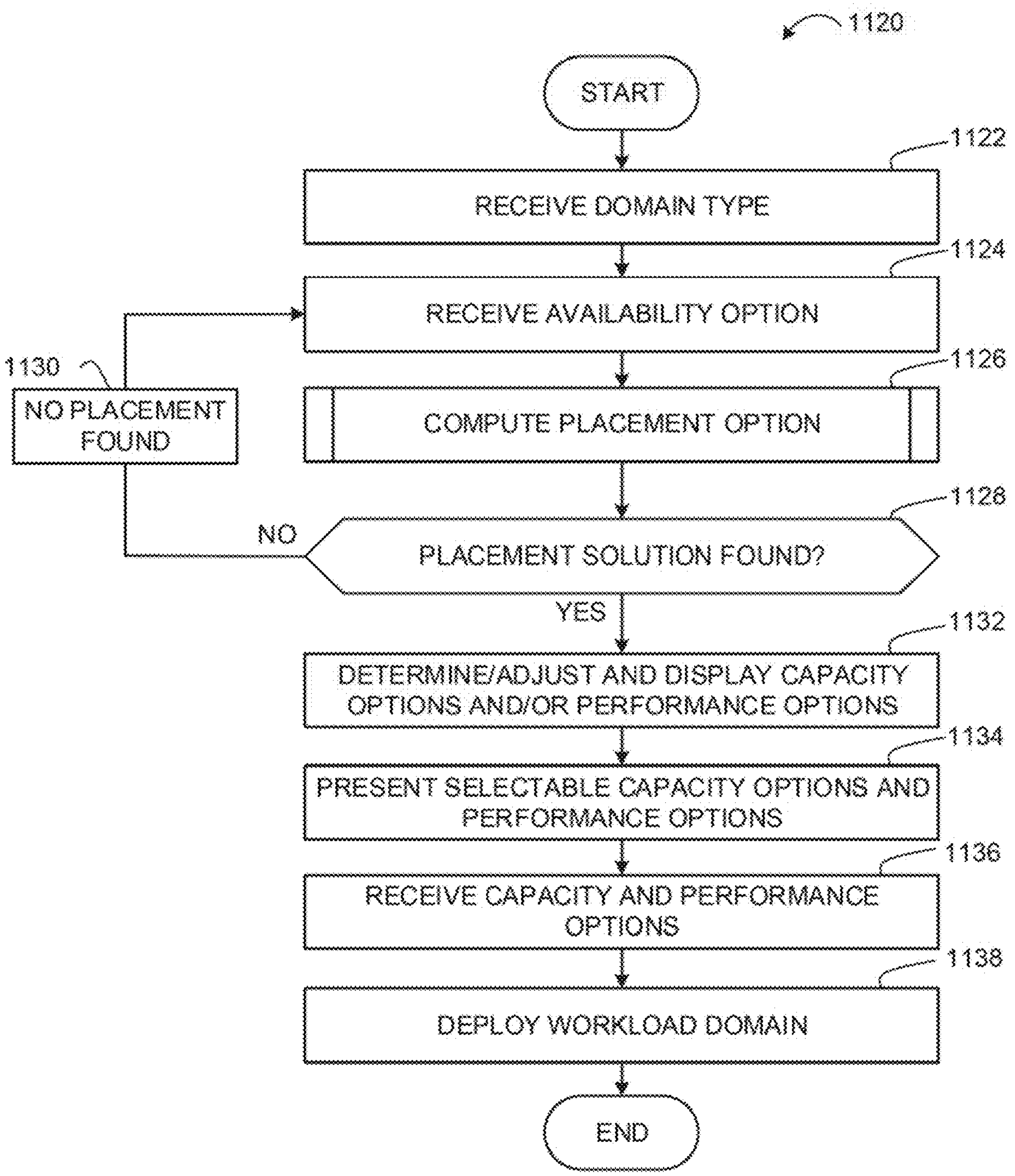
Figure 16:
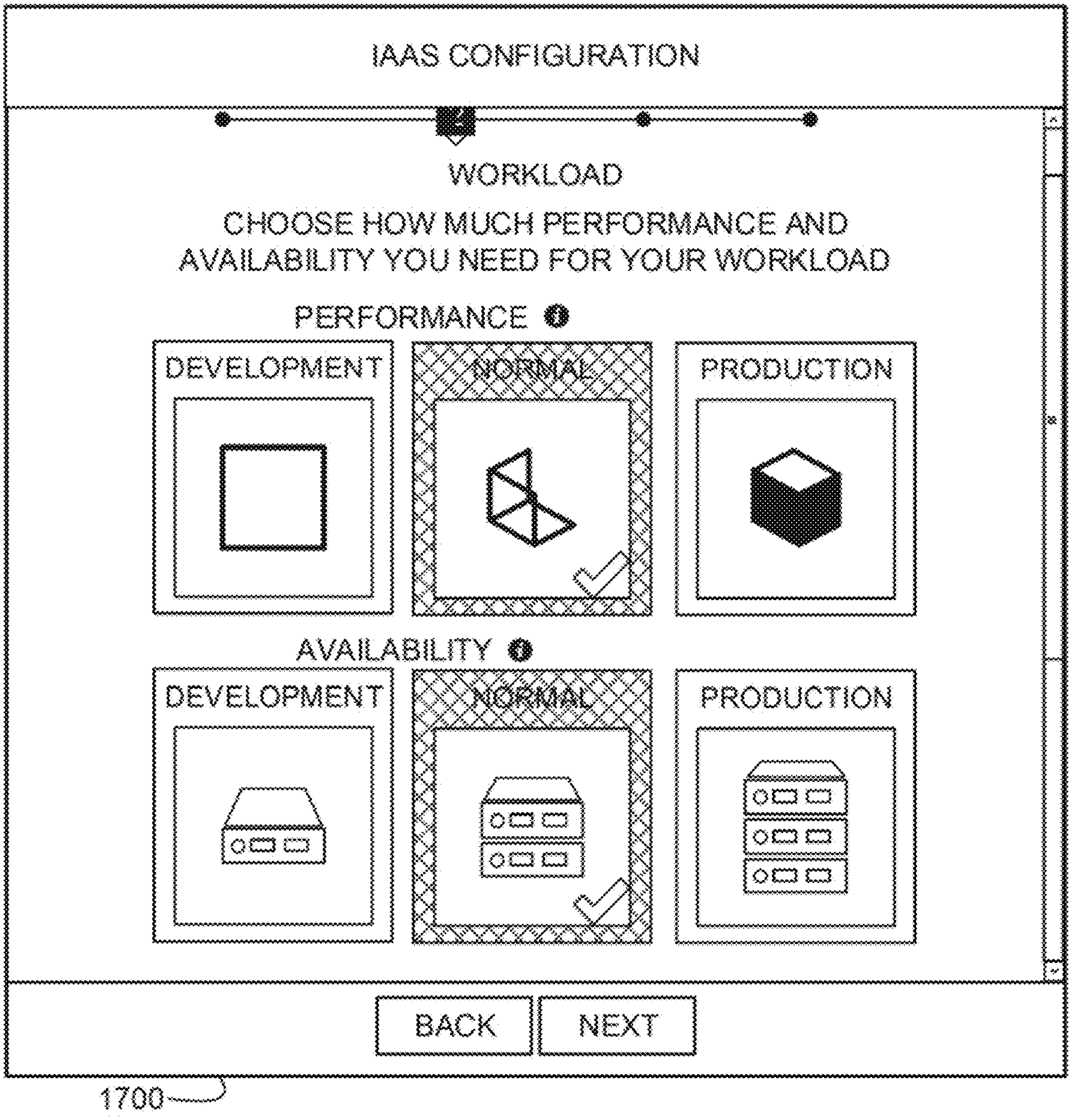
FIG. 16 depicts an example resource selection user interface screen for selecting resources for use based on performance options in a workload domain.
Figure 17:
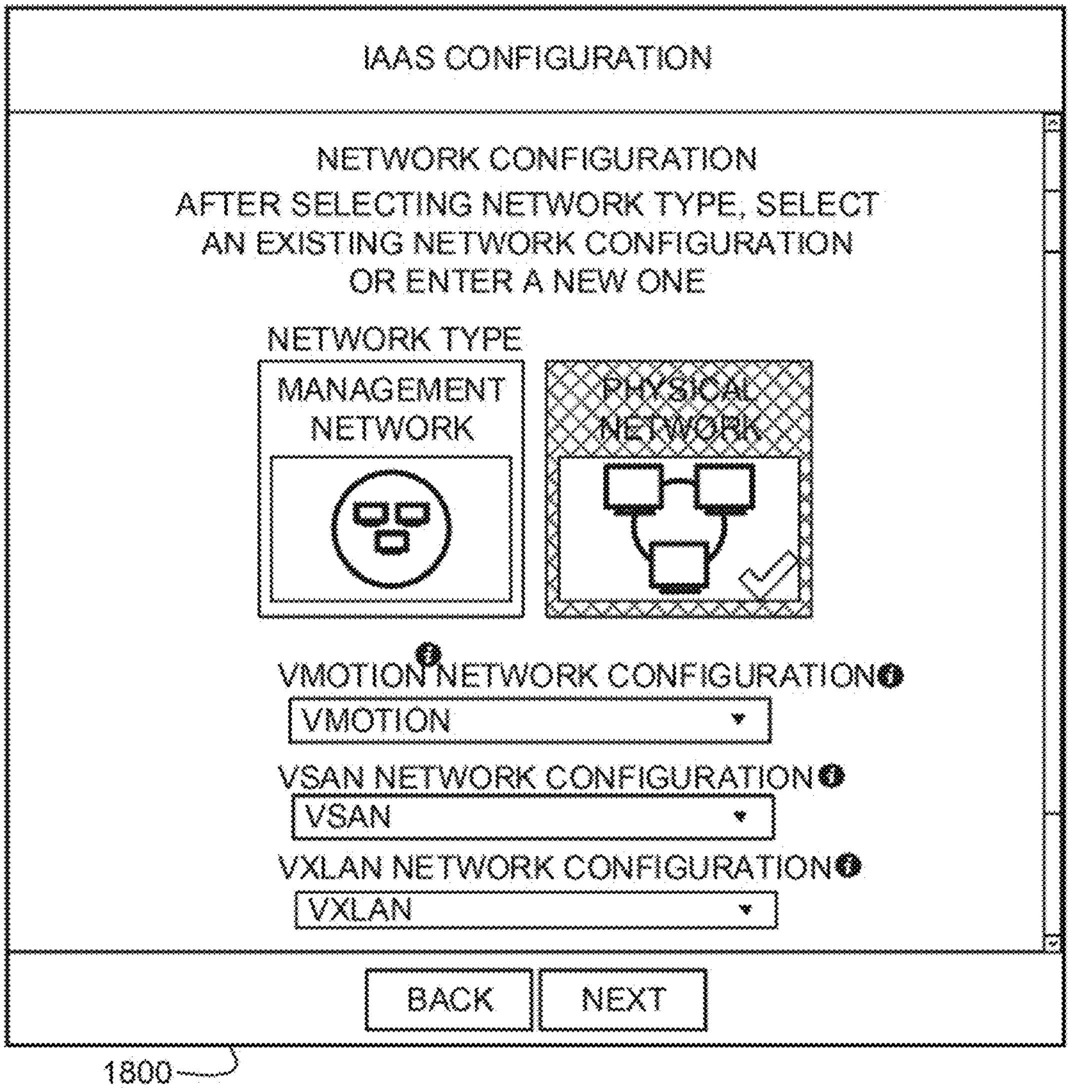
FIG. 17 depicts an example performance and availability selection user interface screen for selecting performance and availability for use in a workload domain.

FIGS. 11A and 11B depict flowcharts representative of computer readable instructions that may be executed to implement the example operations and management component 406 (FIGS. 4, 5, 7, 9, and 10) to deploy workload domains. An example program 1100 is illustrated in FIG. 11A. Initially at block 1102, the example policy manager 1002 receives a domain type of a workload domain (e.g., the example workload domain 902) specified by a user. For example, the policy manager 1002 instructs a user interface screen to be presented (e.g., via a user interface such as, for example, configuration UI 540 of FIG. 5) via which the user may specify a domain type for a workload domain to configure and deploy. The example policy manager 1002 displays one or more availability option(s) and/or one or more performance option(s) corresponding to the received domain type to the user via the user interface screen (block 1104). In some examples, the policy manager 1002 may present a user interface screen 1600 of FIG. 16 to obtain specific performance options from a user. In the illustrated example of FIG. 16, slider controls 1602 are used to enable a user to specify a CPU requirement (e.g., clock speed), a memory requirement, and/or a storage requirement. In some examples, the policy manager 1002 may present a user interface screen similar to the example performance and availability selection user interface screen 1700 of FIG. 17 to enable the user to select predefined availability and/or performance options for the workload domain 902. The example policy manager 1002 receives user-selected availability and/or performance options as specified by the user (block 1106).

Based on the received user-selected availability and/or performance options specified by the user, the example policy manager 1002 determines and/or adjusts capacity options and displays the capacity options to the user (block 1108). In some examples, only available capacity options are presented to a user. For example, presenting to a user numerous capacity options that are not compatible with the availability and/or performance options could cause significant user frustration as the user uses trial and error in selecting any one or more of such unavailable capacity options. Instead, using examples disclosed herein, the policy manager 1002 analyzes the availability and/or performance options to determine capacity options that are available based on the selected availability and/or performance options so that a user can clearly see only those capacity options that are compatible with the selected availability and/or performance options. In some examples, capacity options are only dependent on the availability options. In such examples, the policy manager 1002 determines user-selectable capacity options based on the availability option at block 1108 but does not perform a similar analysis for performance options because all performance options of the virtual server rack 206 are selectable regardless of the availability option. The example policy manager 1002 receives user-selected capacity options specified by the user.

The example deployment manager 1006 computes a placement solution based on the availability, performance, and/or capacity options selected by the user (block 1112). In the illustrated example, placement refers to identifying the physical racks in which resources will be allocated for deploying the workload domain 902. In some examples, the deployment manager 1006 uses a placement algorithm based on the user-selected availability and/or performance options to compute the placement solution. For example, the placement algorithm causes the example deployment manager 1006 to determine how many host servers to allocate, the physical racks from which the host servers will be allocated, and which host servers to allocate. In some examples, the user-selected availability option causes the placement algorithm to allocate host servers from a single rack. In other examples, the availability option may allow host servers to be allocated from across numerous racks. In rite illustrated example, the placement algorithm uses policies on availability to determine how to configure the placement of the workload domain 902.

Also at example block 1112, the deployment manager 1006 communicates with the resource manager 1010 to determine what hardware resources are available and/or to check the future availability capabilities of such hardware resources for implementing the availability and/or performance options selected by the user. In this manner, the deployment manager 1006 can determine which hardware resources in which physical racks meet the user-selected availability options specified at block 1106. In some examples, computing the placement solution includes obtaining a most recent list of accessible resources from the shared pool of configurable computing resources. For example, the resource manager 1010 tracks previous workload domain placement solutions and the resources allocated for such previous workload domain placement solutions. As resources are allocated, the resource manager 1010 removes such resources from the shared pool of configurable computing resources, such that subsequent placement solutions do not allocate the same resources. Similarly, as resources are de-allocated, the resource manager 1010 adds such resources to the shared pool of configurable computing resources, such that subsequent placement solutions can utilize such resources. The compute placement solution operation of block 1112 may be implemented a number of ways. For example, the compute placement solution may be used to reserve resources by (A) selectively filling a physical rack in a criteria-based sequence (e.g., least loaded, physical in-rack location, least-recently allocated, etc.) until the requested capacity is achieved, (B) finding a single physical rack whose capacity satisfies the requested capacity, or (C) allocating across the fewest racks required to meet VSAN fault domain requirements. An example process that may be used to implement the operation of block 1112 is described in further detail below in conjunction with FIG. 13.

In some examples, the user-selected availability option causes the deployment manager 1006 to allocate host servers from a single rack. In other examples, the user-selected availability option may cause the deployment manager 1006 to allocate host servers from across numerous racks. In some examples, when host servers are to be allocated from across numerous racks, the deployment manager 1006 selectively fills a rack with one or more workload domains using a criteria-based sequence before moving to the next rack. In some examples, when host servers are to be allocated from across numerous racks, the deployment manager 1006 allocates resources across a fewest number of racks to satisfy a fault domain requirement (e.g., at least three racks). In some examples, when host servers are to be allocated from across numerous racks, the deployment manager 1006 allocates resources across all the existing physical racks or across any number of physical racks with limit on the number of physical racks involved. In the illustrated example, the deployment manager 1006 uses policies on availability to determine how to configure the placement of the workload domain 902. Example availability policy options are shown in fable 1400 of FIG. 14. Additional policy settings that may be specified by a user at block 1106 are shown in Table 1500 of FIG. 15.

In some examples, multiple placement solutions are to be computed simultaneously or substantially simultaneously. In such examples, the shared pool of configurable computing resources changes dynamically as multiple users attempt to deploy and/or update multiple workload domains. Accordingly, the example deployment manager 1006 first determines whether a solution has been found based on the availability, performance, and capacity options selected by the user and the most recent list of accessible resources (block 1114). For example, the deployment manager 1006 determines whether sufficient hardware resources in a single physical rack or across numerous physical racks have been found to meet the availability and/or performance options specified at block 1106. If a placement solution is not found (block 1114: NO), the example deployment manager 1006 presents a message indicating no placement was found and control returns to block 1104 with updated availability and/or performance options for the user to select. If a solution is found (block 1114: YES), the resource manager 1010 determines if the resources have been reserved (block 1116) (e.g., the resource manager 1010 attempts to reserve the resources to prevent them from being used by another user). If reservation of the resources is successful (block 1116: YES), the example resource manager 1012 removes the reserved resource(s) from the shared pool of configurable computing resources and control proceeds to block 1118. However, if reservation of the resources is not successful (e.g., due to the resources being allocated to another workload domain being deployed simultaneously or substantially simultaneously) (block 1116: NO), control returns to block 1104 with updated availability and/or performance options for the user to select.

Figure 18:
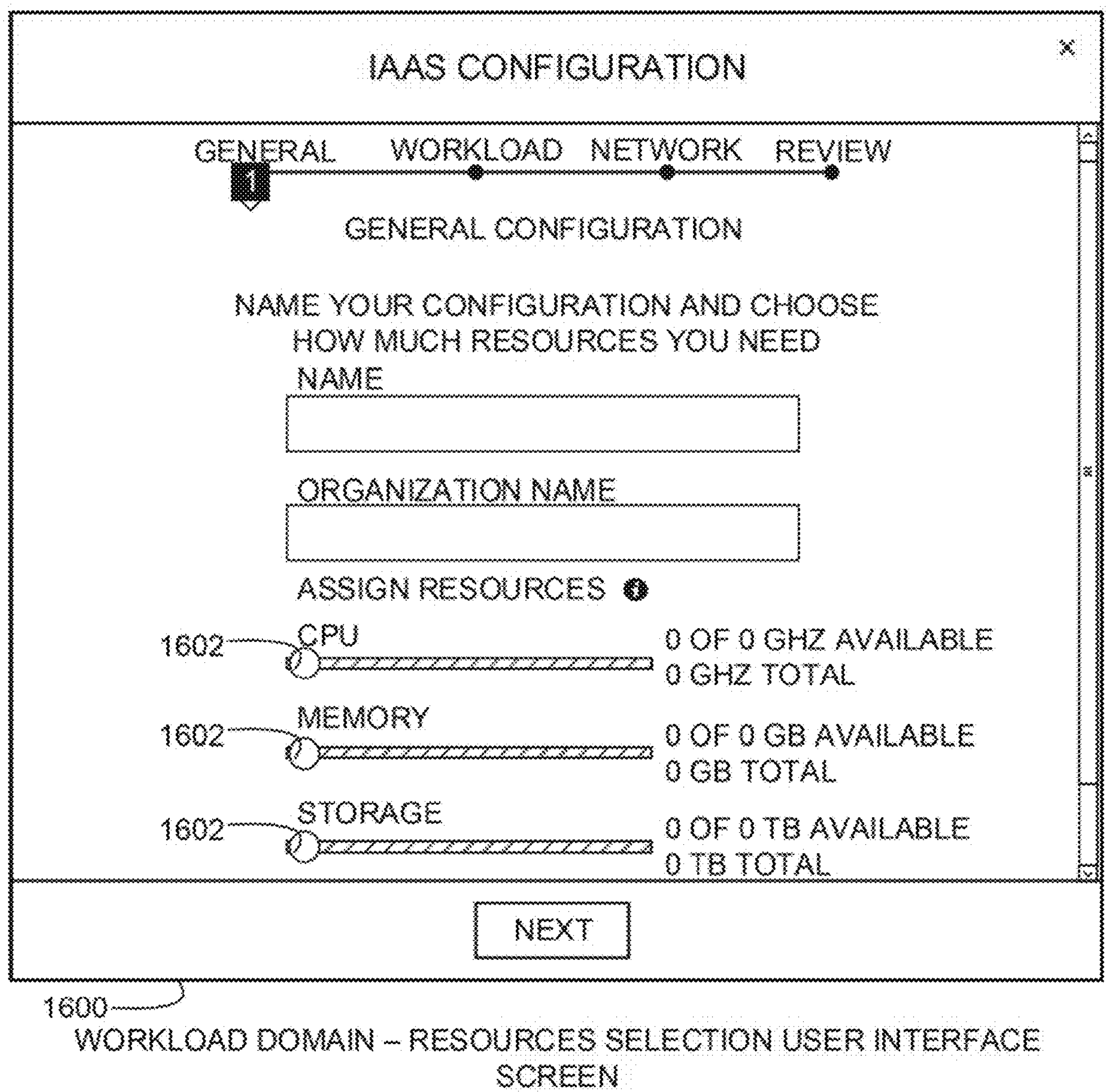
FIG. 18 depicts an example network configuration user interface screen for selecting network configurations for use with a workload domain.

At block 1118, the example deployment manager 1006 deploys the workload domain 902 based on the reserved resources. In some examples, the example deployment manager 1006 deploys the workload domain 902 after user confirmation and/or denial. In such examples, the reserved resources are held until the user confirms or rejects deployment of the workload domain 902. In this manner, multiple users can search availability capacity in parallel to fulfill desired workload requirements. For example, the workload domain 902 is configured and deployed based on the user-selected domain type determined at block 1102, the user-selected availability option and/or the user-selected performance option determined at block 1106, and the user-selected capacity option determined at block 1110. The example program 1100 of FIG. 11A then ends. In some examples, before deploying the workload domain 902 at block 1118, the deployment manager 1006 may also request network configuration requirements from a user. For example, the deployment manager 1006 may present an example network configuration user interface screen 1800 of FIG. 18 to solicit network configuration requirements form the user. In addition, in some examples, the policy manager 1002 may request security requirements from a user. For example, the policy manager 1002 may present a security configuration user interface screen via which a user may specify security options (e.g., firewall settings, security group settings, specified IP addresses, etc.) to implement in connection with a requested workload domain. As such, the deployment manager 1010 may deploy the workload domain 902 at block 1118 based on user-specified network configuration requirements, security requirements, the domain type of block 1102, the user-selected availability option and the user-selected performance option determined at block 1106, and the user-selected capacity option determined at block 1110.

Although the example program 1100 of FIG. 11A is described in connection with configuring and deploying a single workload domain, the example program 1100 of FIG. 11A implemented in accordance with the teachings of this disclosure can be used in a multi-user scenario in which hundreds or thousands of users obtain workload domain services from the virtual server rack 206. For example, while manually configuring workload domains in a manual fashion for such quantities of users would be overly burdensome or near impossible within required time constraints, examples disclosed herein may be used to process workload domain request using the operations and management component 406 to configure and deploy large quantities of workload domains in an efficient and streamlined fashion without burdening and frustrating end users with long wait times to access such workload domains.

An example program 1120 is illustrated in FIG. 11B. Initially at block 1122, the example policy manager 1002 receives a domain type specified by a user. For example, the example policy manager 1002 may present a user interface screen via which the user may specify a domain type for a workload domain to configure and deploy. The example policy manager 1002 receives an availability option specified by a user (block 1124). For example, the example policy manager 1002 may present a user interface screen similar to an example performance and availability selection user interface screen 1700 of FIG. 17 to enable a user to specify a particular availability for the workload domain 902 to be deployed.

The example deployment manager 1006 computes a placement option (block 1126). In the illustrated example, placement refers to locating the physical racks in which resources will be allocated for deploying the workload domain 902. The example deployment manager 1006 uses a placement algorithm based on the availability selection to compute the placement option. For example, the placement algorithm causes the example deployment manager 1006 to determine how many host servers to allocate, the physical racks from which the host servers will be allocated, and which host servers to allocate. In some examples, the user-requested availability option causes the placement algorithm to allocate host servers from a single rack. In other examples, the availability option may allow host servers to be allocated from across numerous racks. In the illustrated example, the placement algorithm uses policies on availability to determine how to configure the placement of the workload domain 902.

Also at example block 1126, the deployment manager 1006 communicates with the resource manager 1010 to determine what hardware resources are available and/or to check the future availability capabilities of such hardware resources. In this manner, the example deployment manager 1006 determines which hardware resources in which physical racks meet the availability options specified at block 1124. In some examples, the example process described below in connection with FIG. 13 may be used to compute the placement solution at block 1126.

The example deployment manager 1006 determines whether a solution has been found (block 1128). For example, the deployment manager 1006 determines whether sufficient hardware resources in a single physical rack or across numerous physical racks have been found to meet the availability options specified at block 1124. If a placement solution is not found (block 1128: NO), the example deployment manager 1006 presents a message indicating no placement was found (block 1130) and control returns to block 1124 to receive a different availability option from the user.

If a solution is found (block 1128: YES), the resources are reserved to prevent them from being used by another user and the example policy manager 1002 determines/adjusts capacity options and/or performance options selectable by a user (block 1132). For example, the example policy manager 1002 determines capacity options anchor performance options that are selectable by a user based on the placement solution determined at block 1126. In this manner, the example policy manager 1002 can present only capacity options and/or performance options that are useable with the determined placement option. For example, presenting to a user numerous capacity options and/or performance options that are not available or compatible with the placement solution could cause significant user frustration as the user uses trial and error in selecting any one or more of such unavailable capacity options and/or performance options. Instead, using examples disclosed herein, the example policy manager 1002 analyzes the placement solution to determine capacity options and/or performance options that are available based on the placement solution so that a user can clearly see only those capacity options and/or performance options that are compatible with the placement solution. In some examples, only capacity options are dependent on the placement solution, and performance options are independent of the placement solution. In such examples, the example policy manager 1002 determines user-selectable capacity options based on the placement solution at block 1132 but does not perform a similar analysis for performance options because all performance options of the virtual server rack 200 are selectable regardless of the placement solution.

The example policy manager 1002 presents the user-selectable capacity options and performance options at block 1134. For example, the policy manager 1002 may present an example resources selection user interface screen 1600 of FIG. 16 to obtain user-specified performance and capacity options from a user. In the illustrated example of FIG. 16, slider controls 1602 are used to enable a user to specify a CPU (performance) requirement, a memory (performance) requirement, and a storage (capacity) requirement. The example policy manager 1002 receives capacity and performance options specified by the user (block 1136). The example deployment manager 1006 then deploys the workload domain 902 (block 1138). For example, the workload domain 902 is configured and deployed based on the domain type of block 1122, the availability option of block 1124, the placement solution of block 1126, and the capacity and performance options of block 1136. The example program 1120 of FIG. 11B then ends.

Figure 12A:
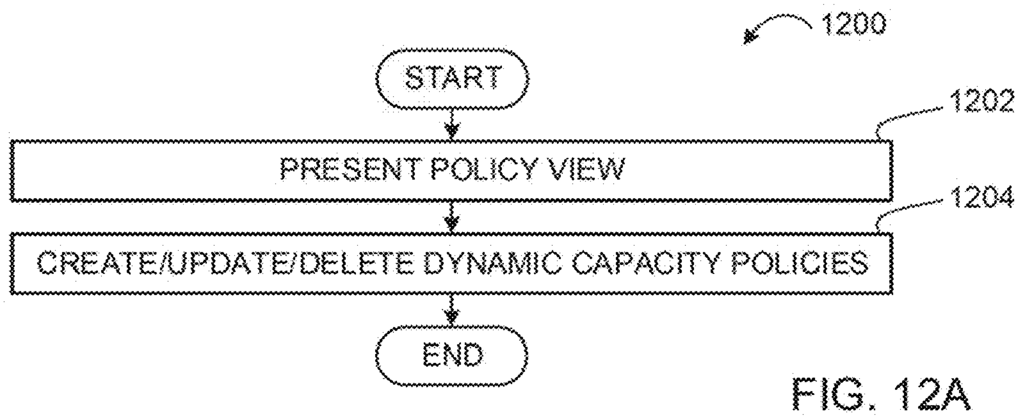
FIGS. 12A-12D depict flowcharts representative of computer readable instructions that may be executed to implement the example operations and management component of FIG. 10 to manage workload domains.
Figure 12B:
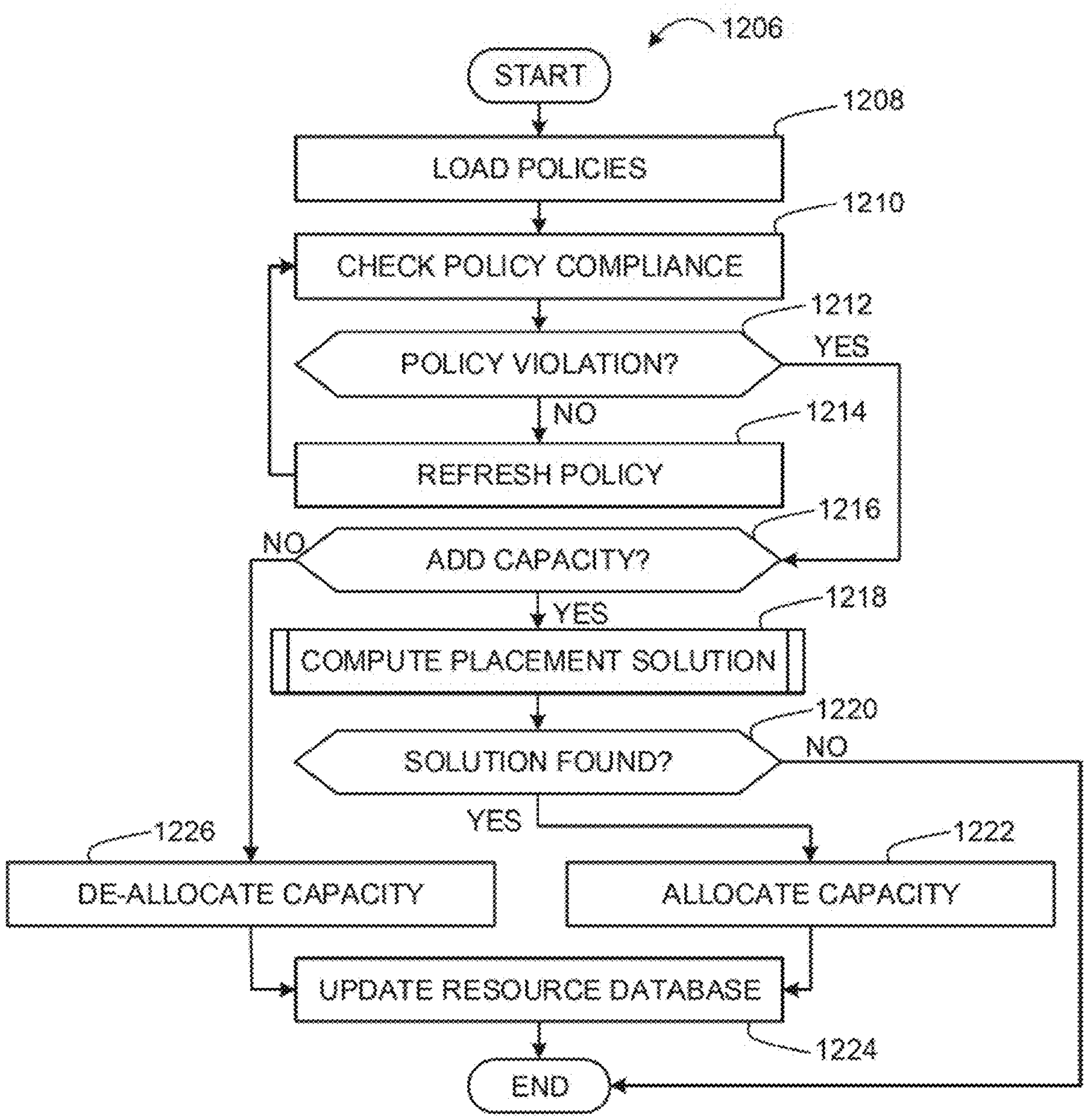

FIGS. 12A and 12B depict flowcharts representative of computer readable instructions that may be used to implement the operations and management component 406 of FIGS. 4, 5, 7, 9, and 10 to manage workload domains. An example user-interface program 1200 is illustrated in FIG. 12A. At block 1202, the example policy manager 1002 presents a policy management view to a user through a user-interface. The policy management view allows users (e.g., customers) to create (e.g., define), update (e.g., change), and/or delete (e.g., remove) policies related to capacities of workload domains (block 1204). In some examples, the policy management view allows users to create, update, and/or delete policies relating to other options of workload domains such as, for example, security, availability, and/or performance options. The example policy manager 1002 stores information relating to the created, updated, and/or deleted policies in association with the corresponding workload domains in the example policy database 1008. Thereafter, the example user-interface program 1200 ends.

An example back-end program 1206 is illustrated in FIG. 12B. At block 1208, the example policy manager 1002 loads policies from the example policy database 1008. The example policy enforcer 1004 checks policy compliance at block 1210 by, for example, evaluating whether a capacity of a workload domain in compliance with a capacity associated with a user-defined policy for the workload domain 902 (e.g., created, updated, or deleted at block 1204). At block 1212, the example policy enforcer 1004 determines whether there is a policy violation.

In some examples, the policy enforcer 1004 determines there is a violation when the capacity of the workload domain 902 does not match the policy capacity specified in the user-defined policy for the workload domain 902. For example, the policy enforcer 1004 determines a first policy capacity specified in the user-defined policy for the workload domain 902 at a first time (e.g., prior to the user-defined policy being updated) and compares the first policy capacity to a second policy capacity specified in the user-defined policy for the workload domain 902 at a second time (e.g., after the user-defined policy has been updated).

In some examples, the policy enforcer 1004 determines that the capacity of the workload domain 902 exceeds the policy capacity specified in the user-defined policy when the first policy capacity is greater than the second policy capacity. In some examples, the policy enforcer 1004 determines that the capacity of the workload domain 902 is less than the policy capacity specified in the user-defined policy when the first policy capacity is less than the second policy capacity. In some examples, the policy enforcer 1004 determines that the capacity of the workload domain 902 is in compliance with the policy capacity specified in the user-defined policy when the first policy capacity is identical to the second policy capacity. In some examples, the policy enforcer 1004 determines there is a policy violation only when the first policy capacity exceeds than the second policy capacity by a threshold amount and/or when the first policy capacity is less than the second policy capacity by a threshold amount. In such examples, the threshold amount acts as a buffer to prevent constant allocation and/or de-allocation. In some such examples, the threshold amount may be –/– five percent of the total capacity.

If the example policy enforcer 1004 determines there is no policy violation (e.g., the capacity of the workload domain 902 is in compliance with the policy capacity specified in the user-defined policy for the workload domain 902) (block 1212: NO), then control proceeds to block 1214. Otherwise (block 1212: YES), control proceeds to block 1216.

At block 1214, the example policy manager 1002 refreshes or otherwise reloads the policies. In some examples, the policy manager 1002 updates the user-defined policy according to instructions received by a user at block 1204. In such examples, the example policy enforcer 1004 reevaluates, in response to determining drat the policy manager 1002 updated the user-defined policy, whether the capacity of the workload domain 902 is in compliance with the policy capacity specified in the user-defined policy, as disclosed above. In some examples, the example policy enforcer 1004 reevaluates whether the capacity of the workload domain 902 is in compliance with the policy capacity specified in the user-defined policy after a threshold amount of time has elapsed since the policy enforcer 1004 last evaluated whether the capacity of the workload domain 902 complied with the policy capacity. This process may continue to loop as policies are updated by users.

At block 1216, the example resource manager 1010 determines whether to add capacity to the workload domain 902 based on a type of policy violation. For example, the resource manager 1010 is to add capacity when the capacity of the workload domain 902 is less than policy capacity specified in the user-defined policy and the resource manager is to not add capacity when the capacity of the workload domain 902 exceeds the policy capacity specified in the user-defined policy. Thus, if the example resource manager 1010 determines to add capacity to the workload domain 902 (block 1216: YES), control proceeds to block 1218. At block 1218, the example deployment manager 1006 determines a placement solution for additional capacity for the workload domain 902. For example, the deployment manager 1006 identifies first ones of a plurality of computing resources to form a placement solution for the workload domain 902 based on the difference between the current capacity of the workload domain 902 and policy capacity of the user-defined policy based on user-selection of the availability, performance, and/or capacity options. The example deployment manager 1006 may determine a placement solution as disclosed above with reference to block 1112 (FIG. 11A) or block 1126 (FIG. 11B). In some examples, the example process described below in connection with FIG. 13 may be used to compute the placement solution at block 1218.

If a placement solution is found (block 1220: YES), control proceeds to block 1222. Otherwise (block 1220: NO), the example back-end program 1206 ceases operation. At block 1222, the resource manager 1010 is to allocate resources to the workload domain 902 based on the placement solution determined at block 1218. In some examples, the allocated resources are immediately provisioned after allocation. Thereafter, the example resource manager 1010 updates the example resource database 1012 to remove the allocated resources from the shared pool of configurable resources (block 1224) and the example back-end program 1206 ends.

However, if the example resource manager 1010 determines to not add capacity to the workload domain 902 (block 1216: NO), control proceeds to block 1226. At block 1226, the resource manager 1010 is to de-allocate resources associated with excess capacity from the workload domain 902. In some examples, the de-allocated resources are de-provisioned prior to de-allocation. Thereafter, the example resource manager 1010 updates the example resource database 1012 to add the de-allocated resources to the shared pool of configurable resources (block 1224) and the example back-end program 1206 ends.

In some examples, the policy enforcer 1004 is to evaluate whether capacities of a plurality of workload domains comply with policy capacities of policies defined by multiple users of the plurality of workload domains. In some such examples, the resource manager 1010 is to, when ones of the capacities of the plurality of workload domains exceed the policy capacities of the respective user-defined policies, de-allocate resources associated with excess capacity from the plurality of workload domains. In some such examples, the deployment manager 1006 is to, when ones of the capacities of the plurality of workload domains are less than the policy capacities of the respective user-defined policies, concurrently determine a plurality of placement solutions for additional capacity for the plurality of workload domains based on a comparative analysis of the capacities of the plurality of workload domains, updates to the respective user-defined policies, and the example resource database 1012 shared by the multiple users. In some such examples, the resource manager 1010 is to allocate resources to the plurality of workload domains based on the plurality of placement solutions.

As disclosed above, hundreds or thousands of users may update his or her respective policy requesting an increase or decrease in capacity of his or her respective workload domain. While manually updating workload domains in a manual fashion for such quantities of users would be overly burdensome or near impossible within required time constraints, examples disclosed herein may be used to process workload domain requests to configure and/or update large quantities of workload domains for a plurality of users in an efficient and streamlined fashion without burdening and frustrating end users with long wait times to access such workload domains.

Figure 12C:
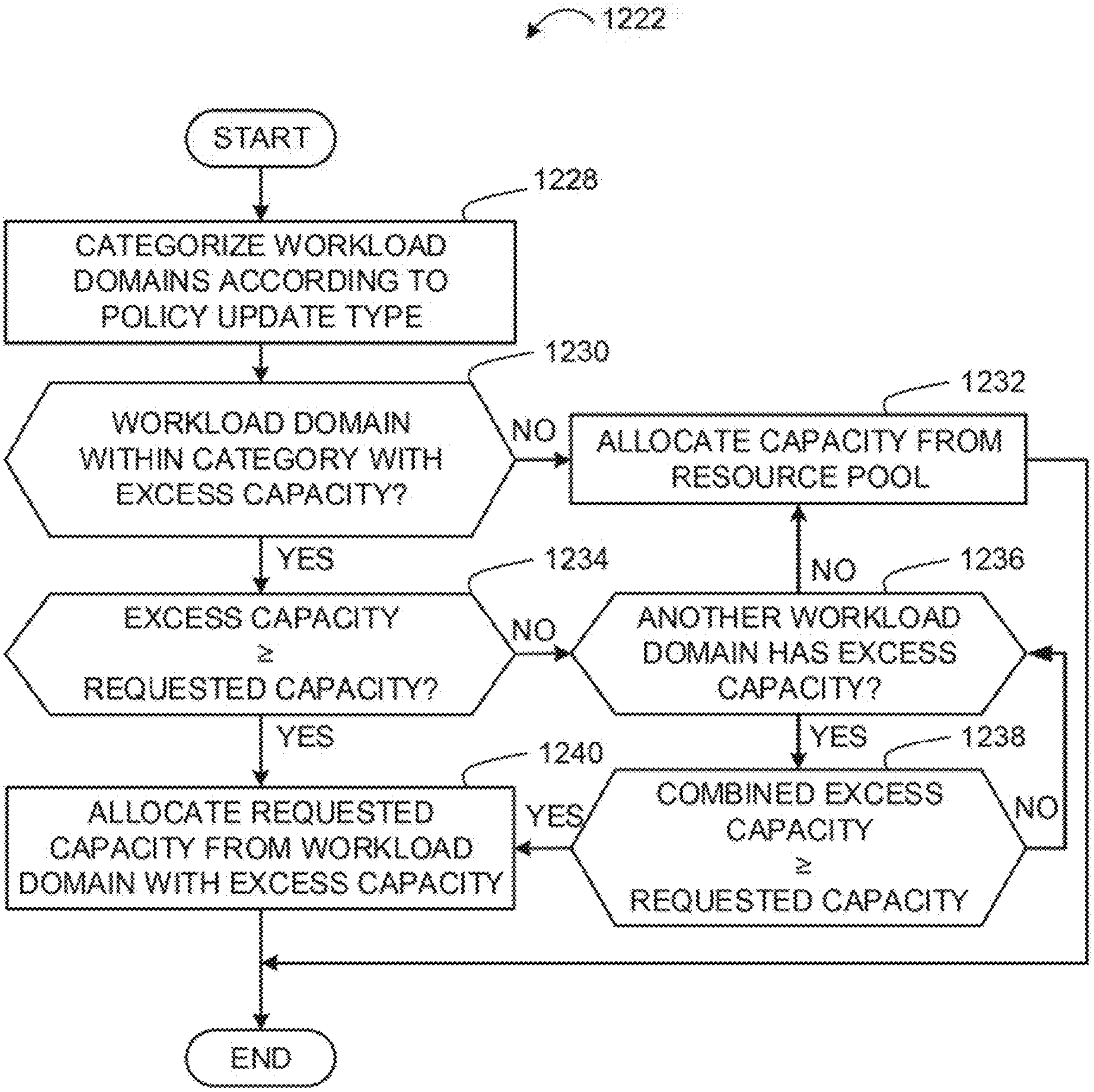

FIG. 12C is a flowchart illustrating example computer-readable instructions to implement block 1222 of FIG. 12B to allocate capacity to a first workload domain. The example implementation of block 1222 begins at block 1228. At block 1228, the example policy enforcer 1004 categorizes existing workload domains based on a type of update to user defined policies. For example, the example policy enforcer 1004 may group together workload domains having updates reflecting a request for additional or a request to release excess CPU capacity, storage capacity, memory capacity, etc. At block 1230, the example policy enforcer 1004 determines whether there is a second workload domain within a same category as the first workload domain that has excess capacity. For example, where an update to the user defined policy associated with the first workload domain reflects a request for additional capacity, the policy enforcer 1004 determines whether an update to the user-defined policy associated with the second workload domain reflects a request to release excess capacity In such examples, the policy enforcer 1004 first looks to address updates to workload domains using other workload domains prior to utilizing the finite shared resources pool (e.g., due to its finite nature). If the example policy enforcer 1004 determines there is no other workload domains within the same category that have excess capacity (block 1230: NO), control proceeds to block 1232. At block 1232, the resource manager 1010 allocates the capacity requested by the update to the first workload domain from the finite shared resource pool. Thereafter, the example implementation of block 1222 ceases operation.

If the example policy enforcer 1004 determines there is another workload domain (e.g., the second workload domain) within the same category that has excess capacity (block 1230: YES), then control proceeds to block 1234. At block 1234, the resource manager 1010 determines whether the excess capacity associated with the second workload domain is greater than or equal to the capacity requested by the update to the first workload domain. If the resource manager 1010 determines the excess capacity associated with the second workload domain is less than the capacity requested by the update to the first workload domain (block 1234: NO), control proceeds to block 1236. At block 1236, the policy enforcer 1004 determines whether there is another workload domain (e.g., a third workload domain) within the same category as the first workload domain that has excess capacity. If the policy enforcer 1004 determines there is no other workload domain within the same category as the first workload domain that has excess capacity (block 1236: NO), control proceeds to block 1232. However, if the policy enforcer 1004 determines there is a third workload domain within the same category as the first workload domain that has excess capacity (block 1236: YES), control proceeds to block 1238.

At block 1238, the resource manager 1010 determines whether the excess capacity associated with the aggregate of the second and third workload domains is greater than or equal to the capacity requested by the update to the first workload domain. If the resource manager 1010 determines the excess capacity associated with the combination of the second and third workload domains is less than the capacity requested by the update to the first workload domain (block 1238: NO), control returns to block 1236. If the resource manager 1010 determines the excess capacity associated with the combination of the second and third workload domains is greater than or equal to the capacity requested by the update to the first workload domain (block 1238: YES) or if the resource manager 1010 determines the excess capacity associated with the second workload domain is greater than or equal to the capacity requested by the update to the first workload domain (block 1234: YES), control proceeds to block 1240. At block 1240, the example resource manager 1010 allocates the capacity requested by the update to the first workload domain from the workload domain(s) (e.g., second, third, fourth, etc. workload domains) with excess capacity. Thereafter, the example implementation of block 1222 ceases operation.

Figure 12D:
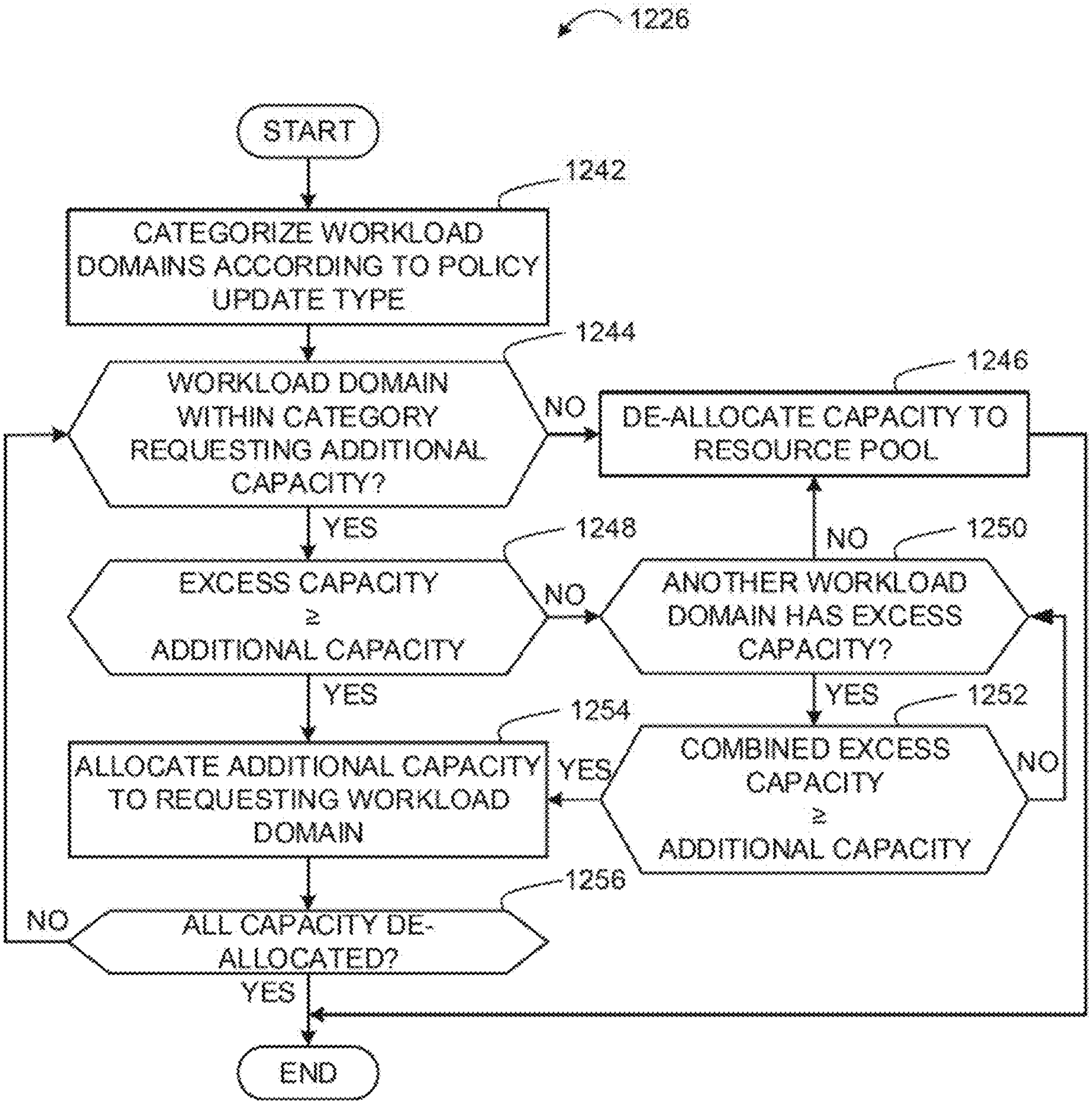

FIG. 12D is a flowchart illustrating example computer-readable instructions to implement block 1226 of FIG. 12B to de-allocate capacity from the first workload domain. The example implementation of block 1226 begins at block 1242. At block 1242, the example policy enforcer 1004 categorizes existing workload domains based on a type of update to user defined policies. At block 1244, the example policy enforcer 1004 determines whether there is a second workload domain within a same category as the first workload domain that is requesting additional capacity. For example, where an update to the user-defined policy associated with the first workload domain reflects a request to release excess capacity, the policy enforcer 1004 determines whether an update to the user-defined policy associated with the second workload domain reflects a request for additional capacity In such examples, the resource manager 1010 first looks to address updates to workload domains using other workload domains prior to utilizing the finite shared resources pool (e.g., due to its finite nature). If the example policy enforcer 1004 determines there is no other workload domains within the same category that are requesting additional capacity (block 1244: NO), control proceeds to block 1246. At block 1246, the resource manager 1010 de-allocates the capacity from first workload domain to the finite shared resource pool. Thereafter, the example implementation of block 1226 ceases operation.

If the example policy enforcer 1004 determines there is another workload domain (e.g., the second workload domain) within the same category that is requesting additional capacity (block 1244: YES), then control proceeds to block 1248. At block 1248, the resource manager 1010 determines whether the excess capacity associated with the first workload domain is greater than or equal to the capacity requested by the update to the second workload domain. If the resource manager 1010 determines the excess capacity associated with the first workload domain is less than the capacity requested by the update to the second workload domain (block 1248: NO), control proceeds to block 1250. At block 1250, the policy enforcer 1004 determines whether there is another workload domain (e.g., a third workload domain) within the same category as the first workload domain that has excess capacity. If the policy enforcer 1004 determines there is no other workload domain within the same category as the first workload domain that has excess capacity (block 1250: NO), control proceeds to block 1246. However, if the policy enforcer 1004 determines there is a third workload domain within the same category as the first workload domain that has excess capacity (block 1250: YES), control proceeds to block 1252.

Figure 13:
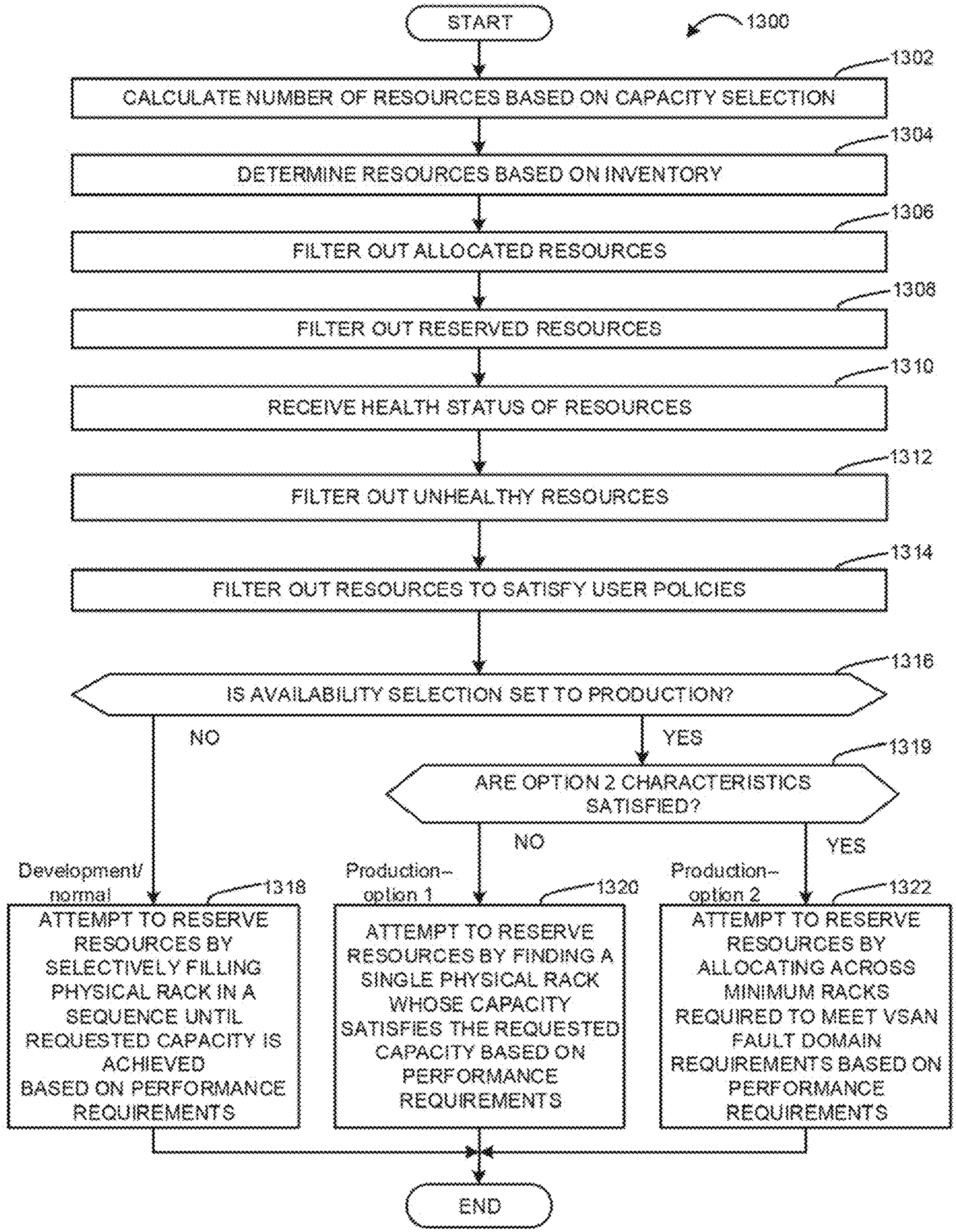
FIG. 13 depicts a flowchart representative of computer readable instructions that may be executed to implement the example operations and management component of FIG. 10 to compute a placement option for host servers.

At block 1252, the resource manager 1010 determines whether the excess capacity associated with the aggregate of the first and third workload domains is greater than or equal to the capacity requested by the update to the second workload domain. If the resource manager 1010 determines the excess capacity associated with the combination of the first and third workload domains is less than the capacity requested by the update to the second workload domain (block 1252: NO), control returns to block 1250. If the resource manager 1010 determines the excess capacity associated with the combination of the first and third workload domains is greater than or equal to the capacity requested by the update to the second workload domain (block 1252: YES) or if the resource manager 1010 determines the excess capacity associated with the first workload domain is greater than or equal to the capacity requested by the update to the second workload domain (block 1248: YES), control proceeds to block 1254. At block 1254, the example resource manager 1010 allocates the capacity requested by the update to the second workload domain from the workload domain(s) (e.g., first, third, fourth, etc. workload domains) with excess capacity. At block 1256, the policy enforcer 1004 determines whether all excess capacity associated with the first workload domain has been de-allocated. If the policy enforcer 1004 determines that not all excess capacity associated with the first workload domain has been de-allocated (block 1256: NO), control returns to block 1244. If the policy enforcer 1004 determines that all excess capacity associated with the first workload domain has been de-allocated (block 1256: YES), the example implementation of block 1222 ceases operation. FIG. 13 is an example flowchart 1300 representative of example machine readable instructions that may be executed to implement the example operations and management component 406 (FIGS. 4, 5, 7, 9, and 10) to deploy workload domains. In some examples, the example process of FIG. 13 may be used to implement the compute placement solution operations of block 1112 of FIG. 11A, block 1126 of FIG. 11B, and/or block 1218 of FIG. 12B.

At block 1302, the example deployment manager 1006 calculates a number of resources (e.g., host servers) necessary to satisfy the requested capacity. In the illustrated example the requested capacity is capacity requested at block 1100 of FIG. 11A anchor block 1216 of 12B. In the illustrated example, the deployment manager 1006 calculates the number of host servers based on the number of host servers necessary to satisfy the requested capacity given the host configuration. For example, if the requested capacity is for 350 GHz CPU, 1600 GB memory, and 10 TB storage, and each host server is configured for 55.2 GHz CPU, 256 GB RAM and 9.6 TB raw storage, then the example deployment manager 1006 determines that 7 host servers are necessary based on CPU (e.g., 350/55.2=6.34): 7 host servers are necessary based on memory (e.g., 1600/256=6.25); and 2 host servers are necessary based on storage (e.g., 10/9.6=1.04). In such an example, the deployment manager 1006 determines that 7 host servers are necessary to satisfy the CPU, memory, and storage requirements of the requested capacity. In some examples, the deployment manager 1006 adjusts the calculation of resources (e.g., host servers) based on storage depending on the desired FTT (e.g., the host configuration is divided by FTT+1). For example, if the desired FTT is 1, then the deployment manager 1006 determines that 3 host servers are necessary to satisfy the storage (e.g., 10/(9.6/2)=2.08), if the desired FTT is 2, then the deployment manager 1006 determines that 4 host servers are necessary to satisfy the storage (e.g., 10/(9.6/3))=3.125), etc.

At block 1304, the example deployment manager 1006 determines (e.g., identifies) all of the resources (e.g., servers) based on an inventory of multiple physical racks. In the illustrated example, the inventory stores details of the physical racks in the EVO SODS environment along with details of the resources in each rack. At block 1306, the example deployment manager 1006 filters out any allocated resources (e.g., servers) from the identified resources in the inventory. At block 1308, the example deployment manager 1006 filters out any reserved resources from the identified resources in the inventory, in this manner, the filtered resources include all of the available resources from the inventory.

At block 1310, the example deployment manager 1006 receives a health status of each of the filtered resources. As described above in conjunction with FIG. 4, monitoring systems (e.g., the example HMS monitor 428) check the health of each resource in the inventory in real time. The health of a resource includes a status of all the field replaceable unit (FRU) components of that resource. In some examples, EVO SDDC uses the HMS 208, 214 to check the health of the FRU components via import module (IPMI) calls. An EVO SDDC manager (e.g., the VRMs 225, 227 of FIG. 2) aggregates the alters from the multiple HMS modules running on each Rack to check the health of the overall environment.

At block 1312, the example deployment manager 1006 filters out resources that are unhealthy. In some examples, the example deployment manager 1006 determines that a server is unhealthy (e.g., damaged, faulty, etc.) if the resource corresponds to one or more alerts aggregated by the EVO SDDC manager. At block 1314, the example deployment manager 1006 filters out resources to satisfy user policies. The user policies are selected via the user interface screen to be presented (e.g., via a user interface such as, for example, configuration UI 540 of FIG. 5). The user policies may include location data (e.g., where the physical racks and/or resources may or may not be located), performance requirements, and/or any other user preferences. For example, if a user does not want resources physically located in a particular location, the example deployment manager 1006 removes any resources located within the particular location.

At block 1316, the example deployment manager 1006 determines if the availability selection is set to production. For example, the example availability selection user interface screen 1700 illustrated in FIG. 17 receives the availability selection from a user (e.g., corresponding to resource allocation techniques). In the illustrated example availability selection user interface screen 1700, the availability options include development (e.g., low redundancy for fault tolerance), normal (e.g., normal redundancy for fault tolerance), and production (e.g., high redundancy for fault tolerance). In some examples, the high redundancy/production availability is available as two options (e.g., option 1 and option 2) as shown in example table entries 1402 and 1404 of FIG. 14. Each availability option corresponds to a resource allocation technique, as further described below. In some examples, as illustrated in the example Table 1400 of FIG. 14, option 1 (e.g., table entry 1402) is applied when a rack count threshold is not satisfied (e.g., when the rack count is less than 5) and option 2 (e.g., table entry 1404) is applied when the rack count threshold is satisfied (e.g., when the rack count is more than 5). Alternatively, option 1 (e.g., table entry 1402) and option 2 (e.g., table entry 1404) may be applied for any rack count. In some examples a user can select option 1 (e.g., table entry 1402) or option 2 (e.g., table entry 1404) via the user interface 506 of FIG. 5. Further details of the availability options are illustrated in the example availability selection user interface screen 1700.

If the deployment manager 1006 determines that the availability selection is not set to production (block 1316: NO), the example deployment manager 1006 attempts to reserve resources by selectively filling a physical rack from the filtered resources in a sequence until the requested capacity is achieved based on the performance requirements (block 1318). If the necessary resources are not available, the example deployment manager 1006 presents a message indicating no placement was found, as described above in conjunction with block 1114 of FIG. 11. In some examples, the deployment manager 1006 may reserve resources at block 1318 by using a selective fill rack placement algorithm as described above in conjunction with table 8. In some examples, the selective filling of the physical rack is based on a location sequence, a performance sequence, and/or an age sequence within a physical rack. The location sequence includes reserving a first resource of a rack, a second subsequent resource from a subsequent location in the rack, etc. The performance sequence includes reserving a first resource based on the highest performing resource of a rack, a second resource based on the next highest performing resource of the rack, etc. The age sequence includes reserving a first resource based on the oldest/youngest resource of the rack, a second resource based on the next oldest/youngest resource, etc. An example of host placement for normal availability is further described in conjunction with FIG. 19. The performance requirements used to reserve resources at block 1318 may include developmental workloads, normal (e.g., standard) workloads, and production (e.g., high performance) workloads, as illustrated in the example availability selection user interface screen 1700 of FIG. 17. The details of the performance requirements are shown below in Table 9.

TABLE 9

Performance Requirements

| Feature | Description |
|---|---|
| Development workloads | VSAN Disk Stripes = 1<br>Host Power Management Active Policy = Low Power |
| Standard workloads | VSAN Disk Stripes = 1<br>Host Power Management Active Policy = Balance |
| High performance workloads | VSAN Disk Stripes = 4<br>Host Power Management Active Policy = High Performance<br>HA - if Highly Available Option is also selected configure increased admission control HA % |

Where admission control may be adjusted as workload domain grows or shrinks described below in Table 10.

TABLE 10 vSphere HA percent of cluster development

| Hosts in Cluster | Spare Hosts | % Setting = (Spare Hosts)/(Cluster Size) |
|---|---|---|
| 4-8 | 1 | 25% to 12.5% |
| 9-16 | 2 | 22% to 12.5% |
| 17-32 | 3 | 18% to 12.5% |
| 33-64 | 4 | 12% to 6.25% |

If the deployment manager 1006 determines that the availability selection is set to production (block 1316: YES), the example deployment manager 1006 determines if the option 2 characteristics) is satisfied (block 1319). In the illustrated example, the option 2 characteristic is satisfied when a rack count of the domain type of the workload domain satisfies a rack count threshold (e.g., more than 5 racks), for example, as illustrated in the example Table 1400 of FIG. 14, if the rack count is less than five, option 1 is applied and if the rack count is greater than 5, option 2 is applied. Alternatively, a different rack count threshold may be used to distinguish between option 1 and option 2. In some examples, the characteristic is based on a setting selected by a user (e.g., the user selecting option 1 or option 2).

If the example deployment manager 1006 determines that the option 2 characteristics) is not satisfied (block 1319: NO), the example deployment manager 1006 attempts to reserve resources by finding a single physical rack whose capacity satisfies the requested capacity based on the performance requirements (block 1320). If the example deployment manager 1006 determines that the option 2 characteristic is satisfied (block 1319: YES), the example deployment manager 1006 attempts to reserve resources by allocating resources across the fewest racks required to meet VSAN fault domain (e.g., FTT) requirements based on the performance requirements (block 1322). If the necessary resources are not available at blocks 1320 or 1321, the example deployment manager 1006 presents a message indicating no placement was found, as described above in conjunction with block 1114 of FIG. 11. An example of host placement for option 2 production availability is further described in conjunction with FIG. 20.

Figure 19A:
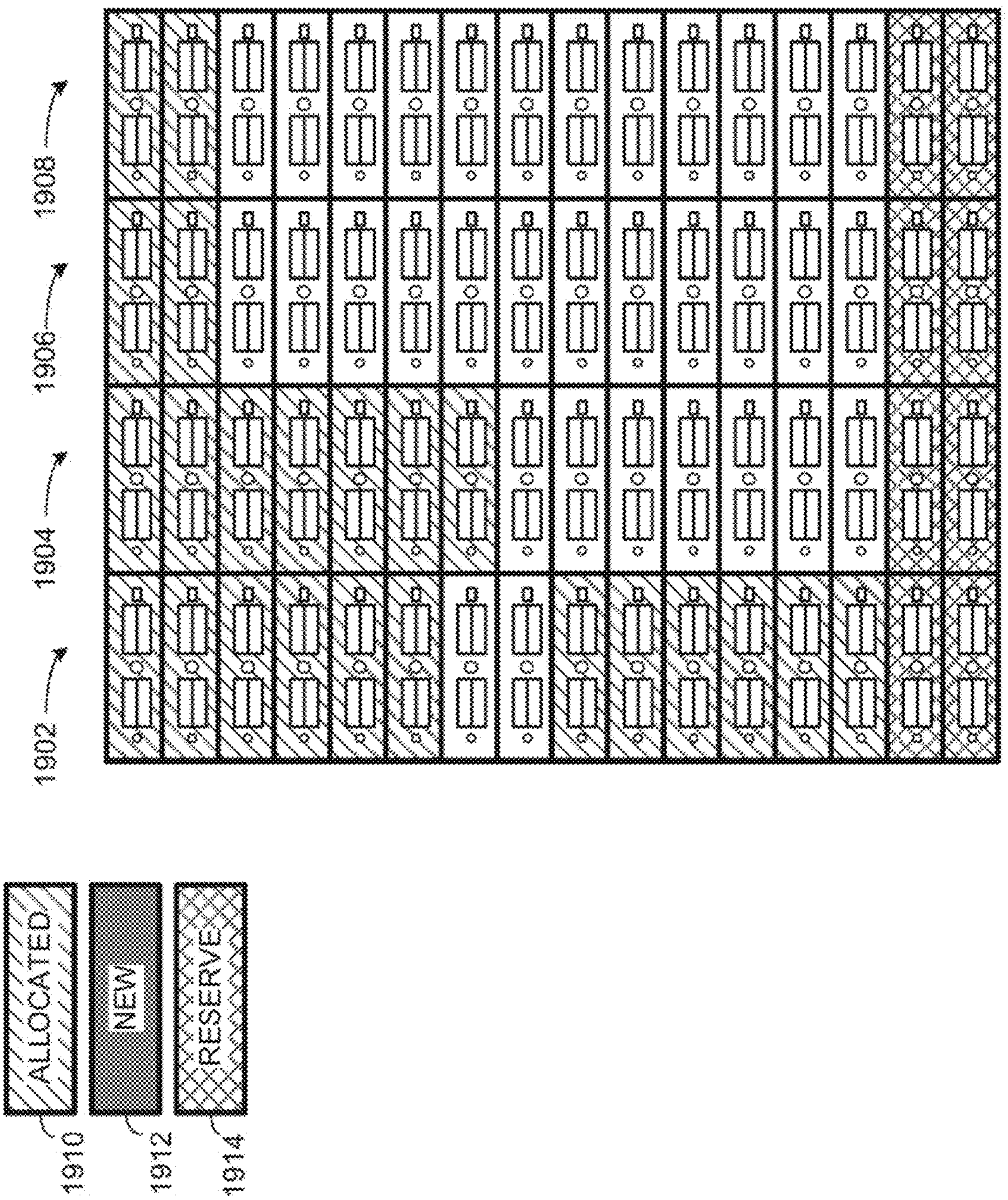
FIGS. 19A and 19B depict an example compute placement solution tor normal availability.
Figure 19B:
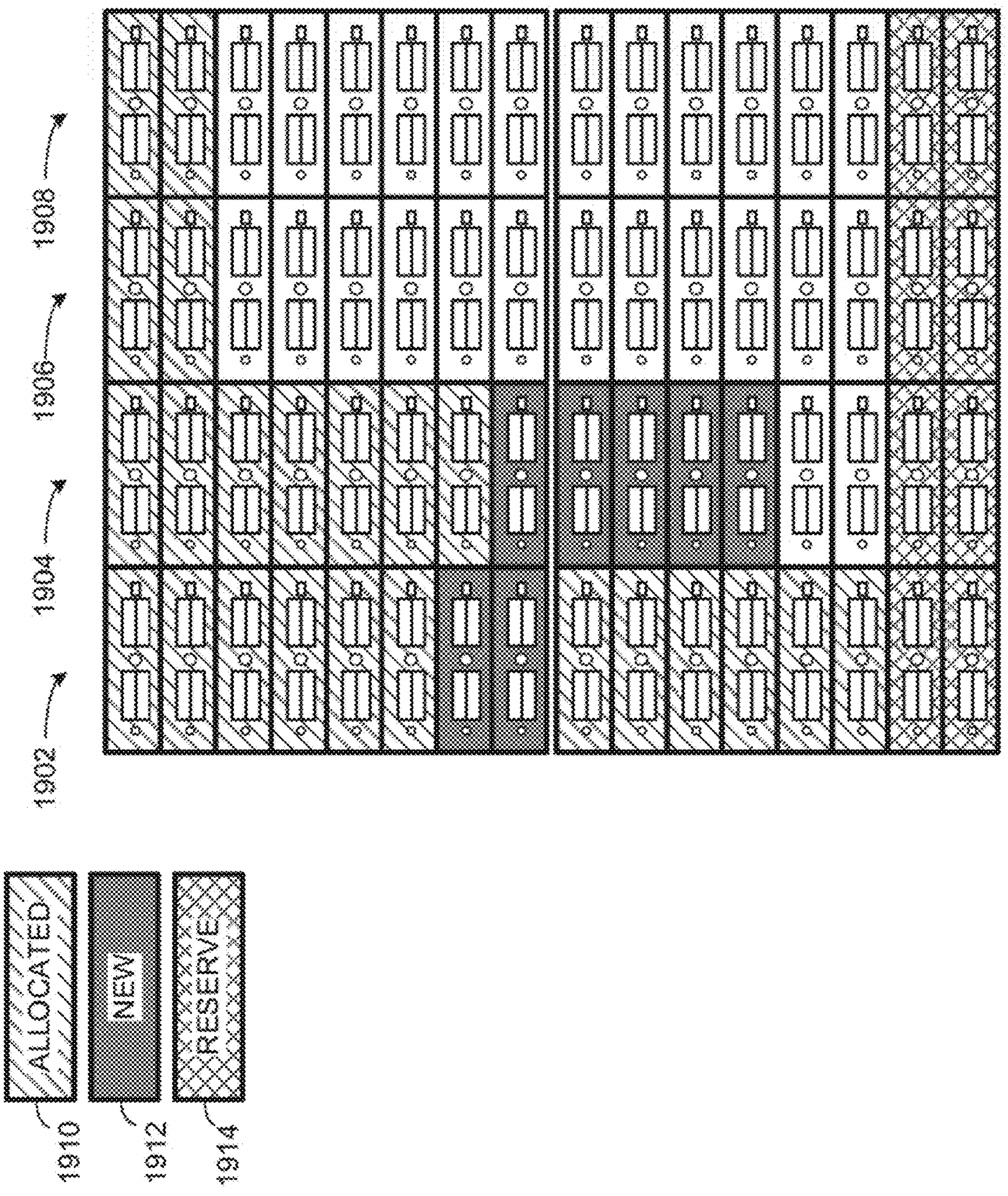

FIGS. 19A and 19B illustrate a compute placement solution when a normal availability option is selected. FIGS. 19A and 19B include example physical racks 1902-1908 (e.g., such as the physical racks 202, 204 of FIGS. 2 and 8), example allocated servers 1910, example new servers 1912, and example reserved servers 1914. The example normal availability compute solution of FIGS. 19A and 19B is based on the following requested host configuration for a workload domain: 350 GHz CPU, 1600 GB memory and 10 TB storage at a High Redundancy and standard workloads with a failure-to-tolerance of 1. Each host server (e.g., resource) in the example physical racks 1902-1908 has a host configuration of 55.2 GHz CPU, 256 GB RAM, and 9.6 TB raw storage.

When the example deployment manager 1006 of FIG. 10 computes a placement solution, the deployment manager 1006 determines the number of host servers necessary to satisfy the requested capacity based on the host configurations. In the illustrated example of FIGS. 19A and 19B, the deployment manager 1006 determines that seven host servers are necessary to satisfy the requested capacity (e.g., (350/55.2=7 host servers, 1600/256=7 host servers, and 10/(9.6/2))=3 host servers). The example deployment manager 1006 reserves the new servers 1912 based on the requested configuration after the example allocated servers 1910 and the example reserved servers 1914 have been filtered out. Using the example table 1400 of FIG. 4, the deployment manager 1006 determines that rack spanning resource allocation (e.g., allocating resources to a workload domain from more than one rack) is allowed and the placement algorithm is based on a selective fill racks algorithm. A selective fill algorithm is used to allocate some or all available resources of one rack to a workload domain before allocating additional available resources from another rack to the workload domain. In some examples, a selective fill racks algorithm includes exhausting first resources of a first physical rack before using second resources of a second physical rack. Accordingly, as shown in FIG. 19B, the example deployment manager 1006 reserves the host servers (e.g., the example new host servers 1912), in the first example rack 1902 until there are no more accessible servers, and then continues to reserve host servers in the second example rack 1904 until the seven necessary servers are reserved. In this manner, the selective fill nicks algorithm is employed by not using an additional rack until a subsequent tack is fully reserved. In other examples, the selective fill racks algorithm includes reserving some, but not all, available host servers in the first example rack 1902 and then continue to reserve host servers in the second example rack 1904 (based on optimization of resource allocation).

Figure 20A:
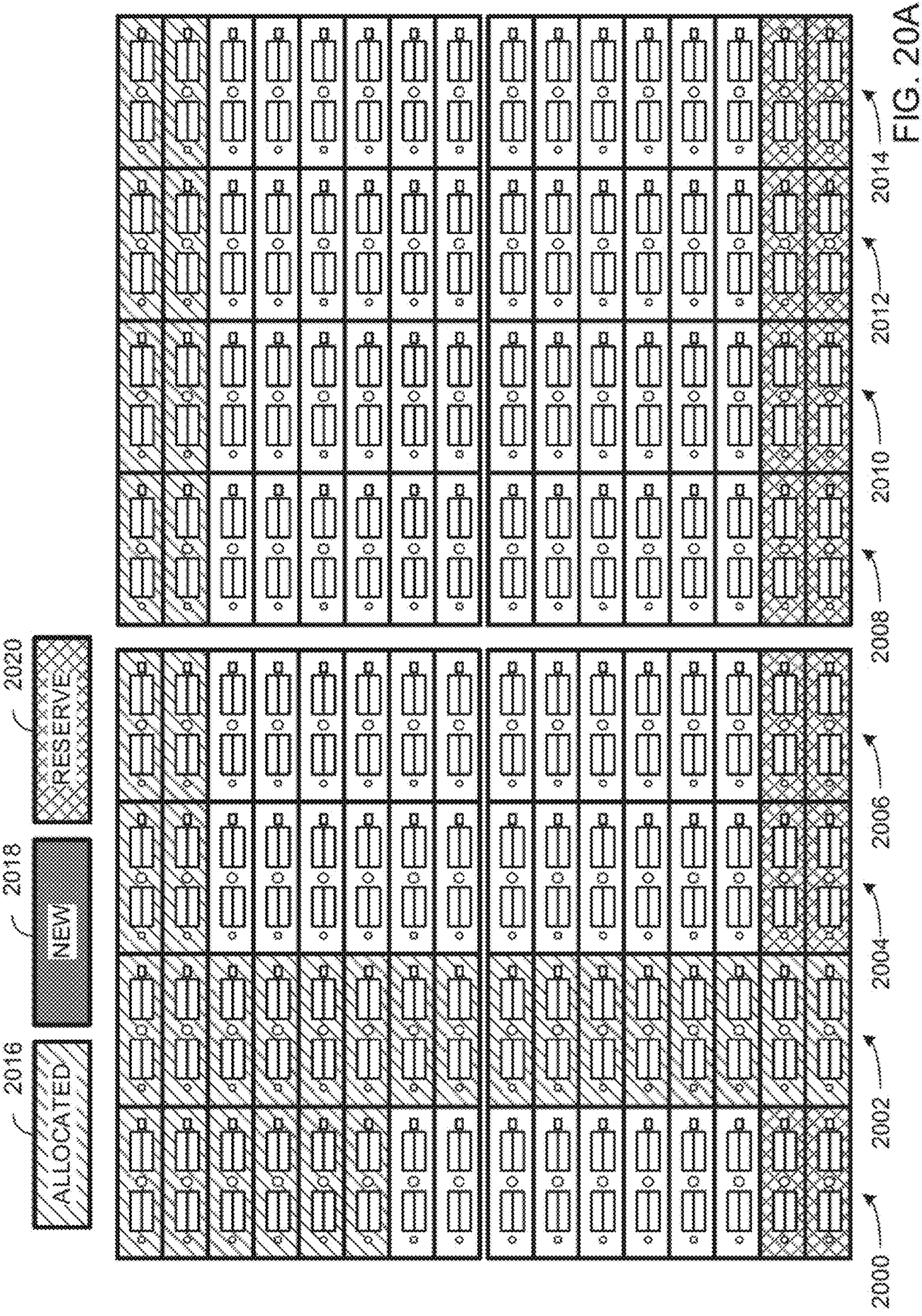
FIGS. 20A and 20B depict an example compute placement solution for production availability.
Figure 20B:
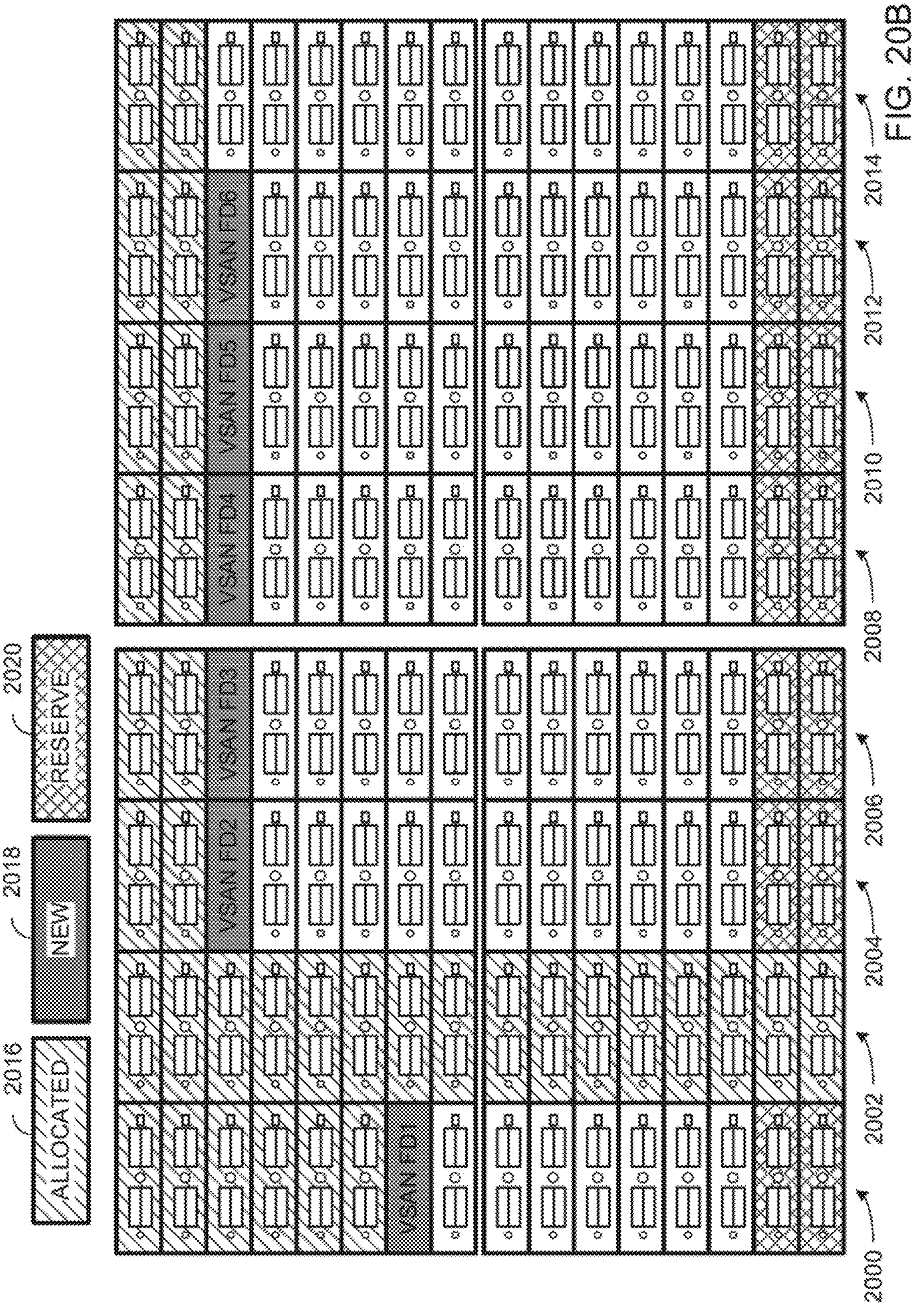

FIGS. 20A and 20B illustrate a compute placement solution when a production availability option is selected (e.g., as described above in connection with block 1316 of FIG. 13). FIGS. 20A and 20B include example physical racks 2000-2014 (e.g., such as the physical racks 202, 204 of FIGS. 2 and 8), example allocated servers 2016, example new servers 2018, and example reserved servers 2020. The example normal availability compute solution of FIGS. 20A and 20B is based on the following requested configurations for a workload domain: 220 GHz CPU, 1200 GB memory and 18 TB storage at a High Redundancy and standard workloads with a failure-to-tolerance of 2. Each host server in the example physical racks 1902-1908 has a host configuration of 55.2 GHz CPU, 256 GB RAM, and 9.6 TB raw storage.

When the example deployment manager 1006 of FIG. 10 computes a placement solution, the deployment manager 1006 determines the number of host servers necessary to satisfy the requested capacity based on the host configurations. In the illustrated example of FIGS. 20A and 20B, the deployment manager 1006 determines that there are six host servers necessary to satisfy the requested capacity (e.g., (220/55.2=4 host servers, 1400/256=6 host servers, and 18/(9.6/3))=6 host servers). The example deployment manager 1006 reserves the new servers 2018 based on the requested configuration after the example allocated servers 2016 and the example reserved servers 2020 have been filtered out. Using the example table 1400 of FIG. 14, the deployment manager 1006 determines that rack spanning resource allocation is allowed for a workload domain based on a minimum rack count algorithm where the fault domain minimum is five (e.g., reserving the requested resources using a portion of first available resources of the first physical rack without exhausting the first available resources and using a portion of the second available resources of the second physical rack without exhausting the second available resources, until number of host servers have been reserved from the minimum rack count). Accordingly, as shown in FIG. 19B, the example deployment manager 1006 reserves the host servers across a minimum of five racks (e.g., the example physical racks 2000, 2004, 2006, 2008, 2010, 2012). In this manner, each of the minimum number of racks includes at least one reserved host server.

Figure 21:
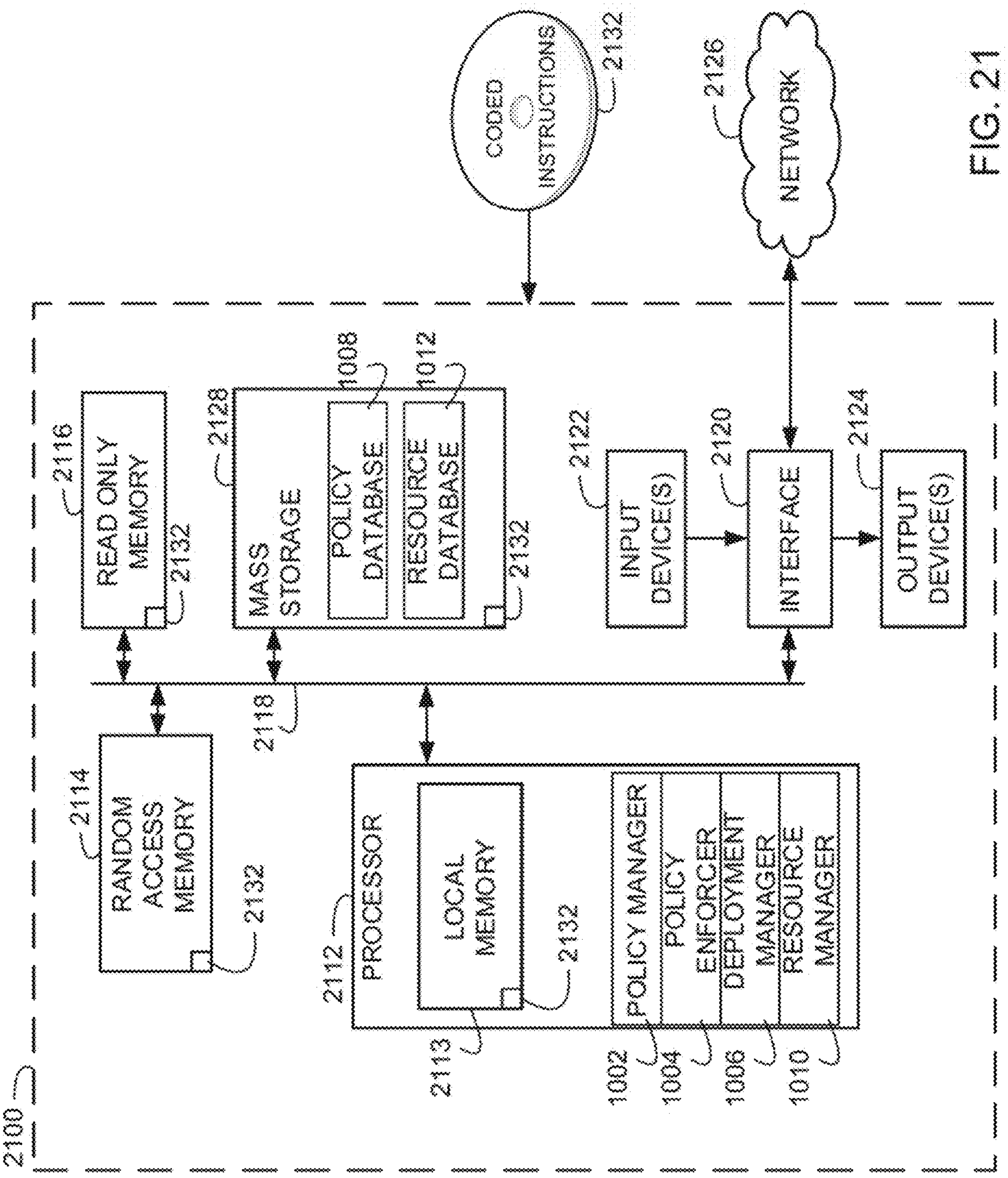
FIG. 21 is a block diagram of an example processing platform capable of executing the example machine-readable instructions of FIGS. 11A and 11B to deploy workload domains and/or the example machine-readable instructions of FIGS. 12A-12D to manage workload domains.

FIG. 21 is a block diagram of an example processor platform 2100 capable of executing the instructions of FIGS. 11A, 11B, 12A, 12B, and/or 13 to implement the example operations and management component 406 of FIGS. 4, 5, 7, 9 anchor 10. The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer.

The processor 2112 of the illustrated example includes a local memory 2113 (e.g., a cache), and executes instructions to implement the example operations and management component 406 or portions thereof. The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM). Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input devices) 2122 permits) a user to enter data and commands into the processor 2112. The input device(s) can be implemented by, for example, an audio sensor, a microphone, a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2120 of the illustrated example, tints, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include flash devices, floppy disk drives, hard drive disks, optical compact disk (CD) drives, optical Blu-ray disk drives, RAID systems, and optical digital versatile disk (DVD) drives.

Coded instructions 2132 representative of the example machine readable instructions of FIGS. 11A, 11B, 12A, 12B, and/or 13 may be stored in the mass storage device 2128, in the volatile memory 2114, in the non-volatile memory 2116, and/or on a removable tangible computer readable storage medium such as a CD or DVD.

From the foregoing, it will be appreciated that the above disclosed methods, apparatus and articles of manufacture manage workload domains based on changes to policy capacities after workload domain deployment. The examples disclosed herein compare capacities of workload domains for compliance to one or more policy capacities and add and/or remove resources to maintain compliance of the workload domains.

An example apparatus to manage a plurality of workload domains of multiple users comprises a policy enforcer to evaluate whether capacities of the plurality of workload domains comply with policy capacities of respective user-defined policies for the plurality of workload domains, a resource manager to, when ones of the capacities of the plurality of workload domains exceed the policy capacities of the respective user-defined policies, de-allocate resources associated with excess capacity from the plurality of workload domains, and a processor to, when ones of the capacities of the plurality of workload domains are less than the policy capacities of the respective user-defined policies, determine a plurality of placement solutions for additional capacity for the plurality of workload domains corresponding to the multiple uses based on concurrent analysis of: (a) the capacities of the plurality of workload domains, (b) updates to the respective user-defined policies, and (c) a resource database shared by the multiple users, the resource manager to allocate resources to the plurality of workload domains based on the plurality of placement solutions.

In some examples, the resource manager is to update the resource database based on at least one of the de-allocation of the resources from the plurality of workload domains or the allocation of the resources to the plurality of workload domains.

In some examples, the apparatus further includes a policy manager to update the respective user-defined policies for the plurality of workload domains based on user input from respective ones of the multiple users.

In some examples, when ones of the capacities of the plurality of workload domain comply with the policy capacities of the respective user-defined policies, the policy enforcer is to, in response to determining that the policy manager updated the user-defined policies, reevaluate whether the capacities of the plurality of workload domains comply with the policy capacities of respective user-defined policies for the plurality of workload domains.

In some examples, to evaluate whether the capacities of the plurality of workload domains comply with the policy capacities of respective user-defined policies for the plurality of workload domains, the policy enforcer is to, determine a first policy capacity of a first one of the user-defined policies for a first one of the plurality of workload domains at a first time, and compare the first policy capacity to a second policy capacity specified in the first one of the user-defined polices for the first one of the plurality of workload domains at a second time.

In some examples, the policy enforcer is to determine that a capacity of the first one of the plurality of the workload domains exceeds the first one of the user-defined policies when the first policy capacity exceeds the second policy capacity, determine that the capacity of the first one of the plurality of the workload domains is less than the first one of the user-defined policies when the first policy capacity is less than the second policy capacity, and determine that the capacity of the first one of the plurality of the workload domains complies with the first one of the user-defined policies when the first policy capacity is identical to the second policy capacity.

An example method to manage a workload domain comprises evaluating, by executing an instruction with a processor, whether capacities of the plurality of workload domains comply with policy capacities of respective user-defined policies for the plurality of workload domains, when ones of the capacities of the plurality of workload domains exceed the policy capacities of the respective user-defined policies, de-allocating, by executing an instruction with the processor, resources associated with excess capacity from the plurality of workload domains, and, when ones of the capacities of the plurality of workload domains are less than the policy capacities of the respective user-defined policies, concurrently determining, by executing an instruction with the processor, a plurality of placement solutions for additional capacity for the plurality of workload domains based on a comparative analysis of: (a) the capacities of the plurality of workload domains, (b) updates to the respective user-defined policies, and (c) a resource database shared by the multiple users, the resource manager to allocate resources to the plurality of workload domains based on the plurality of placement solutions.

In some examples, the method further includes updating the resource database based on at least one of the de-allocation of the resources from the plurality of workload domains or the allocation of the resources to the plurality of workload domains.

In some examples, the method further includes updating the respective user-defined policies for the plurality of workload domains based on user input from respective ones of the multiple users.

In some examples, the method further includes when ones of the capacities of the plurality of workload domain comply with the policy capacities of the respective user-defined policies, reevaluating whether the capacities of the plurality of workload domains comply with the policy capacities of respective user-defined policies for the plurality of workload domains in response to updating the respective user-defined policies.

In some examples, the method further includes reevaluating whether the capacities of the plurality of workload domains comply with the policy capacities of respective user-defined policies for the plurality of workload domains after a threshold amount of time has elapsed since the evaluating of whether the capacities of the plurality of workload domains comply with the policy capacities of respective user-defined policies for the plurality of workload domains.

In some example the evaluating of whether the capacities of live plurality of workload domains comply with the policy capacities of respective user-defined policies for the plurality of workload domains includes, determining a first policy capacity of a first one of the user-defined policies for a first one of the plurality of workload domains at a first time, and comparing the first policy capacity to a second policy capacity specified in the first one of the user-defined policies for the first one of the plurality of workload domains at a second time.

In some examples, the method further includes determining that a capacity of the first one of the plurality of the workload domains exceeds the first one of the user-defined policies when the first policy capacity exceeds the second policy capacity, determining that the capacity of the first one of the plurality of the workload domains is less than the first one of the user-defined policies when the first policy capacity is less than the second policy capacity, and determining that the capacity of the first one of the plurality of the workload domains complies with the first one of the user-defined policies when the first policy capacity is identical to the second policy capacity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:

determining, by executing an instruction with a processor, a number of requested resources necessary to satisfy a request for resources;

determining, by executing an instruction with the processor, available resources from an inventory;

determining, by executing an instruction with the processor, whether an availability selection corresponds to (A) a first resource allocation technique when a number of available physical racks satisfies a threshold number of physical racks or (B) a second resource allocation technique when the number of available physical racks does not satisfy the threshold number of physical racks;

when the availability selection corresponds to the first resource allocation technique, reserving the requested resources by exhausting first available resources of a first physical rack before using second available resources of a second physical rack;

when the availability selection corresponds to the second resource allocation technique, reserving the requested resources using a portion of the first available resources of the first physical rack without exhausting the first available resources and using a portion of the second available resources of the second physical rack without exhausting the second available resources;

executing one or more workload domains associated with the number of requested resources in accordance with the availability selection; and wherein the first resource allocation technique and the second resource allocation technique are different resource allocation methods for allocating available resources.

2. The method of claim 1, wherein the number of requested resources necessary to satisfy the request for the resources corresponds to a requested configuration and a host configuration.

3. The method of claim 2, wherein:

the requested configuration corresponds to a user selection and includes at least one of a first system clock speed, a first memory amount, or a first storage amount; and the host configuration corresponds to characteristics of the available resources and includes at least one of a second system clock speed, a second memory amount, or a second storage amount.

4. The method of claim 1, further including filtering a resource from the available resources based on one or more alerts identifying the resource as unhealthy, the alerts identified based on a status of a field replaceable unit component of the resource.

5. The method of claim 1, further including, when the availability selection corresponds to the first resource allocation technique and when the first physical rack is fully reserved, using the second available resources of the second physical rack to reserve the requested resources.

6. The method of claim 1, further including, when the availability selection corresponds to a third resource allocation technique, reserving third available resources in the first physical rack, the first physical rack including a number of available resources to satisfy the number of requested resources without needing to use the second physical rack to satisfy the number of requested resources.

7. The method of claim 6, wherein the first resource allocation technique corresponds to at least one of a low redundancy for fault tolerance or a normal redundancy for fault tolerance and the second and third resource allocation techniques correspond to a high redundancy for fault tolerance.

8. The method of claim 1, wherein the determining of the available resources from the inventory includes filtering out allocated resources and reserved resources from the inventory.

9. The method of claim 1, wherein the determining of the available resources from the inventory further includes filtering out resources from the inventory based on rack locations associated with user policies.

10. The method of claim 1, further including holding the reserved resources until a user confirms or denies the reserving of the requested resources.

11. The method of claim 1, wherein the exhausting of the first available resources of the first physical rack is based on using at least one of a physical location sequence, a performance sequence, or an age sequence.

12. An apparatus comprising:

a memory;

processor circuitry coupled to the memory and configured to:

determine a number of requested resources necessary to satisfy a request for resources; and determine available resources from an inventory; and a deployment manager configured to:

determine whether an availability selection corresponds to (A) a first resource allocation technique when a number of available physical racks satisfies a threshold number of physical racks or (B) a second resource allocation technique when the number of available physical racks does not satisfy the threshold number of physical racks;

when the availability selection corresponds to the first resource allocation technique, reserve the requested resources by using all of first available resources of a first physical rack before using second available resources of a second physical rack;

when the availability selection corresponds to the second resource allocation technique, reserve the requested resources using a first portion of the first available resources of the first physical rack and using a second portion of the second available resources of the second physical rack, the first portion not including all of the first available resources and the second portion not including all of the second available resources;

execute one or more workload domains associated with the number of requested resources in accordance with the availability selection; and wherein the first resource allocation technique and the second resource allocation technique are different resource allocation methods for allocating available resources.

13. The apparatus of claim 12, wherein the number of requested resources necessary to satisfy the request for resources corresponds to a requested configuration and a host configuration.

14. The apparatus of claim 13, wherein:

the requested configuration corresponds to a user selection and includes at least one of a first system clock speed, a first memory amount, or a first storage amount; and the host configuration corresponds to characteristics of the available resources and includes at least one of a second system clock speed, a second memory amount, or a second storage amount.

15. The apparatus of claim 12, wherein the deployment manager is to filter a resource from the available resources by identifying the resource as unhealthy based on a status of a field replaceable unit component of the resource.

16. The apparatus of claim 12, wherein, when the availability selection corresponds to the first resource allocation technique and when the first physical rack is fully reserved, the deployment manager is to use the second physical rack to reserve the requested resources.

17. The apparatus of claim 12, wherein, when the availability selection corresponds to a third resource allocation technique, the deployment manager is to reserve third available resources in the first physical rack, the first physical rack including a number of available resources to satisfy the number of requested resources necessary to satisfy the request for resources without needing to use the second physical rack to satisfy the number of requested resources.

18. The apparatus of claim 17, wherein the first resource allocation technique corresponds to at least one of a low redundancy for fault tolerance or a normal redundancy for fault tolerance and the second and third resource allocation techniques correspond to a high redundancy for fault tolerance.

19. The apparatus of claim 12, wherein the deployment manager is to determine the available resources from the inventory by filtering out allocated resources and reserved resources from the inventory.

20. The apparatus of claim 12, wherein the deployment manager is to determine the available resources from the inventory by filtering out resources from the inventory based on rack locations associated with user policies.

21. The apparatus of claim 12, wherein the deployment manager is to hold the reserved resources until a user confirms or denies the reserving of the requested resources.

22. The apparatus of claim 12, wherein the resources are host servers.

23. The apparatus of claim 12, wherein the deployment manager is to use the first available resources of the first physical rack using at least one of a physical location sequence, a performance sequence, or an age sequence.

24. A tangible computer readable storage medium comprising instructions which, when executed cause a machine to at least:

determine a number of requested resources necessary to satisfy a request for resources;

determine available resources from an inventory;

determine whether an availability selection corresponds to (A) a first resource allocation technique when a number of available physical racks satisfies a threshold number of physical racks or (B) a second resource allocation technique when the number of available physical racks does not satisfy the threshold number of physical racks;

when the availability selection corresponds to the first resource allocation technique, reserve the requested resources by exhausting first available resources of a first physical rack before using second available resources of a second physical rack;

when the availability selection corresponds to the second resource allocation technique, reserve the requested resources using (A) some of the first available resources of the first physical rack and (B) some of the second available resources of the second physical rack to satisfy the number of requested resources;

execute one or more workload domains associated with the number of requested resources in accordance with the availability selection; and wherein the resource allocation technique and the second resource allocation technique are different resources allocation methods for allocating available resources.

25. The computer readable storage medium of claim 24, wherein the number of requested resources necessary to satisfy the request for resources corresponds to a requested configuration and a host configuration.

26. The computer readable storage medium of claim 25, wherein:

the requested configuration corresponds to user selection and includes at least one of a first system clock speed, a first memory amount, or a first storage amount; and the host configuration corresponds to characteristics of the available resources and includes at least one of a second system clock speed, a second memory amount, or a second storage amount.

27. The computer readable storage medium of claim 24, wherein the instructions cause the machine to at least:

identify a resource as unhealthy in response to a status of a field replaceable unit component of the available resources: and remove the unhealthy resource from the available resources.

28. The computer readable storage medium of claim 24, wherein the instructions cause the machine to at least, when the availability selection corresponds to the first resource allocation technique and when the first physical rack is fully reserved, use the second physical rack to reserve the requested resources.

29. The computer readable storage medium of claim 24, wherein the instructions cause the machine to at least, when the availability selection corresponds to a third resource allocation technique, reserve a first portion of the requested resources using a portion of the first available resources of the first physical rack without exhausting the first available resources before using a portion of the second available resources of the second physical rack to reserve a second portion of the requested resources.

30. The computer readable storage medium of claim 29, wherein the first resource allocation technique corresponds to at least one of a low redundancy for fault tolerance or a normal redundancy for fault tolerance and the second and third resource allocation techniques correspond to a high redundancy for fault tolerance.

31. The computer readable storage medium of claim 24, wherein the instructions cause the machine to at least determine the available resources from the inventory by filtering out allocated resources and reserved resources from the inventory.

32. The computer readable storage medium of claim 24, wherein the instructions cause the machine to at least determine the available resources from the inventory by filtering out resources from the inventory based on rack locations associated with user policies.

33. The computer readable storage medium of claim 24, wherein the instructions cause the machine to at least hold the reserved resources until a user confirms or denies the reservation reserving of the requested resources.

34. The computer readable storage medium of claim 24, wherein the resources are host servers.

35. The computer readable storage medium of claim 24, wherein the instructions cause the machine to at least exhaust the first available resources of the first physical rack by using at least one of a physical location sequence, a performance sequence, or an age sequence.

* * * * *